US007360217B2

(12) United States Patent
Melvin et al.

(10) Patent No.: US 7,360,217 B2
(45) Date of Patent: Apr. 15, 2008

(54) MULTI-THREADED PACKET PROCESSING ENGINE FOR STATEFUL PACKET PROCESSING

(75) Inventors: Stephen W. Melvin, San Francisco, CA (US); Mario D. Nemirovsky, Saratoga, CA (US); Enrique Musoll, San Jose, CA (US); Jeffery T. Huynh, Milpitas, CA (US)

(73) Assignee: ConSentry Networks, Inc., Milpitas, CA (US)

( * ) Notice: Subject to any disclaimer, the term of this patent is extended or adjusted under 35 U.S.C. 154(b) by 852 days.

(21) Appl. No.: 10/254,377

(22) Filed: Sep. 24, 2002

(65) Prior Publication Data

US 2003/0069920 A1 Apr. 10, 2003

Related U.S. Application Data

(60) Provisional application No. 60/388,278, filed on Jun. 13, 2002, provisional application No. 60/341,689, filed on Dec. 17, 2001, provisional application No. 60/325,638, filed on Sep. 28, 2001.

(51) Int. Cl.
G06F 9/46 (2006.01)
G06F 15/00 (2006.01)

(52) U.S. Cl. ............... 718/102; 718/100; 712/1

(58) Field of Classification Search ............ 718/100, 718/102
See application file for complete search history.

(56) References Cited

U.S. PATENT DOCUMENTS 5,751,997 A * 5/1998 Kullick et al. ............ 711/162
5,872,941 A * 2/1999 Goodrum et al. ......... 710/309
6,243,778 B1 * 6/2001 Fung et al. ................ 710/113
6,298,386 B1 * 10/2001 Vahalia et al. ............ 709/234
6,330,548 B1 12/2001 Walker et al.
6,330,584 B1 12/2001 Joffe et al.
6,349,297 B1 2/2002 Shaw et al.
6,363,453 B1 * 3/2002 Esposito et al. ............. 711/2

(Continued)

FOREIGN PATENT DOCUMENTS

| EP | 0507061 A2 * | 7/1992 |
| EP | 1 014 650 A | 6/2000 |
| WO | WO 97/45795 | 12/1997 |
| WO | WO 0197020 A | 12/2001 |

OTHER PUBLICATIONS

U.S. Appl. No. 60/325,638, Stephen Melvin et al., Priority Claim.
U.S. Appl. No. 60/341,689, Stephen Melvin et al., Priority Claim.
U.S. Appl. No. 60/388,278, Stephen Melvin et al., Priority Claim.

(Continued)

*Primary Examiner*—Meng-Al T. An
*Assistant Examiner*—Kenneth Tang
(74) *Attorney, Agent, or Firm*—Bobby K. Truong; Hickman Palermo Truong & Becker LLP

(57) ABSTRACT

A processing engine to accomplish a multiplicity of tasks has a multiplicity of processing tribes, each tribe comprising a multiplicity of context register sets and a multiplicity of processing resources for concurrent processing of a multiplicity of threads to accomplish the tasks, a memory structure having a multiplicity of memory blocks, each block storing data for processing threads, and an interconnect structure and control system enabling tribe-to-tribe migration of contexts to move threads from tribe-to-tribe. The processing engine is characterized in that individual ones of the tribes have preferential access to individual ones of the multiplicity of memory blocks.

25 Claims, 52 Drawing Sheets

U.S. PATENT DOCUMENTS

| | | | |
|---|---|---|---|
| 6,542,921 B1 * | 4/2003 | Sager | 718/108 |
| 6,560,629 B1 * | 5/2003 | Harris | 718/105 |
| 7,114,011 B2 * | 9/2006 | Buch et al. | 709/250 |
| 2002/0065864 A1 | 5/2002 | Hartsell et al. | |
| 2002/0087687 A1 | 7/2002 | Zaifman et al. | |
| 2002/0095400 A1 | 7/2002 | Johnson et al. | |
| 2002/0120741 A1 | 8/2002 | Webb et al. | |

OTHER PUBLICATIONS

Supplemental European Search Report, No. 02780352.7, dated Sep. 3, 2007, 4 pgs.

Edward Mascarenhas, et al., "Ariadne: Architecture of a Portable Threads System Supporting Thread Migration", vol. 26, No. 3, Mar. 1996 (pp. 327-356).

Scott Milton, "Thread Migration in Distributed Memory Multicomputers", Technical Report TR-CS-98-01, The Australian National University, Feb. 1998, 14 pgs.

Loh, K.S. et al., "Multiple context multithreaded superscalar processor architecture," Journal of Systems Architecture 46 (2000), XP004244639, pp. 243-258.

Tullsen, Dean M., et al., "Supporting Fine-Grained Synchronization Multithreading Processor," High-Performance Computer Architecture 1999, XP010321127, pp. 54-58.

International Searching Authority, "Notification of Transmittal of the International Search Report and the Written Opinion of the International Searching Authority, or the Declaration," PCT/US2006/018643, dated Dec. 4, 2006, 11 pages.

Current Claims, PCT/US2006/018643, 20 pages (attached).

Office Action from India for foreign patent application No. 561/KOLNP/2004 dated Mar. 14, 2007 (2 pgs).

Current claims in India patent application No. 561/KOLNP/2004 (4 pgs).

* cited by examiner

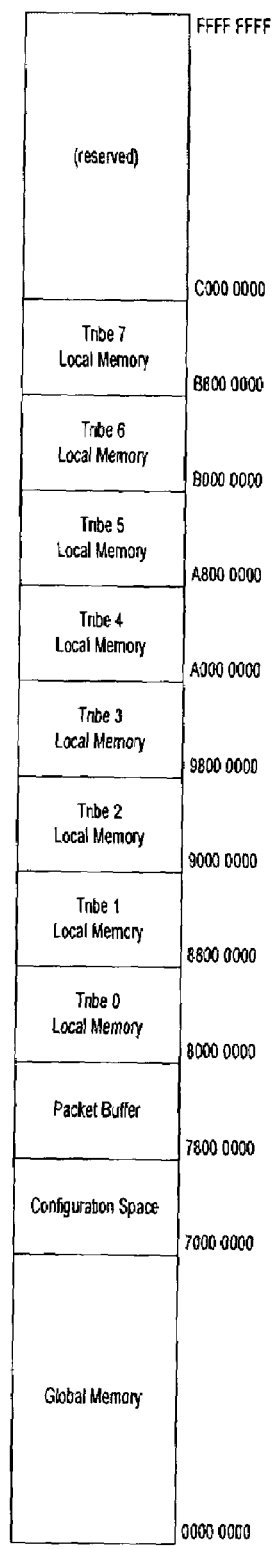
Fig. 2 - Memory Map

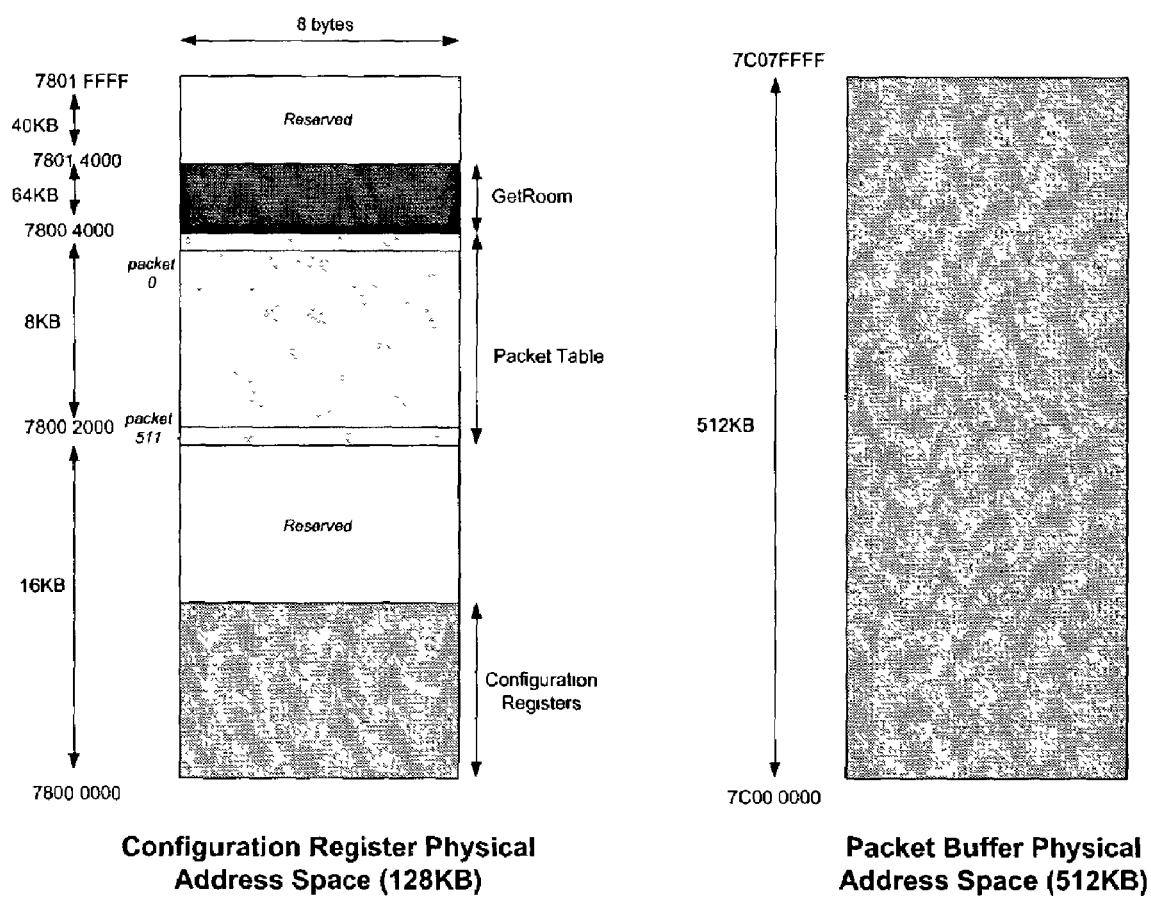
*Fig. 3 -Address Space*

| # | Name | Format (TBD) | Description |
|---|---|---|---|
| 0..7 | program_counter[0..7] | | Provides the initial PC to each of the tribes (0..7) for the initial migration. |
| 8..127 | reserved | | |
| 128 | status | | Specifies whether the NET module has come out of reset and whether it is in quiescent mode or not. The quiescent information is don't care is the NET has not come out of reset. |
| 129 | continue | | If 1, the NET module will receive packets from the SPI4 ingress port. If 0, the NET module will drop the packets that it receives from the SPI4 ingress port. |
| 130 | total_ports | | Specifies the total number of full-duplex ports. The valid values are 1, 2 and 4. The value 3 is reserved. |
| 131 | port_type | | Specifies the type of the ports (channelized or non-channelized). All ports will become of the same type. |
| 132 | internal_state_number | | Software writes to this register an internal state word number. When software reads this register, it obtains the value associated to the internal state word number last written. |
| 133-220 | reserved | | |
| 221 | egress_path_determined | | Software writes in this register a value containing the sequence number, the encoded egress channel (if applicable), and the encoded egress port to report that the packet still has not been completed but its egress path information has been fully determined. Software is not required to write into this register (the same functionality is obtained by the mandatory writing into the 'done' configuration register), but by doing so it helps the performance on those applications that require an egress interleaving degree greater than 1. |
| 222 | default_egress_port_0 | | Specifies which of the egress ports (0-3) is the default port for those packets that came through ingress port 0. This default port is used whenever software requests to transmit a packet that resides in the packet buffer with an encoded egress port of 0x1. |
| 223 | default_egress_port_1 | | Specifies which of the egress ports (0-3) is the default port for those packets that came through ingress port 1. This default port is used whenever software requests to transmit a packet that resides in the packet buffer with an encoded egress port of 0x1. |

*Fig. 4a - Partial List of Config. Registers*

| | | | |
|---|---|---|---|
| 224 | default_egress_port_2 | | Specifies which of the egress ports (0-3) is the default port for those packets that came through ingress port 2. This default port is used whenever software requests to transmit a packet that resides in the packet buffer with an encoded egress port of 0x1. |
| 225 | default_egress_port_3 | | Specifies which of the egress ports (0-3) is the default port for those packets that came through ingress port 3. This default port is used whenever software requests to transmit a packet that resides in the packet buffer with an encoded egress port of 0x1. |
| 256 | max_packet_size | | Specifies the maximum packet size allowed by the NET module. The maximum packet size allowed is 64KB. The smallest the maximum packet size allowed, the less memory fragmentation will occur at the packet buffer memory. The possible values are from 0x0 (corresponding to a maximum size of 1024 bytes) to 0xFF (corresponding to 65536 bytes), with all the intermediate sizes in increments of 1024 bytes. |
| 257 | default_egress_channel | | Specifies which of the 256 (0..255) is the egress default channel. This default channel is used whenever software requests to transmit a packet that resides in the packet buffer with an encoded egress channel of 0x1. |
| 258 | done | | Software writes in this register a value containing the sequence number, the header growth delta and the encoded egress channel to report that the packet has been completed and it is ready for transmission.<br>When the write occurs, the NET module will update the status of the packet and it will transmit as soon as it becomes the oldest packet in the packet buffer. |
| 259 | drop | | Software writes in this register a value containing the sequence number to report that the packet is no longer valid and its data in the packet buffer can be reused for another new packet.<br>When the write occurs, the NET module will update the status of the packet |
| 260 | head_growth_offset | | Specifies the amount of space (in bytes) that the NET will leave in front of each packet when stored in the packet buffer.<br>The lower 3 bits of this register are disregarded (they are considered to be always 0). Therefore, software can only specify growth offsets that are a multiple of 8 bytes. |
| 261-262 | *reserved* | | |
| 263 | packet_table_packets | | Contains the total number of packets in the NET (it may account for invalid packets or packets that still have not been transmitted) and the total number of packets that have been received but still need to be migrated. |

*Fig. 4b - Partial List of Config. Registers*

| | | | |
|---|---|---|---|
| 264..269 | *reserved* | | |
| 270 | l1_selection | | Specifies, for each of the first 64 bytes of the packet, whether the byte will be used for the hashing computation (bit 0:byte0 ... bit63:byte63) of the first-level hashing engine. |
| 271-277 | *reserved* | | |
| 278 | l1_position | | Specifies, for each of the first 64-bytes of the packet, whether the byte will be used in the MSB (1) or LSB (0) 8-bits of the hashing result. It is validated with the l1_selection configuration register. |
| 279-285 | *reserved* | | |
| 286-289 | l2_selection[0..3] | | Equivalent to l1_selection but for each of the second-level hashing engines. |
| 290-301 | *reserved* | | |
| 302-309 | l2_position[0..3] | | Equivalent to l1_position but for each of the second-level hashing engines. |
| 310-TBD | *reserved* | | |
| 318 | L1_skip | | Specifies how many LSB bits of the first-level hashing result will be disregarded when computing the selected second-level hashing engine. |
| 319-322 | l2_skip[0..3] | | Specifies how many LSB bits of each of the second-level hashing results will be disregarded when computing the selected tribe for initial migration. |
| 323-334 | *reserved* | | |
| 335-338 | l2_first[0..3] | | Specifies, for each of the second-level hashing engines, the first tribe of the set of tribes that will be candidates for initial migration (0: tribe 0, ..., 7:tribe 7). |
| 339-350 | *reserved* | | |
| 351-354 | l2_total[0..3] | | Specifies, for each of the second-level hashing engines, the total amount of tribes that will be candidates for initial migration (0:1 tribe, 1:2 tribes, ... 3:8 tribes). |
| 355-366 | *reserved* | | |
| 367-374 | perf_counter_event[0..7] | | Each one specifies one 64 events that can be monitored in the NET module. Thus, a total of 8 events can be monitored simultaneously. |
| 375-382 | *reserved* | | |
| 383-390 | perf_counter_value[0..7] | | Contain the value of the performance events monitored. |
| 400 | islot_enable | | Enables/disables each of the different egress interleaving slots. Bit 0-3 corresponds to islot0-3. |
| 401 | islot0_channels | | Specifies the range of channels associated to islot0. The smallest channel number is specified in bits 0-7 and the largest channel number in bits 16-23. |
| 402 | islot1_channels | | Specifies the range of channels associated to islot1. The smallest channel number is specified in bits 0-7 and the largest channel number in bits 16-23. |

*Fig. 4c - Partial List of Config. Registers*

| | | | |
|---|---|---|---|
| 403 | islot2_channels | | Specifies the range of channels associated to islot2. The smallest channel number is specified in bits 0-7 and the largest channel number in bits 16-23. |
| 404 | islot3_channels | | Specifies the range of channels associated to islot3. The smallest channel number is specified in bits 0-7 and the largest channel number in bits 16-23. |
| 405-1023 | *reserved* | | |
| 1024-2047 | Packet table | | Information of the 512 packet descriptors (two configuration registers per packet). The packet table is read only. |
| 2048-8191 | *reserved* | | |
| 8192-16383 | GetRoom | | Software adds the base of this space to the requested size in bytes to obtain the address to access this space for a GetRoom command. The GetRoom space is read only. |

*Fig. 4d - Partial List of Config. Registers*

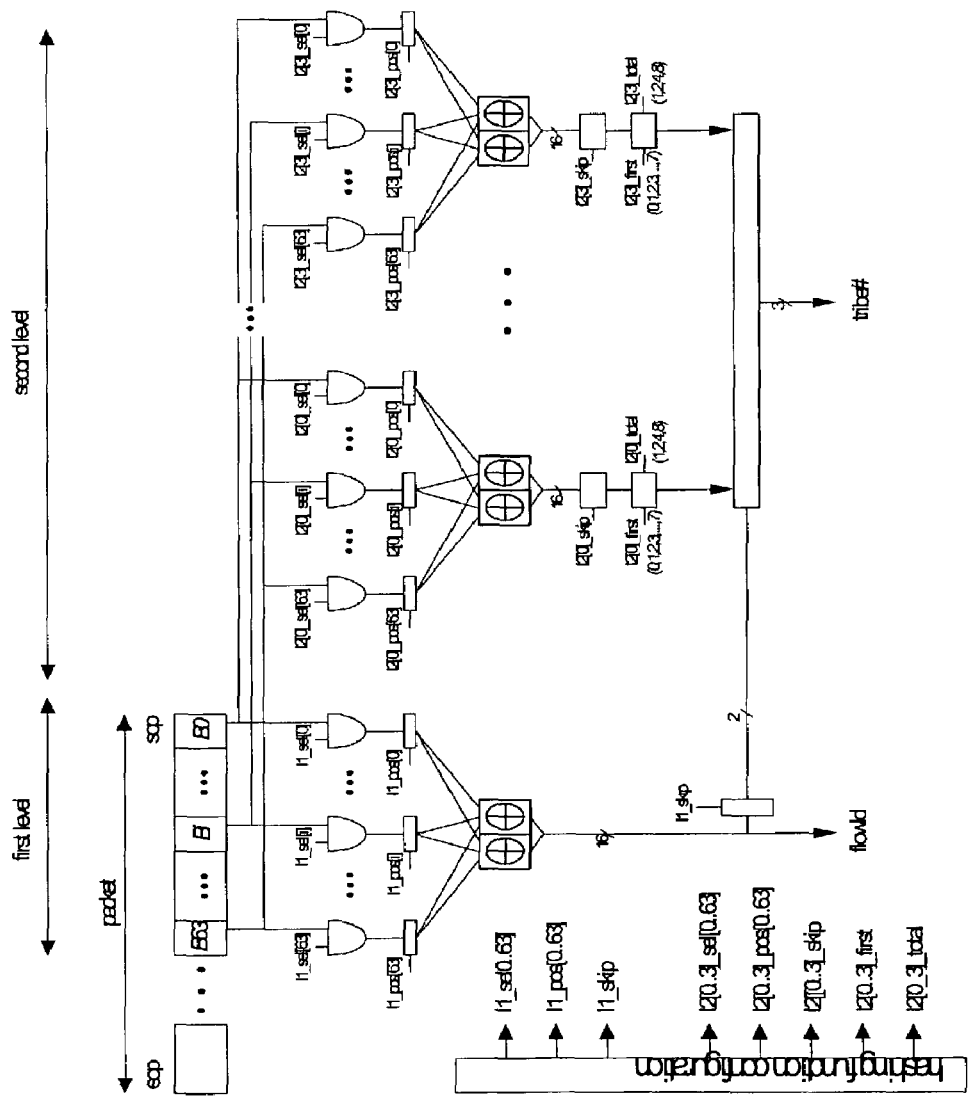
Fig. 5 - Hashing Function Hardware

| # | Description |
|---|---|
| 0-3 | Number of packets dropped due to interleaving protocol violation, per ingress port. |
| 4-7 | Number of bytes received per ingress port. |
| 8-11 | Number of packets dropped due to an error notification. |
| 12-15 | Number of chunks of data (1-8 bytes) transmitted out per egress port. |
| 16-19 | Number of times an egress port is ready to accept data from the NET module (per egress port). |
| 20-23 | Number of times an egress port is ready to accept data from the NET module, but the NET module has no data to provide (per egress port). |
| 24-31 | reserved |
| 32 | Number of packets dropped due to packet table being full. |
| 33 | Number of chunks of data (1-8 bytes) dropped due to packet table being full, maximum packet size violation or packet buffer being full. |
| 34 | Number of packets dropped due to maximum packet size violation. |
| 35 | Number of packets dropped due to 'continue' configuration register being 0. |
| 36 | Number of packets dropped due to packet buffer being full. |
| 37 | Number of accesses to the packet table due to new packet insertions. |
| 38 | Number of accesses to the packet table due to migrations. |
| 39 | Number of accesses to the packet table due to migrations that do not get served right away (an access that does not get served for several cycles will generate as many events). |
| 40 | Number of accesses to the packet table due to packet transmissions. |
| 41 | Number of accesses to the packet table due to transmissions that do not get served right away (an access that does not get served for several cycles will generate as many events). |
| 42 | Number of accesses to the packet table due to packet control updates. |
| 43 | Number of accesses to the packet table due to packet control updates that do not get served right away (an access that does not get served for several cycles will generate as many events). |
| 44-63 | reserved |
| 64-71 | Number of accesses to bank $j$ (bank 0:event 32 ... bank 7:event 39) of the packet buffer. |
| 71-78 | Number of accesses to the packet buffer performed by tribe $j$ (tribe 0:event 40... tribe 7:event 47). |
| 79-86 | Number of accesses to the packet buffer performed by tribe $j$ (tribe0: event 48...tribe7:event 55) that do not get served right away (an access that does not get served for several cycles will generate as many events). |
| 87 | Number of accesses to the packet buffer due to packet transmissions. |
| 88 | Number of accesses to the packet buffer due to packet transmissions that do not get served right away (an access that does not get served right away for several cycles will generate as many events). |
| 89 | Number of accesses to the packet buffer from non-DMA global. (TBD) |
| 90 | Number of accesses to the packet buffer from non-DMA global that do not get served right away (an access that does not get served right away for several cycles will generate as many events). (TBD) |
| 91 | Number of accesses to the packet buffer from DMA global. (TBD) |
| 92 | Number of accesses to the packet buffer from DMA global that do not get served right away (an access that does not get served right away for several cycles will generate as many events). (TBD) |
| 93 | Number of accesses to the configuration registers, including the packet table. |
| 94-127 | reserved |

*Fig. 6 - Performance Events*

| Encoded egress channel | | Actual egress channel |
|---|---|---|
| *Bit 8* | *Bits 7-0* | Bits 7-0 |
| 0 | 0 | Same as ingress channel |
|  | 1 | Contents of 'default_egress_channel' conf. register |
|  | 2..255 | *reserved* |
| 1 | 0..255 | 0..255 |

*Fig. 7 - Egress Channel Determination*

| Encoded egress port | | Actual egress port |
|---|---|---|
| *Bit 5* | *Bits 4-0* | Bits 4-0 |
| 0 | 0 | Same as ingress port |
| | 1 | Contents of 'default_egress_port_X' conf. Register, where X=0..3 is the ingress port number |
| | 2..15 | *reserved* |
| 1 | 0..15 | 0..15 (4..15 reserved). |

*Fig. 8 -Egress Port Determination*

| Ports | Type | |
|---|---|---|
| | Channelized | Non-channelized |
| 1 | 1,2,3,4 | 1 |
| 2 | 1,2 | 1 |
| 4 | 1 | 1 |

Fig. 9 - Allowed Interleaving Degree

*Global Block Architecture*

Table D-1 - Migration Protocol

| | | | | | | | cycle | | | | | | |
|---|---|---|---|---|---|---|---|---|---|---|---|---|---|
| | x | x+1 | x+2 | x+3 | x+4 | x+5 | x+6 | x+7 | x+8 | x+9 | x+10 | x+11 | x+12 |
| Migration Function | | | | | | | | | | | | | |
| makes request | yes | | | yes | | | | | yes | | | | |
| retries request | | yes | | | yes | yes | yes | | | | | | |
| receives grant | | | yes | | | | | yes | | yes | yes | | |
| sends 'last' | | | 0 | 1 | 0 | | | 0 | 1 | 0 | 0 | 1 | 0 |
| sends 'data' | | | D1 | D2 | D3 | | | D1 | D2 | D3 | D1 | D2 | D3 |
| Interconnect | | | | | | | | | | | | | |
| receives request | | yes | | | yes | yes | yes | yes | | yes | yes | | |
| disregards request | | | yes | | | | yes | yes | | | yes | | |
| grants request | | yes | | | | | | | | yes | | | |
| refuses request | | | | | | yes | | | | | | | |
| receives 'last' | | | | 0 | 1 | 0 | | | 0 | 1 | 0 | 0 | 1 |
| receives 'data' | | | | D1 | D2 | D3 | | | D1 | D2 | D3 | D1 | D2 |

*Fig. 13*

Interface to tribe # (ranging from 0 to 7)

| Name | Description |
|---|---|
| TI_migrate_request_#[7:0] | Request migration to tribes (one-hot) |
| IT_migrate_grant_valid_# | Request granted |
| IT_migrate_grant_tribe_#[2:0] | Request granted for migration from tribe # to tribe[2:0] |
| IT_migrate_in_valid_# | Migrating into tribe |
| IT_migrate_in_data_#[63:0] | Data migrating into tribe |
| IT_migrate_in_last_# | Last data migrated in |
| TI_migrate_full_#[1:0] | Code to indicate how full the tribe is |
| TI_migrate_out_valid_# | Migrating out of tribe |
| TI_migrate_out_data_#[63:0] | Data migrating out of tribe |
| TI_migrate_out_last_# | Last data migrated out |
| IT_transient_swap_valid_# | Indicates transient swapping (deadlock resolution) |

*Fig. 19*

Interface to network block

| Name | Description |
|---|---|
| NI_migrate_request[7:0] | Request migration from network to tribes |
| IN_migrate_grant_valid | Request granted |
| NI_migrate_out_valid | Migrating out of network |
| NI_migrate_out_data | Data migrating out of network |
| NI_migrate_out_last | Last data migrated out |

*Fig. 20*

Interface to global block

| Name | Description |
|---|---|
| GI_external_interrupt [7:0] | External hardware interrupts |
| GI_interconnect_age_limit[2:0] | Interconnect request age threshold |
| GI_event_count_selection[2:0] | Select event count for performance counters |
| IG_event_count[7:0] | Event count |

*Fig. 21*

Interface to Tribe:

| Name | Description |
|---|---|
| TM_request_valid | Valid bit for request |
| TM_request_addr[31:0] | Address of memory request |
| TM_request_type[2:0] | Request type |
| TM_request_size[2:0] | Size of request |
| TM_request_stream[4:0] | Stream number of request |
| TM_request_regdest[4:0] | Register destination (data read) |
| TM_request_data[63:0] | Data for write request |
| MT_return_valid | Valid return |
| MT_return_addr_low[2:0] | Low three bits of address |
| MT_return_type[2:0] | Return type |
| MT_return_size[2:0] | Size of return |
| MT_return_stream[4:0] | Stream number of return |
| MT_return_regdest[4:0] | Register destination (data read) |
| MT_return_data[63:0] | Data return |
| MT_int_request_queue_full | Tribe memory request queue full |
| MT_ext_request_queue_full | Global request queue full |

*Fig. 23*

Interface to Global:

| Name | Description |
|---|---|
| GM_transaction_valid | Valid transaction |
| GM_transaction_addr[31:0] | Address of memory transaction |
| GM_transaction_type[2:0] | Transaction type |
| GM_transaction_size[2:0] | Size of transaction |
| GM_transaction_stream[4:0] | Stream number of transaction |
| GM_transaction_tribe[2:0] | Source tribe which makes the transaction |
| GM_transaction_regdest[4:0] | Register destination |
| GM_transaction_data[63:0] | Data for transaction |
| GM_req_transaction_full | Request transaction queue full |
| GM_rsp_transaction_full | Response transaction queue full |
| MG_transaction_valid | Valid transaction |
| MG_transaction_addr[22:0] | Address of memory transaction |
| MG_transaction_type[2:0] | Transaction type |
| MG_transaction_size[2:0] | Size of transaction |
| MG_transaction_stream[4:0] | Stream number of transaction |
| MG_transaction_tribe[2:0] | Source tribe which makes the transaction |
| MG_transaction_regdest[4:0] | Register destination |
| MG_transaction_data[63:0] | Data for transaction |
| MG_req_transaction_full | Request transaction queue full |
| MG_rsp_transaction_full | Global Response transaction queue full |
| GM_initialize_controller | Initialize memory controller |
| GM_event_count_selection[2:0] | Select event count for performance counters |
| MG_event_count[7:0] | Event count |

*Fig. 24*

Interface to Tribe Memory Controller:

| Name | Description |
|---|---|
| ML_address[27:0] | Address for memory transaction |
| ML_length[5:0] | Length of memory transaction |
| ML_datain[63:0] | Write data |
| ML_datain_mask[1:0] | Mask for write data |
| ML_datain_valid | Write data valid |
| LM_datain_queue_full | Write data queue full |
| ML_command_valid | Memory command valid |
| ML_command_type | Memory command type |
| LM_command_queue_full | Memory command q full |
| LM_dataout[63:0] | Data return from memory |
| LM_dataout_available | Data return valid |
| ML_dataout_accept | Ready to accept data return |
| ML_initialize | Initialize DRAMs after powerup sequence |
| ML_regin[15:0] | Register value |
| ML_reg_addr[5:0] | Register address |
| ML_reg_write | Register write |

*Fig. 25*

Interface to Memory Block

| Name | From | To | Description |
| --- | --- | --- | --- |
| bool request_valid | Tribe | Mem | valid bit for request |
| sc_uint<32> request_addr | Tribe | Mem | 32-bit address of memory request |
| sc_uint<3> request_type | Tribe | Mem | request type |
| sc_uint<3> request_size | Tribe | Mem | size of request |
| sc_uint<5> request_stream | Tribe | Mem | stream number of request |
| sc_uint<5> request_regdest | Tribe | Mem | register destination (read) |
| sc_uint<64> request_data | Tribe | Mem | data for request (write) |
| bool return_valid | Mem | Tribe | valid bit for packet memory return |
| sc_uint<3> return_addr_low | Mem | Tribe | low three bits of address |
| sc_uint<3> return_type | Mem | Tribe | return type |
| sc_uint<3> return_size | Mem | Tribe | size of return |
| sc_uint<5> return_stream | Mem | Tribe | stream number of return |
| sc_uint<5> return_regdest | Mem | Tribe | register destination |
| sc_uint<64> return_data | Mem | Tribe | data for return |

*Fig. 30*

Interface to Network Block

| Name | From | To | Description |
|---|---|---|---|
| bool pb_request_valid | Tribe | Net | valid bit for request |
| sc_uint<32> pb_request_addr | Tribe | Net | 32-bit address of memory request |
| sc_uint<3> pb_request_type | Tribe | Net | request type |
| sc_uint<3> pb_request_size | Tribe | Net | size of request |
| sc_uint<5> pb_request_stream | Tribe | Net | stream number of request |
| sc_uint<5> pb_request_regdest | Tribe | Net | register destination (read) |
| sc_uint<64> pb_request_data | Tribe | Net | data for request (write) |
| bool pb_return_valid | Net | Tribe | valid bit for packet memory return |
| sc_uint<3> pb_return_addr_low | Net | Tribe | low three bits of address |
| sc_uint<3> pb_return_type | Net | Tribe | return type |
| sc_uint<3> pb_return_size | Net | Tribe | size of return |
| sc_uint<5> pb_return_stream | Net | Tribe | stream number of return |
| sc_uint<5> pb_return_regdest | Net | Tribe | register destination |
| sc_uint<64> pb_return_data | Net | Tribe | data for return |

*Fig. 31*

Interface to Interconnect Block

| Name | From | To | Description |
|---|---|---|---|
| bool tribe_full | Tribe | Int | no empty stream slots available |
| bool tribe_empty | Tribe | Int | all slots are empty |
| sc_uint<8> migrate_request | Tribe | Int | requests to migrate to each tribe |
| bool migrate_grant_valid | Int | Tribe | a migrate request has been granted |
| sc_uint<8> migrate_grant_tribe | Int | Tribe | the tribe granted to migrate to |
| bool migrate_in_valid | Int | Tribe | a migrate in is being made |
| sc_uint<64> migrate_in_data | Int | Tribe | data bus for migrate in |
| bool migrate_in_last | Int | Tribe | this is the last cycle of a migrate in |
| bool migrate_out_valid | Tribe | Int | migrate out is starting (after grant) |
| sc_uint<64> migrate_out_data | Tribe | Int | data bus for migrate out |
| bool migrate_out_las | Tribe | Int | this is the last cycle of a migrate out |

*Fig. 32*

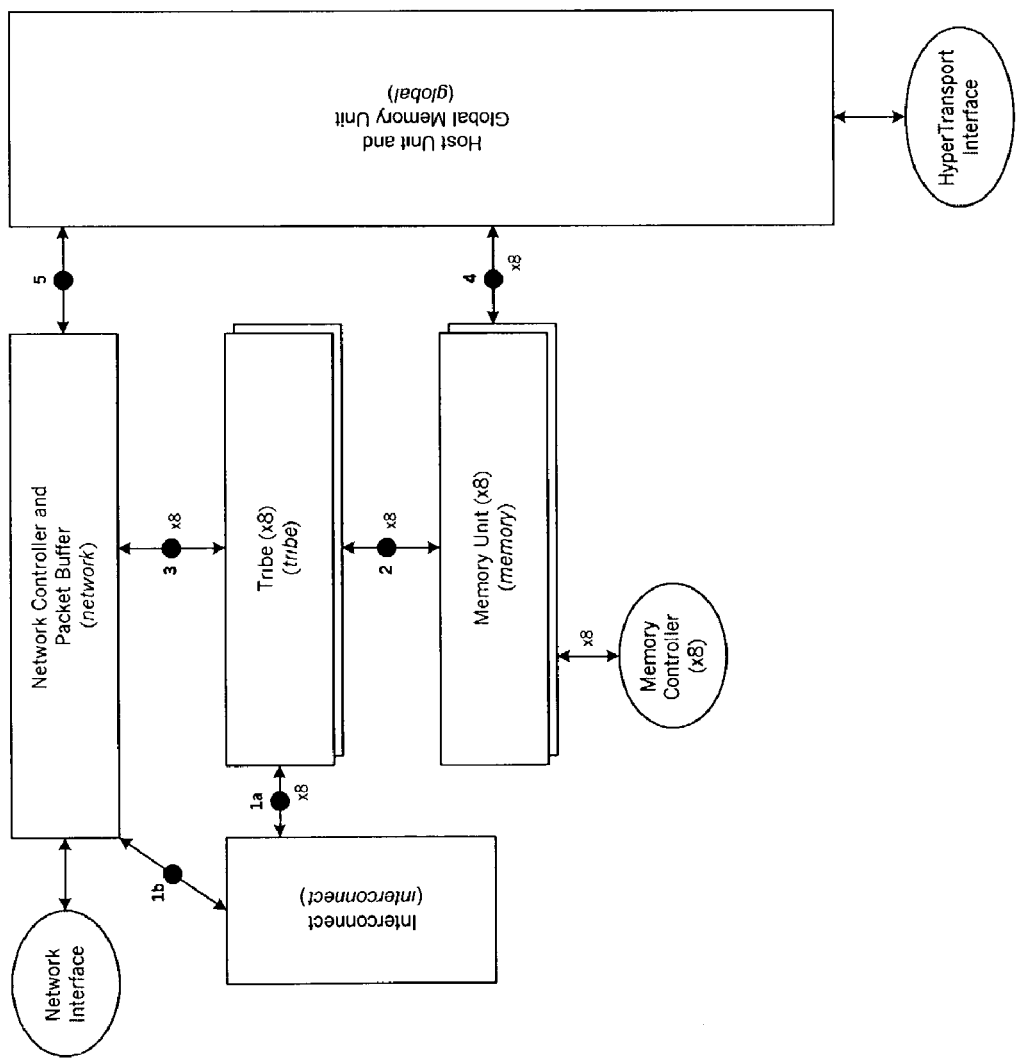
*Fig. 33 – Porthos Microarchitecture Block Diagram*

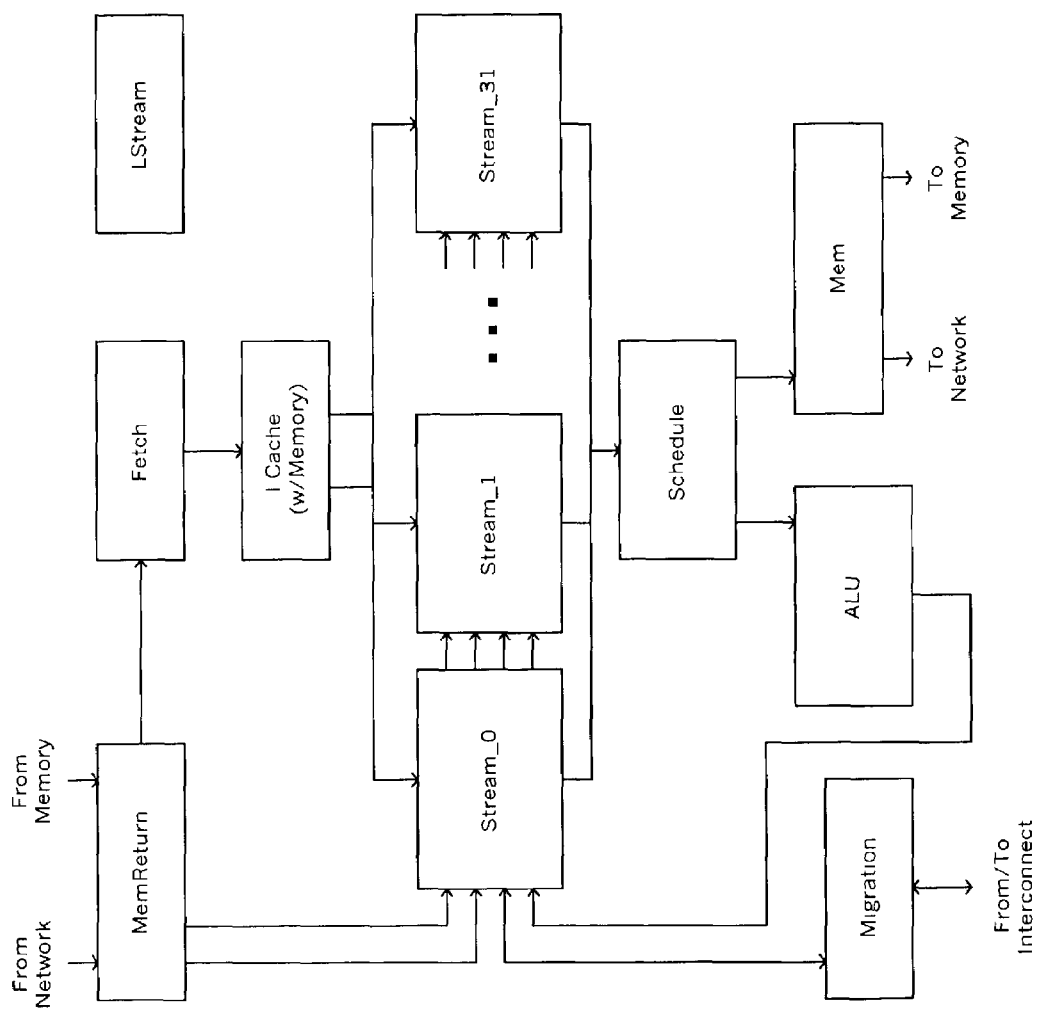
*Fig. 34 - Tribe Microarchitecture Block Diagram*

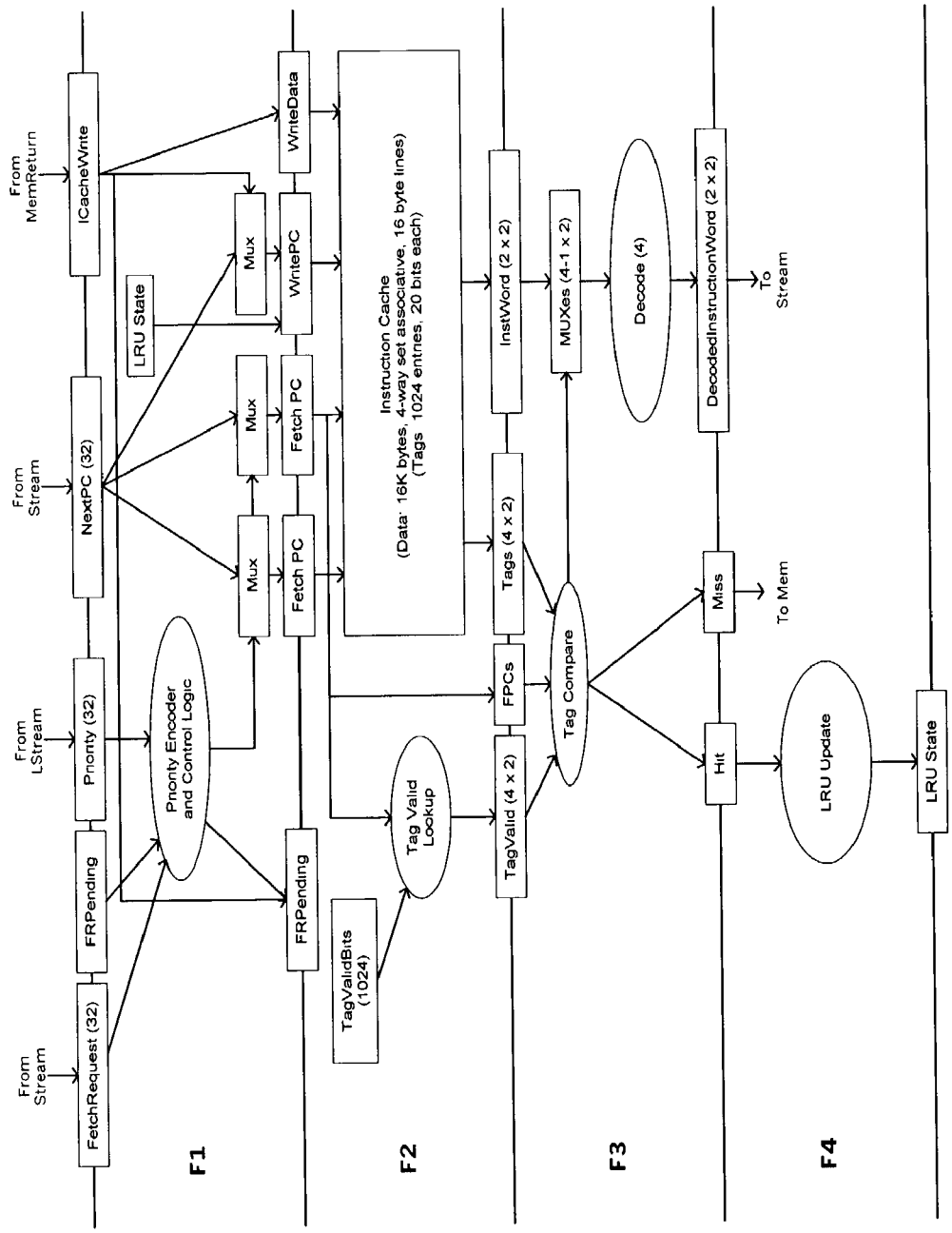
*Fig. 35 – Fetch Pipeline*

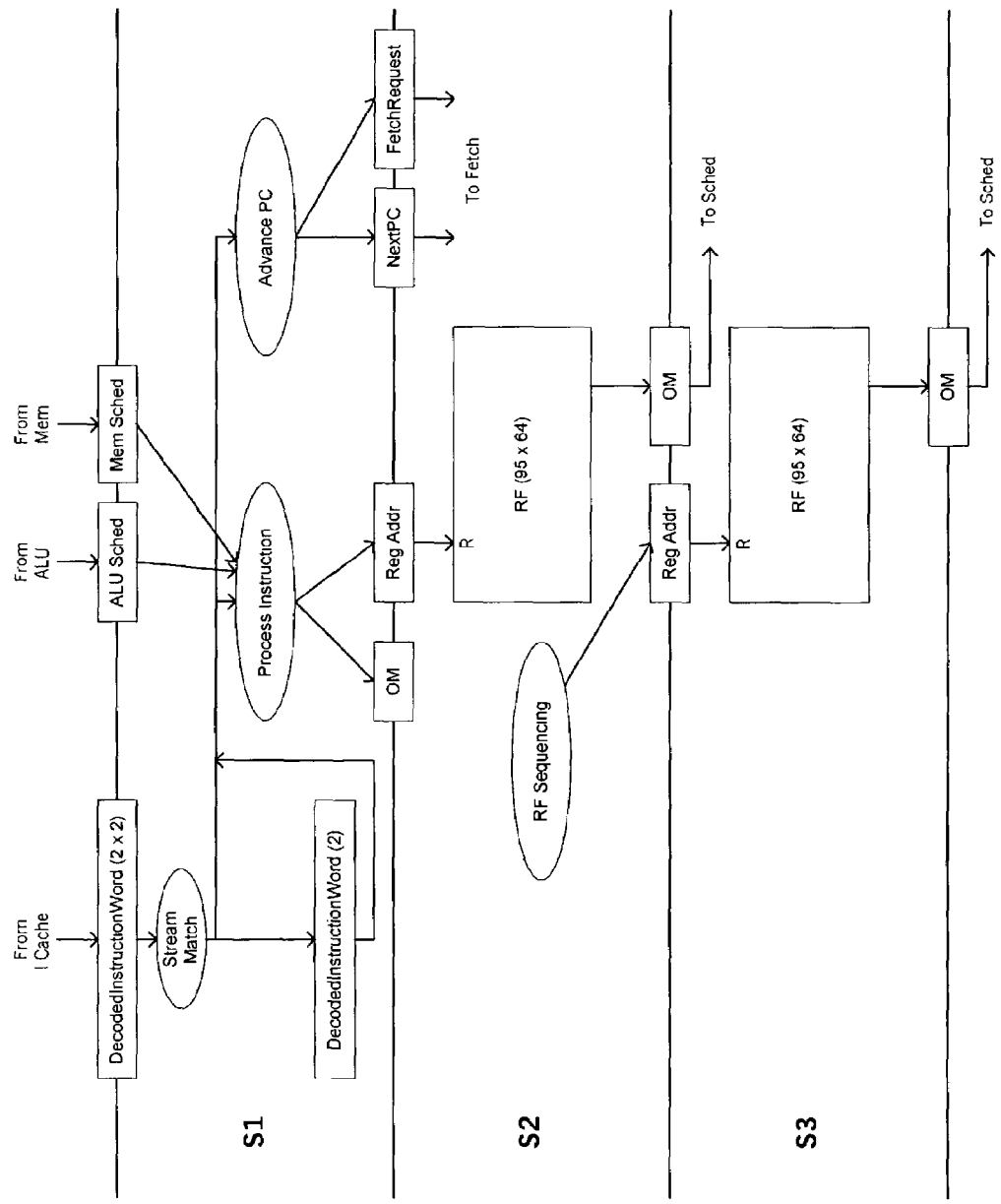
Fig. 36 - Stream Pipeline, Instruction Processing and Operand Read

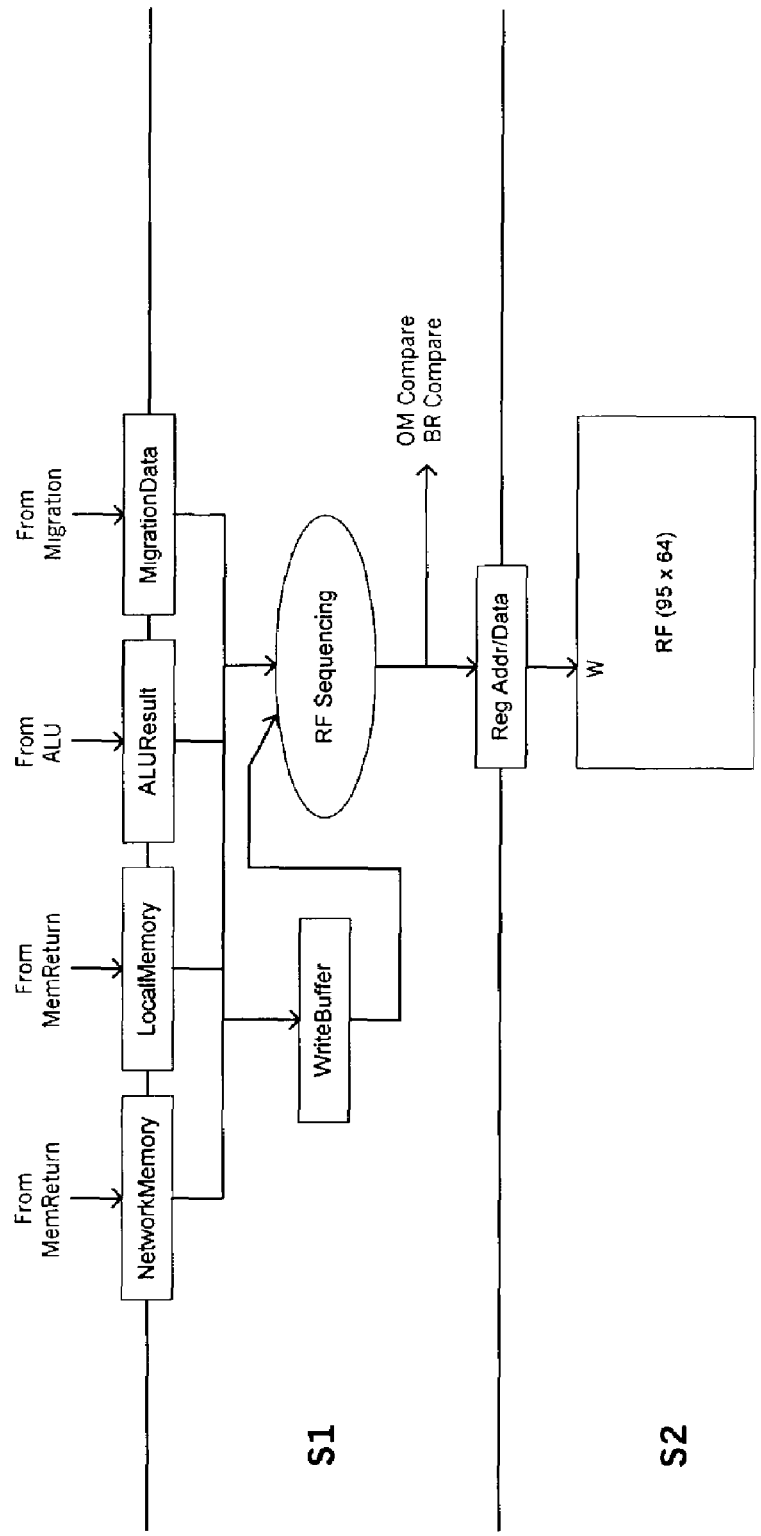
Fig. 37 – Stream Pipeline, Operand Write

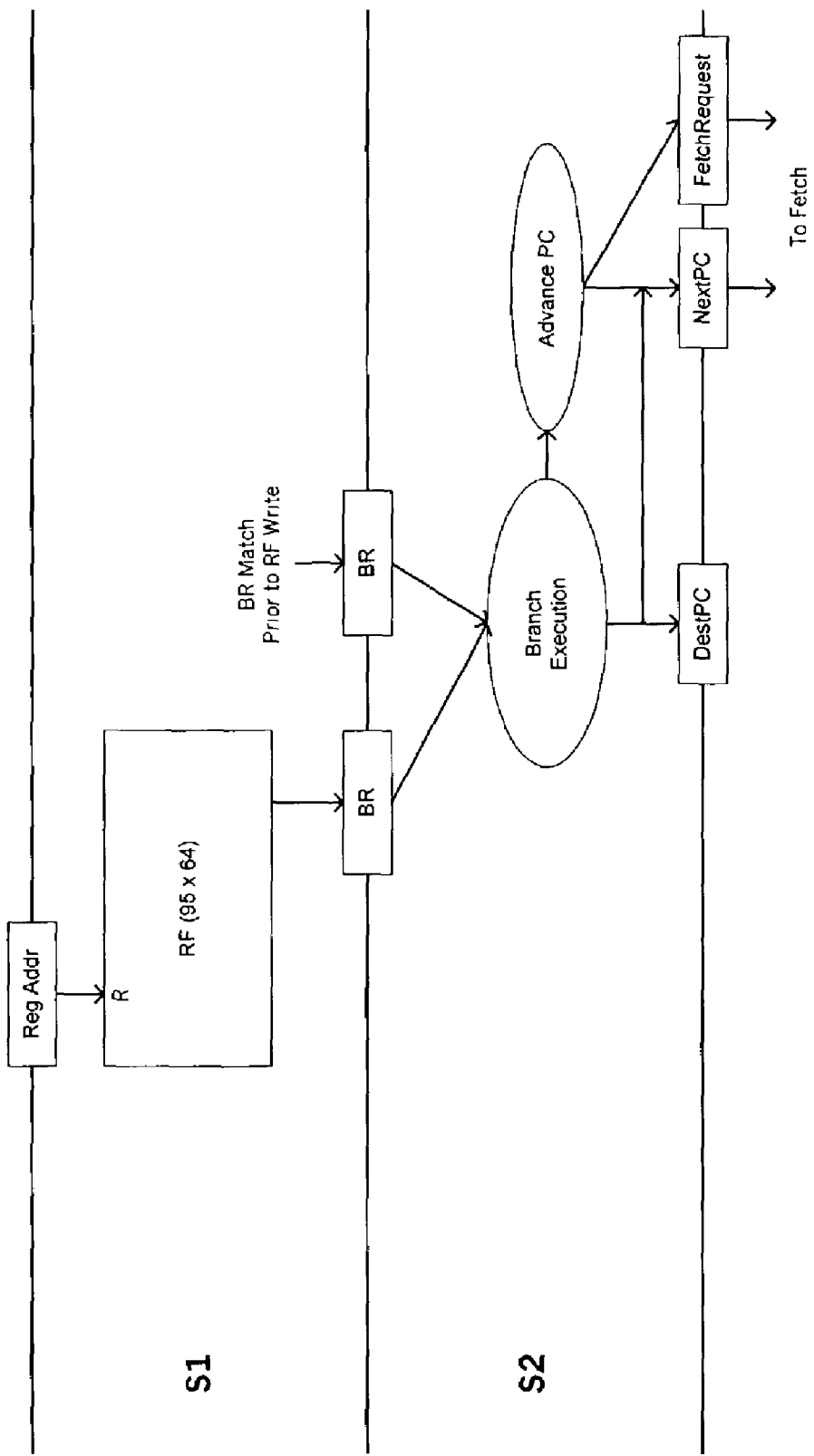
Fig. 38 - Stream Pipeline, Branch Execution

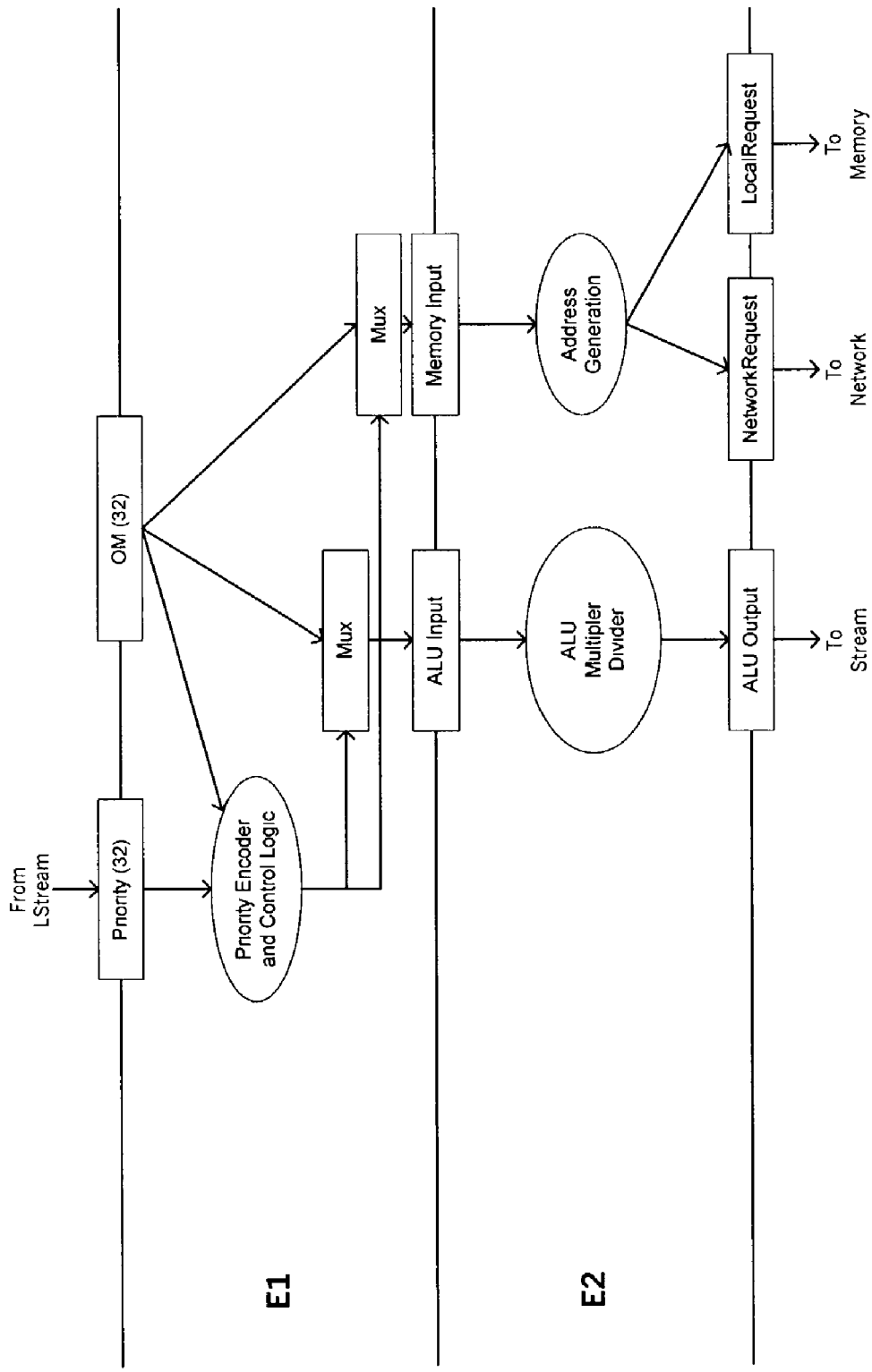
Fig. 39 – Execute Pipeline

MULTI-THREADED PACKET PROCESSING ENGINE FOR STATEFUL PACKET PROCESSING

CROSS-REFERENCE TO RELATED DOCUMENTS

The present patent application is a non-provisional application claiming priority to three provisional patent applications as follows: 60/325,638 filed on Sep. 28, 2001, 60/341,689 filed Dec. 17, 2001, and 60/388,278, filed on Jun. 13, 2002. Each of these priority documents is incorporated in its entirety herein, at least by reference.

FIELD OF THE INVENTION

The present invention is in the field of high-performance central processing units (CPUs), and pertains more particularly to a multithreaded processor for processing packets in a network environment.

BACKGROUND OF THE INVENTION

The term packet processing as used in the instant specification refers to performing various digital operations (processing) on packets in a packet data network, such as the well-known Internet network, for example for the purpose of routing said packets through a router or through a point-to-point network. It is well known that there are multiple types of packets, and that packets of a same type may belong to different flows, a flow referring generally to the combination of source and destination. As an example, all packets carrying information for Internet Protocol Network Telephony events will be of the same type. Among these packets, those that belong to a specific conversation between two particular people at a particular time belong to the same flow.

It is also well known in the art that data packets, in general, have a header portion and a data portion. The header portion typically comprises data fields of standard digital form and length that identify such things as the packet type, the source, and the destination. A packet processing engine, then, may know the type and flow for a packet by referencing the header fields.

In packet processing engines it is typically necessary, when a packet is received to be processed, to determine an appropriate rule for processing the packet. The rule is the recipe of what to do regarding the particular packet, and the recipe can be any one of a relatively large number of functions, such as packet dropping (discard), forwarding to a next hop, load balancing, encryption, and much more. Clearly the performance of packet processing systems and equipment is related to the ability of the system to classify and identify packets, to select appropriate rules, and to perform the indicated processing. Improvement in efficiency, cost effectiveness and speed is always desirable.

SUMMARY OF THE INVENTION

In a preferred embodiment of the present invention a processing engine to accomplish a multiplicity of tasks is provided, the engine comprising a multiplicity of processing tribes, each tribe comprising a multiplicity of context register sets and a multiplicity of processing resources for concurrent processing of a multiplicity of threads to accomplish the tasks, a memory structure having a multiplicity of memory blocks, each block storing data for processing threads, and an interconnect structure and control system enabling tribe-to-tribe migration of contexts to move threads from tribe-to-tribe. The engine is characterized in that individual ones of the tribes have preferential access to individual ones of the multiplicity of memory blocks.

In a preferred embodiment there is preferential access from an individual one of the multiplicity of tribes to an individual one of the multiplicity of memory blocks by an individual one of a multiplicity of controlled memory ports. Also in a preferred embodiment the multiplicity of tribes, the multiplicity of memory blocks, and the multiplicity of memory ports are equal in number, and each tribe has a dedicated port to a memory block. In some embodiments processing tasks are received sequentially, an individual task received creating a thread, including a program counter and context, in a first one of the multiplicity of tribes.

In some cases the thread operating in the first one of the tribes is migrated via the interconnect structure to a second one of the tribes before completion of the task, by moving the program counter and at least a portion of the context to registers in the second one of the tribes. Also in some cases original assignment of tasks received to tribes is at least partially dependent on distribution of processing data among the memory blocks. The original assignment of tasks may be at least partly software controlled, or at least partly hardware controlled.

In some embodiments migration of a thread from one tribe to another tribe is at least partly dependent on distribution of processing data among the memory blocks. The direction and timing of migration from tribe to tribe may be at least partly software controlled, or at least partly hardware controlled.

In a preferred embodiment the processing engine is implemented at a first node in a data packet network wherein the tasks are generated by receipt of data packets and processing the packets for translation to a second node in the network. The packet network may be the Internet network.

In another aspect of the invention a method for concurrently processing a multiplicity of tasks is provided, the method comprising the steps of (a) implementing in a single processing engine a multiplicity of processing tribes, each tribe comprising a multiplicity of context register sets and a multiplicity of processing resources for concurrent processing of a multiplicity of threads to accomplish the tasks; (b) providing to the processing engine a memory structure having a multiplicity of memory blocks, each block storing data for processing threads, the memory blocks connected to the tribes in a way that individual ones of the tribes have preferential access to individual ones of the multiplicity of memory blocks; (c) connecting the tribes through an interconnect structure and control system enabling tribe-to-tribe migration of contexts to move threads from tribe-to-tribe; and (d) initiating a thread, including a program counter and context in registers, in a first one of the multiplicity of tribes for each task received.

In a preferred embodiment, in step (b), preferential access from an individual one of the multiplicity of tribes to an individual one of the multiplicity of memory blocks is provided by an individual one of a multiplicity of controlled memory ports. Also in a preferred embodiment, in step (b), the multiplicity of tribes, the multiplicity of memory blocks, and the multiplicity of memory ports are equal in number, and each tribe has a dedicated port to a memory block. Processing tasks may be received sequentially.

In a preferred embodiment there may further be a step wherein the thread operating in the first one of the tribes is migrated via the interconnect structure to a second one of the tribes before completion of the task associated with the thread, by moving the program counter and at least a portion of the context to registers in the second one of the tribes.

In some cases, in step (d), original assignment of tasks received to tribes is at least partially dependent on distribution of processing data among the memory blocks. The assignment may be largely hardware controlled, or largely software controlled.

In some cases migration of a thread from one tribe to another tribe may be at least partly dependent on distribution of processing data among the memory blocks, and the direction and timing may be either largely hardware controlled, or largely software controlled.

In a preferred embodiment of the invention the engine is implemented at a first node in a data packet network wherein the tasks are generated by receipt of data packets and processing the packets for translation to a second node in the network. The data packet network may be the Internet network.

BRIEF DESCRIPTION OF THE DRAWING FIGURES

FIG. 2 is a memory map for the packet processing engine in an embodiment of the present invention.

FIG. 3 illustrates detail of the address space for the packet processing engine in an embodiment of the present invention.

FIGS. 4a through FIG. 4d comprise a list of configuration registers for a packet processing engine according to an embodiment of the present invention.

FIG. 5 illustrates hashing function hardware for the packet processing engine in an embodiment of the present invention.

FIG. 6 is a table that lists performance events for the packet processing engine in an embodiment of the present invention.

FIG. 7 lists egress channel determination for the packet processing engine in an embodiment of the present invention.

FIG. 8 lists egress port determination for the packet processing engine in an embodiment of the present invention.

FIG. 9 indicates allowed degree of interleaving for the packet processing engine in an embodiment of the present invention.

Figure 10:
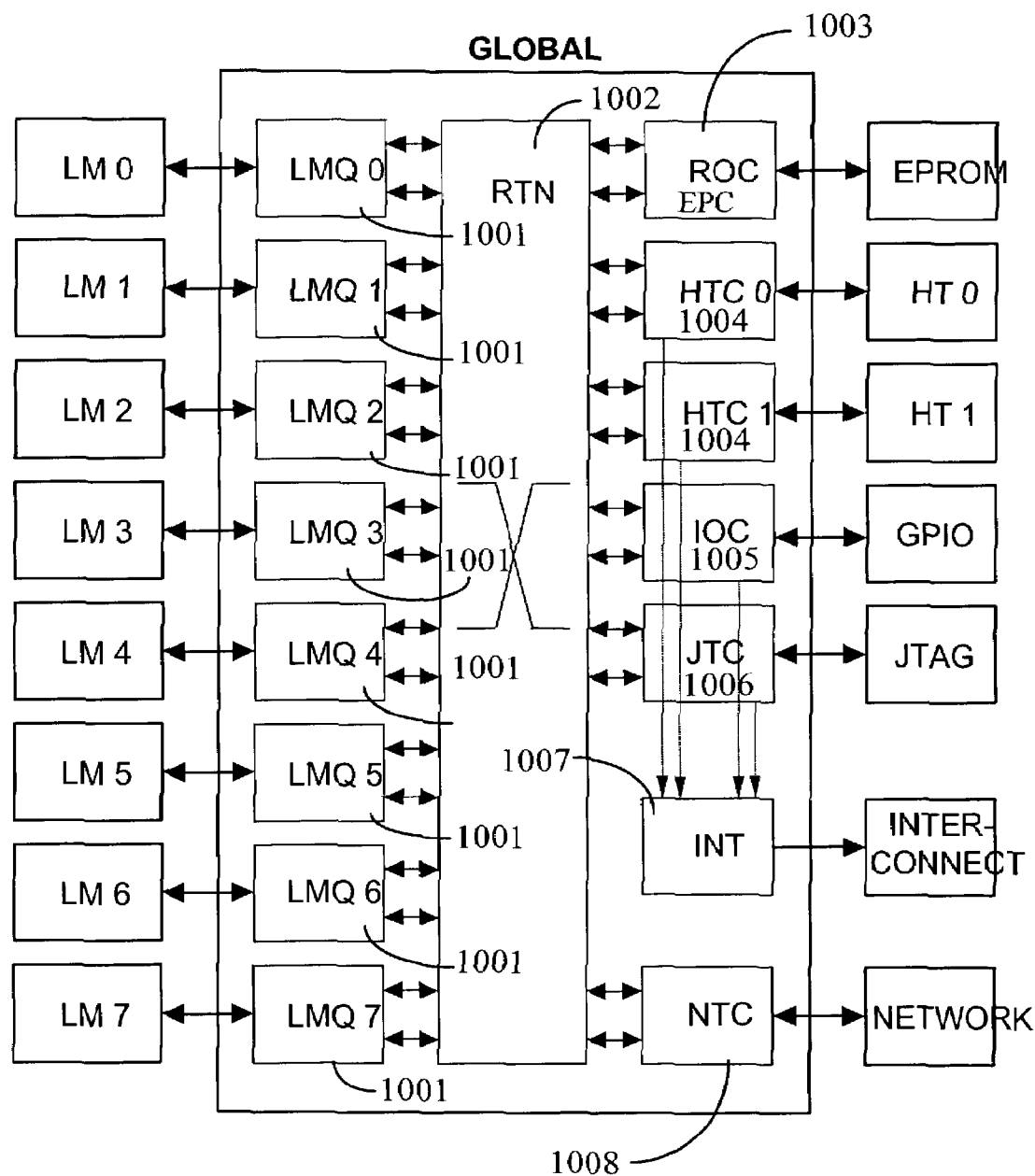

FIG. 10 is an illustration of Global block architecture in an embodiment of the invention.

Figure 11:
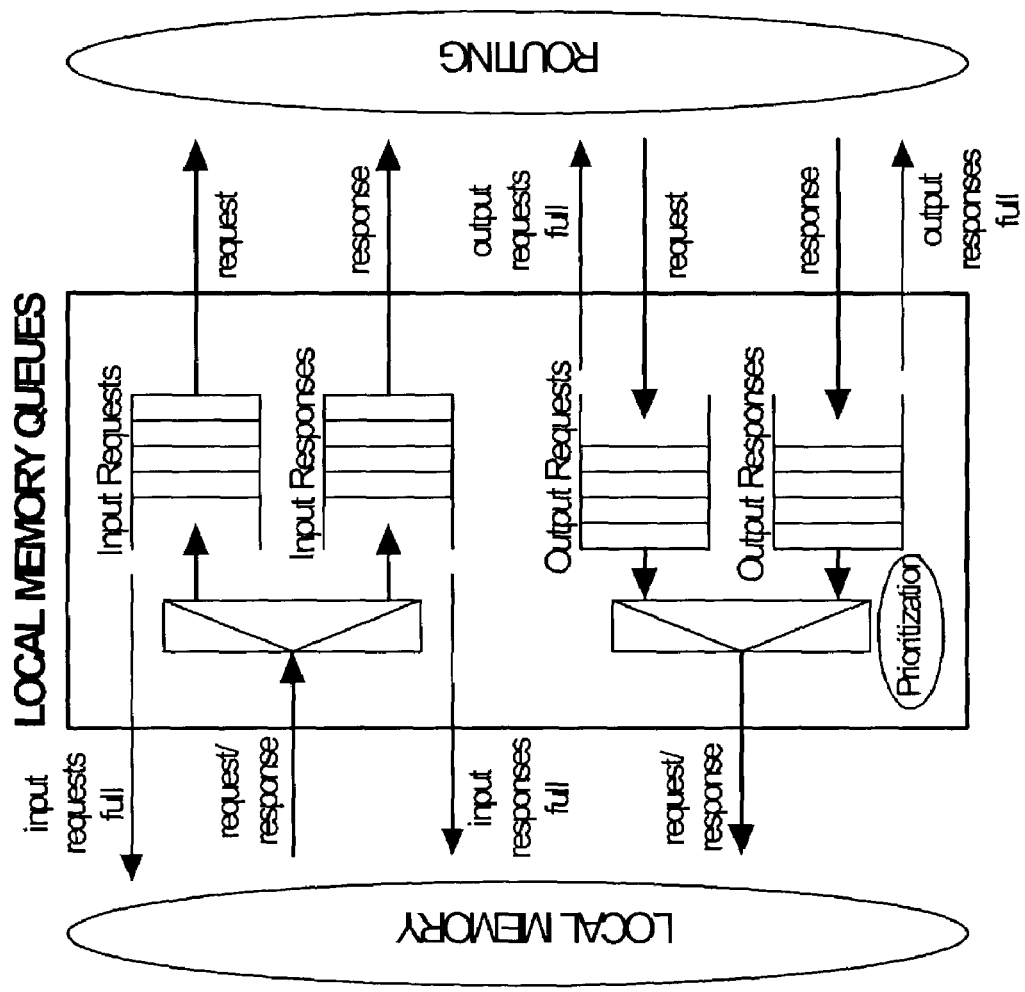

FIG. 11 is an expanded view showing internal components of the Global block.

Figure 12:
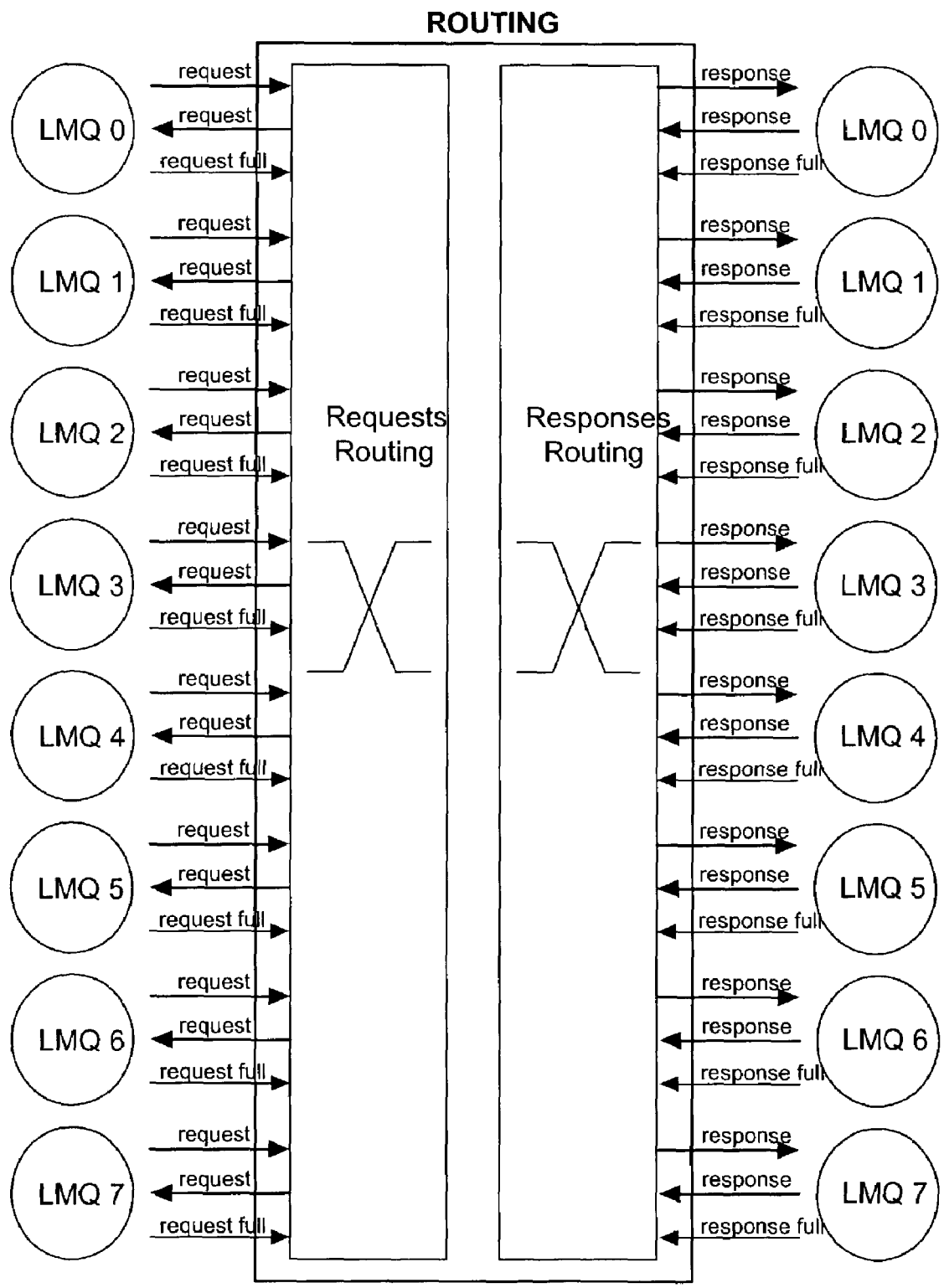

FIG. 12 is an illustration of a Routing block in an embodiment of the invention.

FIG. 13 is a table indicating migration protocol between tribes.

Figure 14:
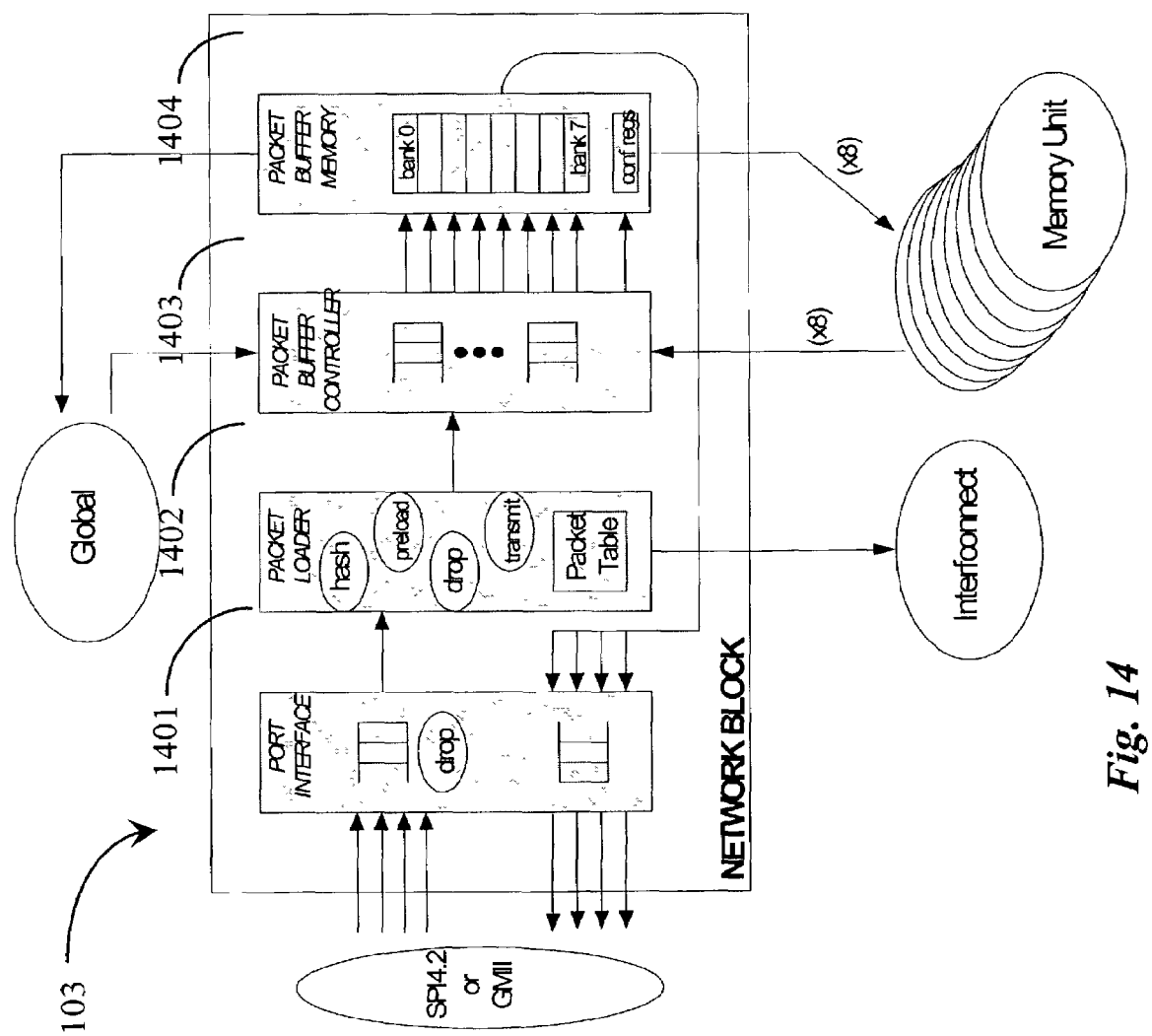

FIG. 14 is a block diagram of the Network Unit for an embodiment of the invention.

Figure 15:
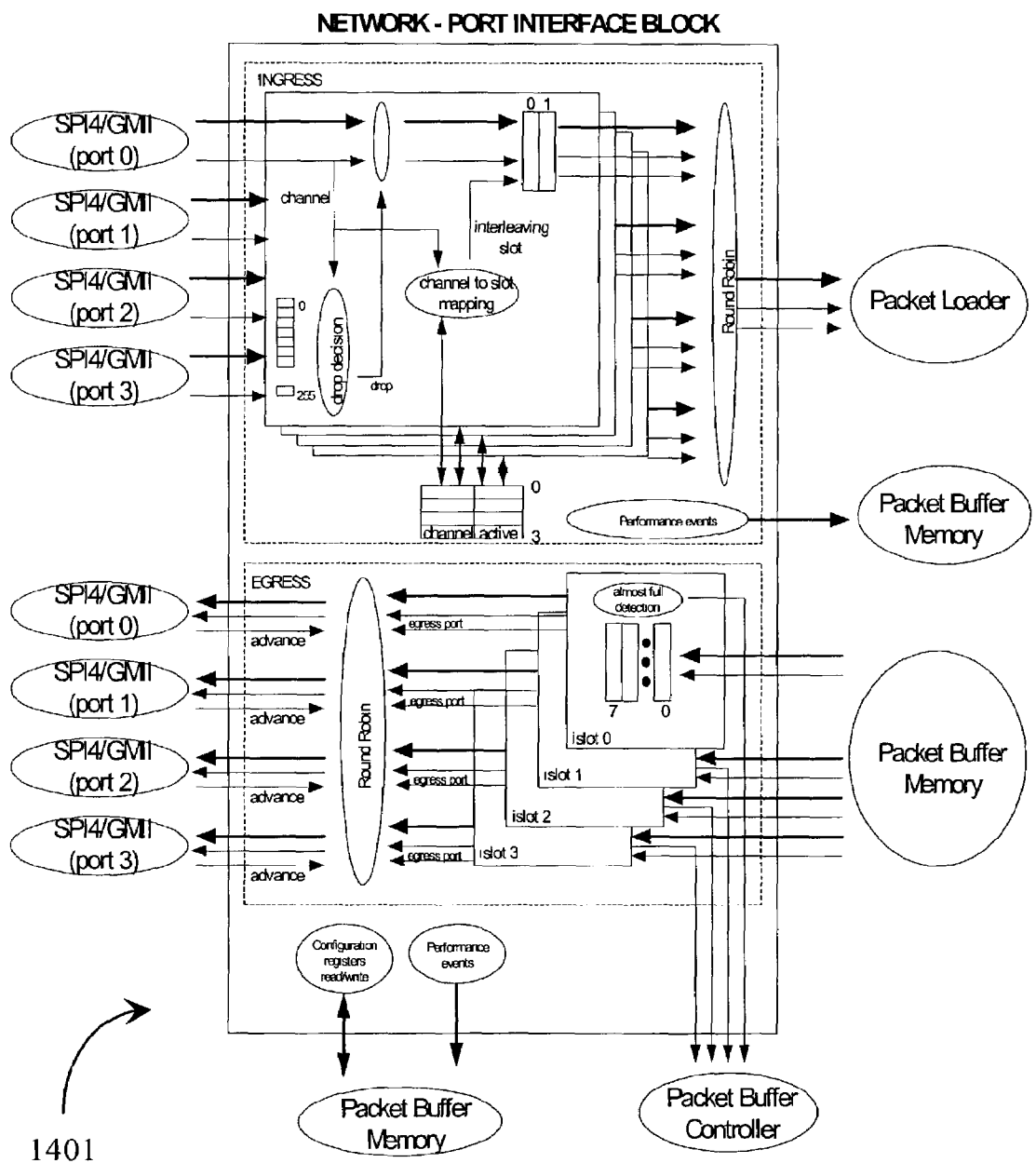

FIG. 15 is a diagram of a Port Interface block in the Network Unit in an embodiment.

Figure 16:
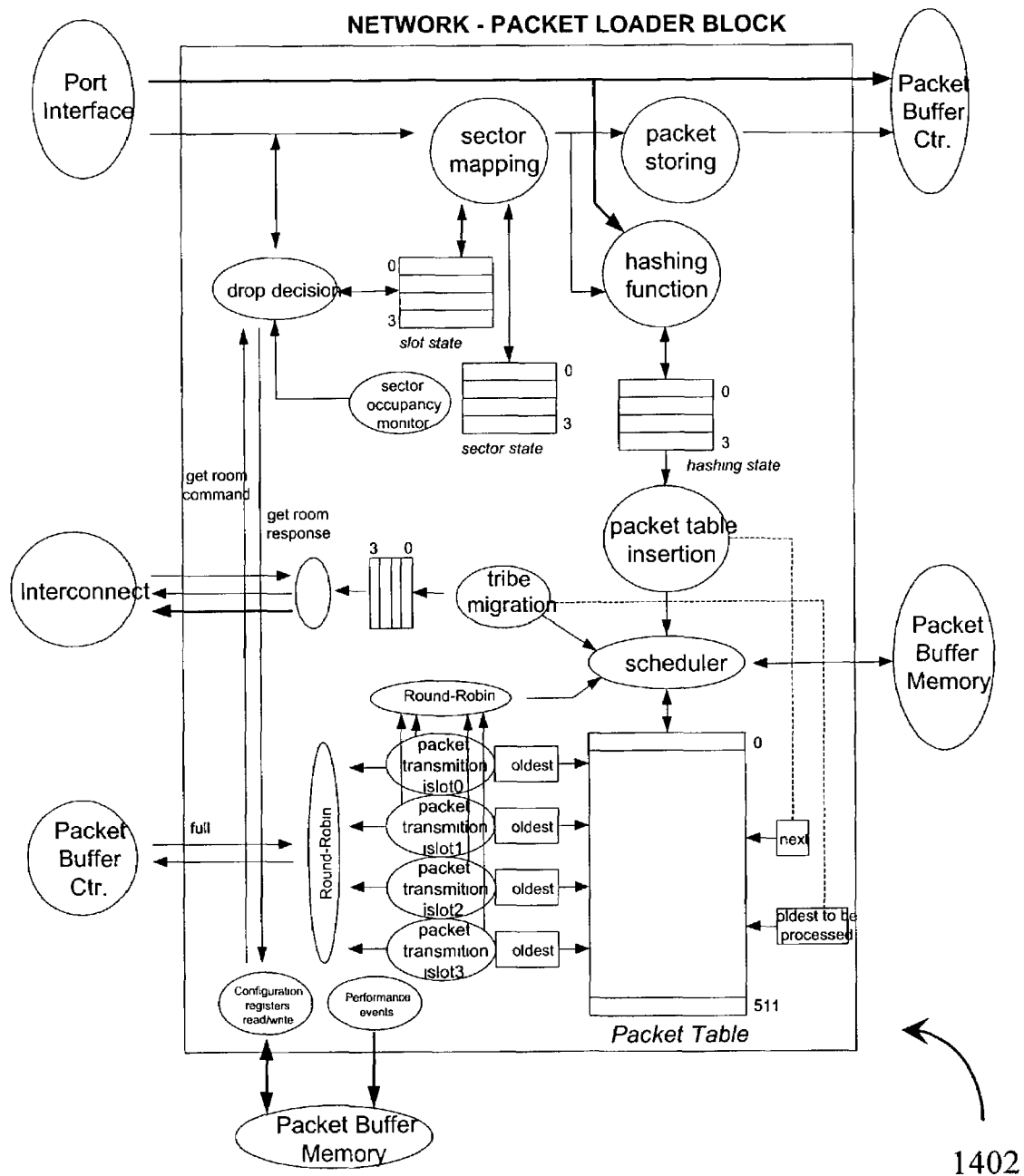

FIG. 16 is a diagram of a Packet Loader Block in the Network Unit in an embodiment of the invention.

Figure 17:
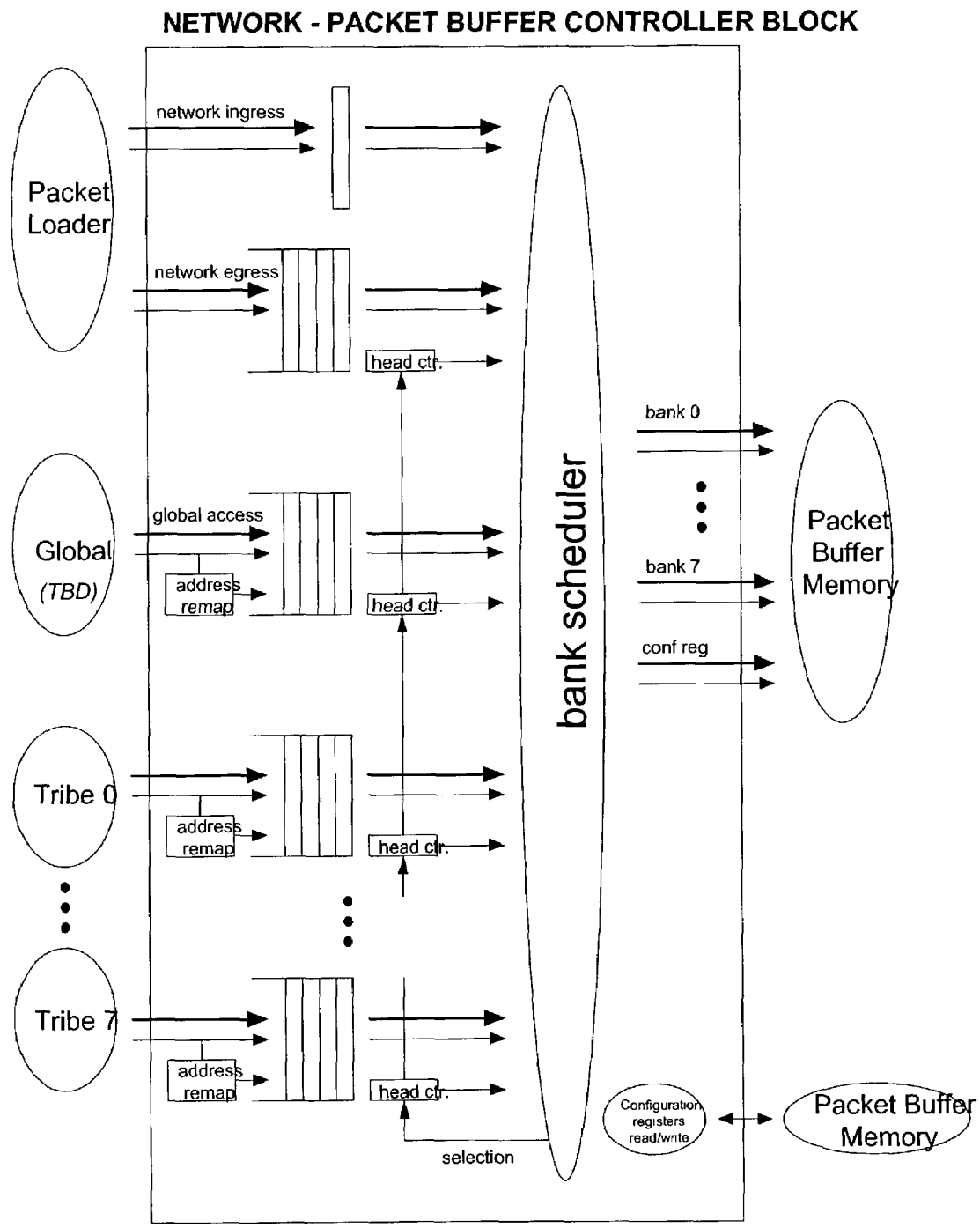

FIG. 17 is a diagram of a Packet Buffer Control Block in an embodiment.

Figure 18:
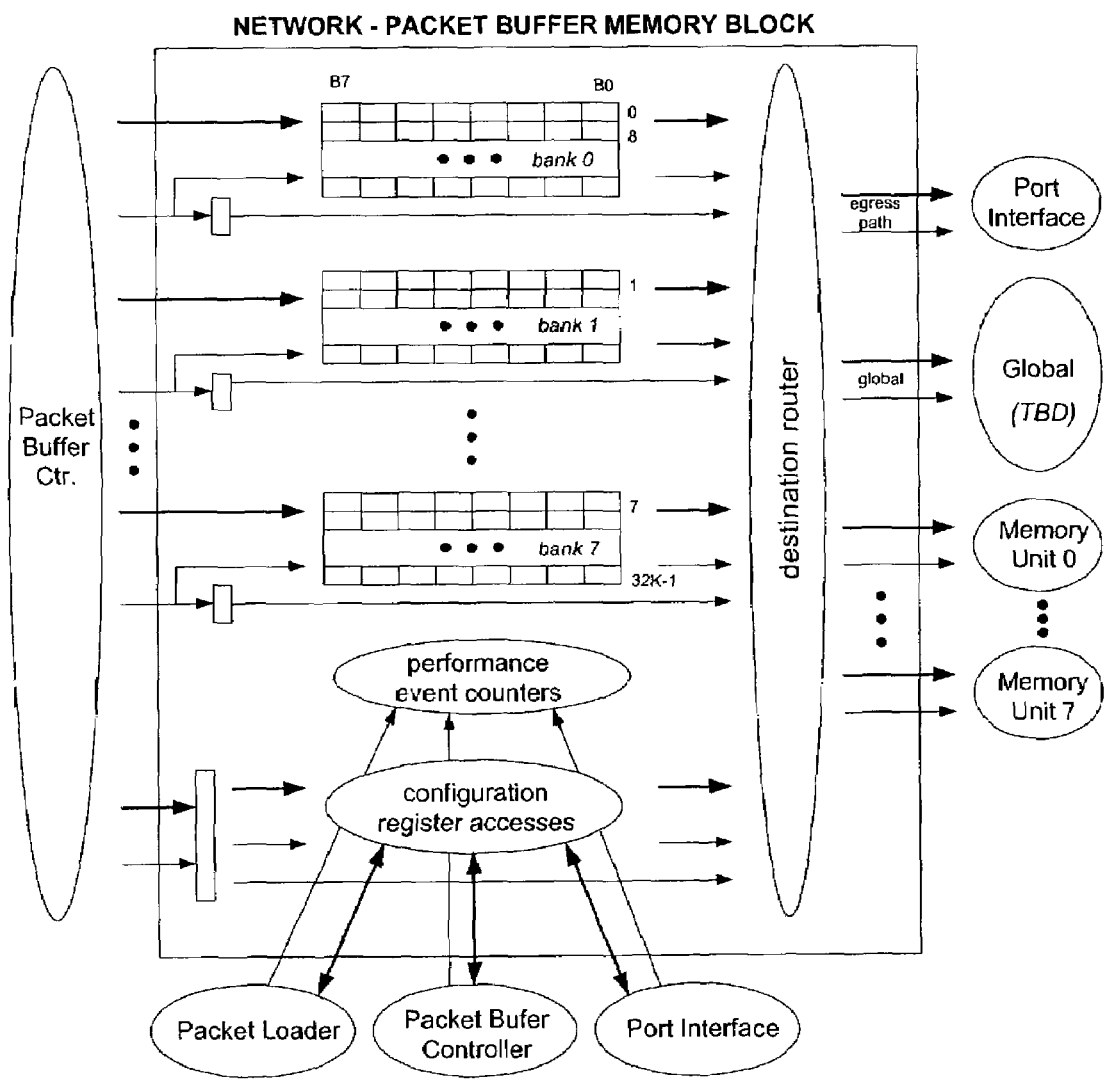

FIG. 18 is a diagram of a Packet Buffer Memory Block in an embodiment.

FIG. 19 is a table illustrating the interface between a Tribe and the Interconnect Block.

FIG. 20 is a table illustrating the interface between the Network Block and the Interconnect Block.

FIG. 21 is a table illustrating the interface between the Global Block and the Interconnect Block.

Figure 22:
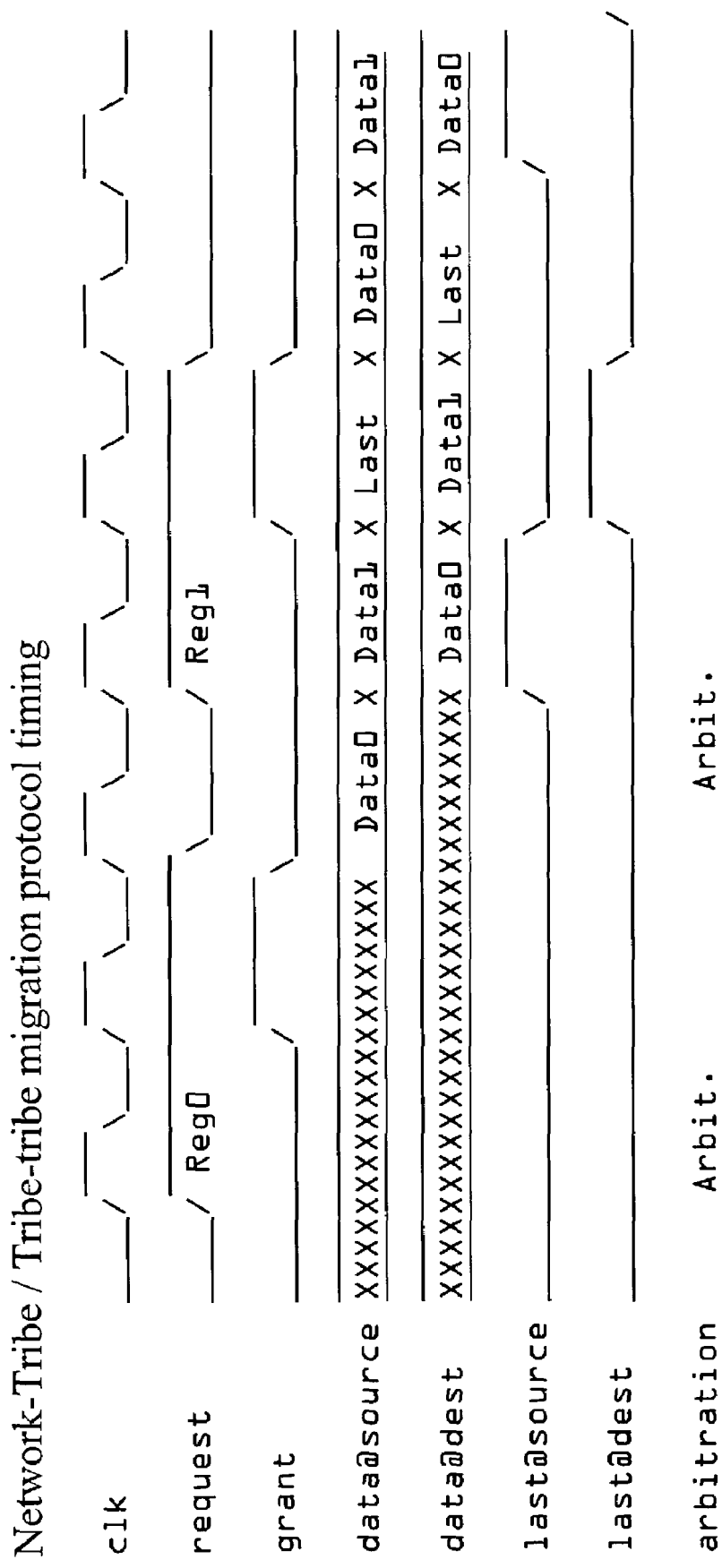

FIG. 22 is a diagram indicating migration protocol timing in the Interconnect Block.

FIG. 23 is a table illustrating the interface between a Tribe and a Memory Interface block in an embodiment of the invention.

FIG. 24 is a table illustrating the interface between the Global Block and a Memory Interface block in an embodiment of the invention.

FIG. 25 is a table illustrating the interface between a Memory Controller and a Memory Interface block in an embodiment of the invention.

Figure 26:
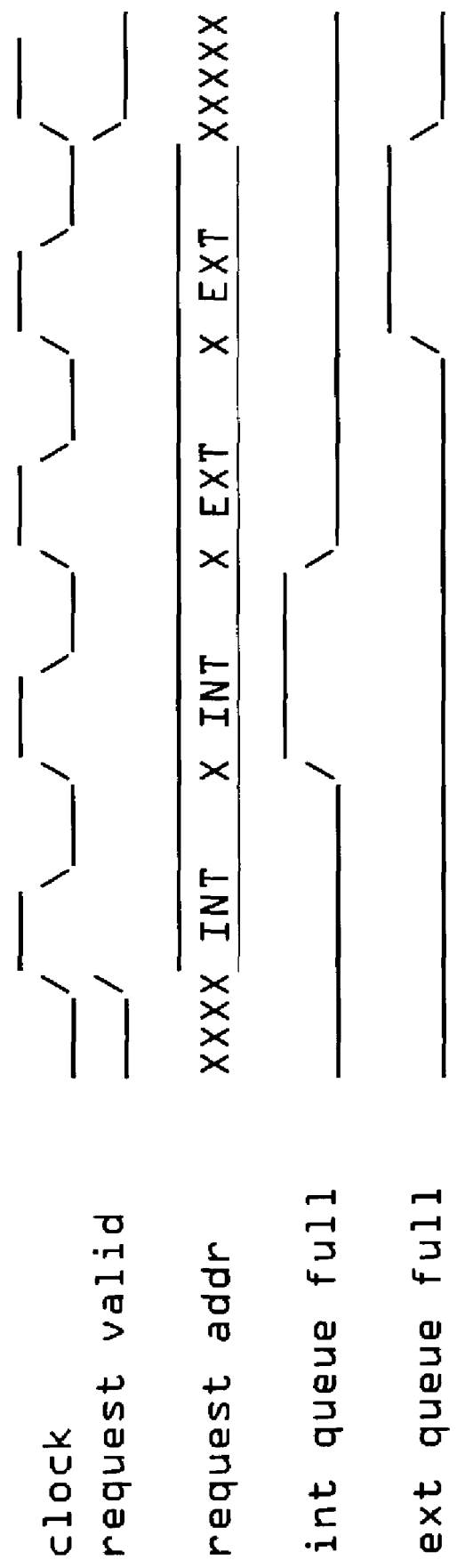

FIG. 26 shows tribe to memory interface timing in an embodiment of the invention.

Figure 27:
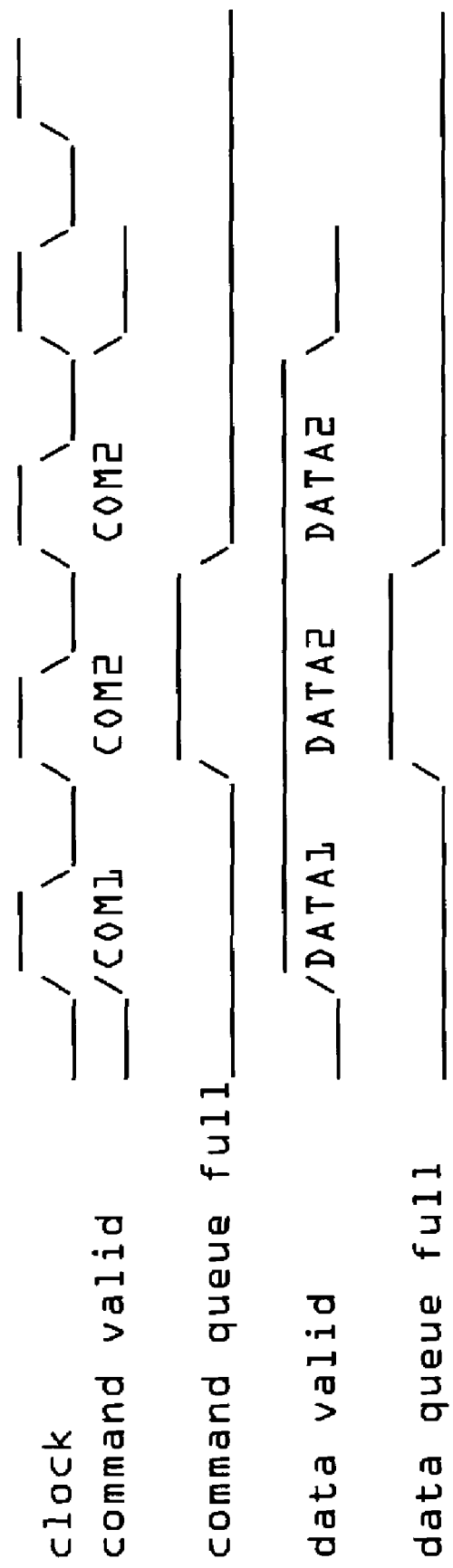

FIG. 27 shows tribe memory interface to controller timing.

Figure 28:
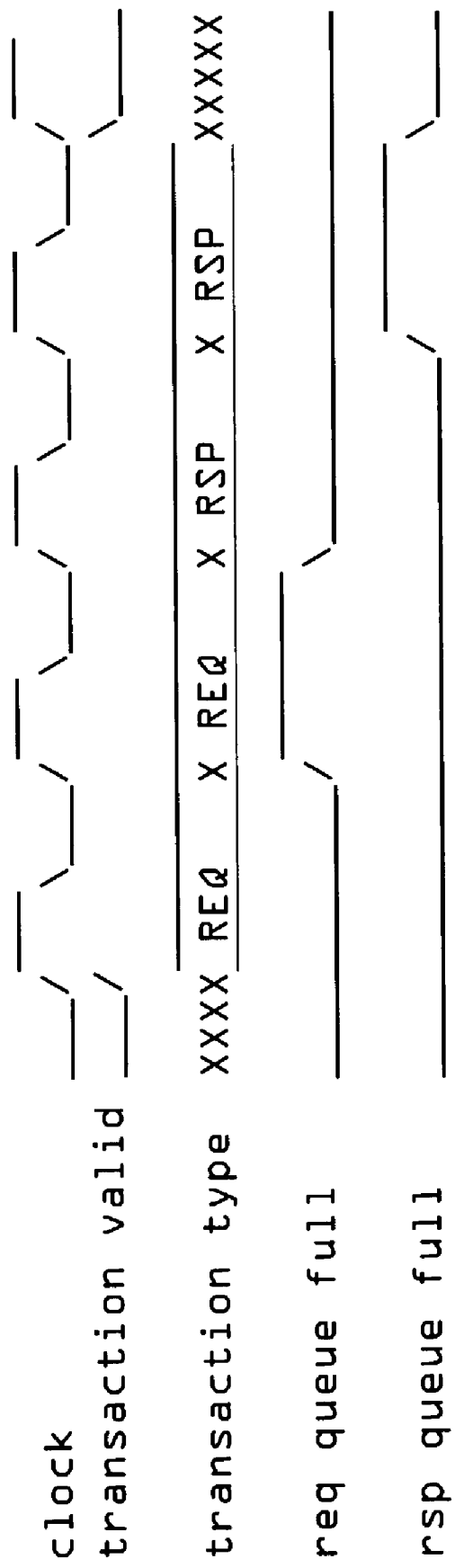

FIG. 28 shows tribe memory interface to Global timing.

Figure 29:
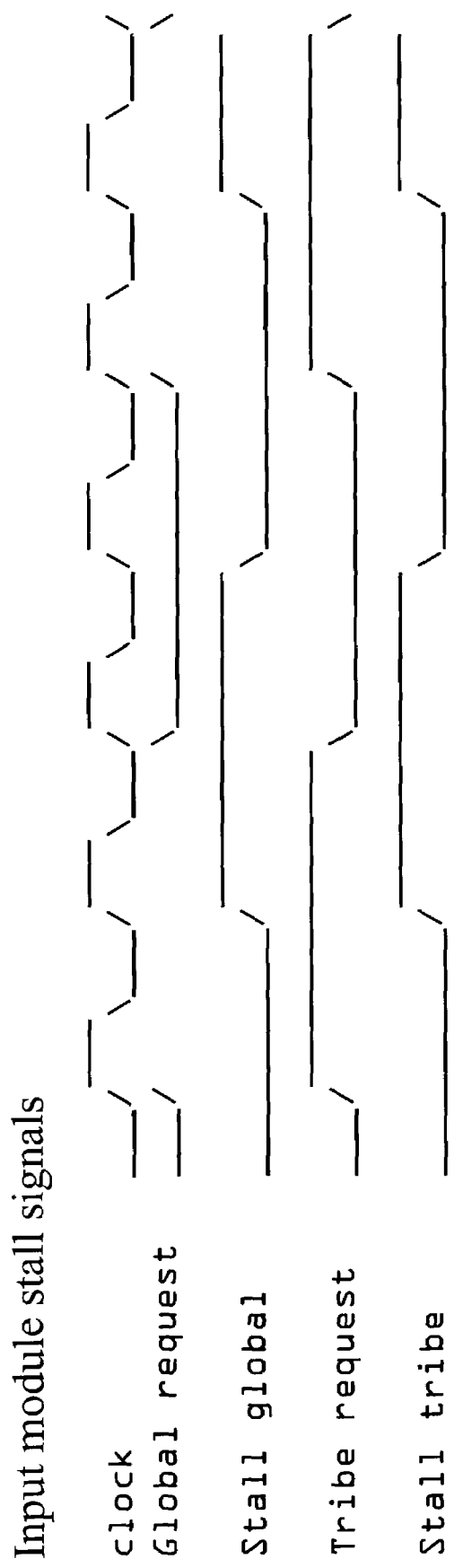

FIG. 29 shows input module stall signals in a memory block.

FIG. 30 is a table illustrating the interface between a Tribe and a Memory Block in an embodiment of the invention.

FIG. 31 is a table illustrating the interface between a Tribe and the Network Block in an embodiment of the invention.

FIG. 32 is a table illustrating the interface between a Tribe and the Interconnect block in an embodiment of the invention.

FIG. 33 is a block diagram of an embodiment of the invention.

FIG. 34 is a Tribe microarchitecture block diagram.

FIG. 35 is shows a fetch pipeline in a tribe in an embodiment of the invention.

FIG. 36 is a diagram of a Stream pipeline in tribe architecture.

FIG. 37 is a stream pipeline, indicating operand write.

FIG. 38 is a stream pipeline, indicating branch execution.

FIG. 39 illustrates an execute pipeline.

Figure 40:
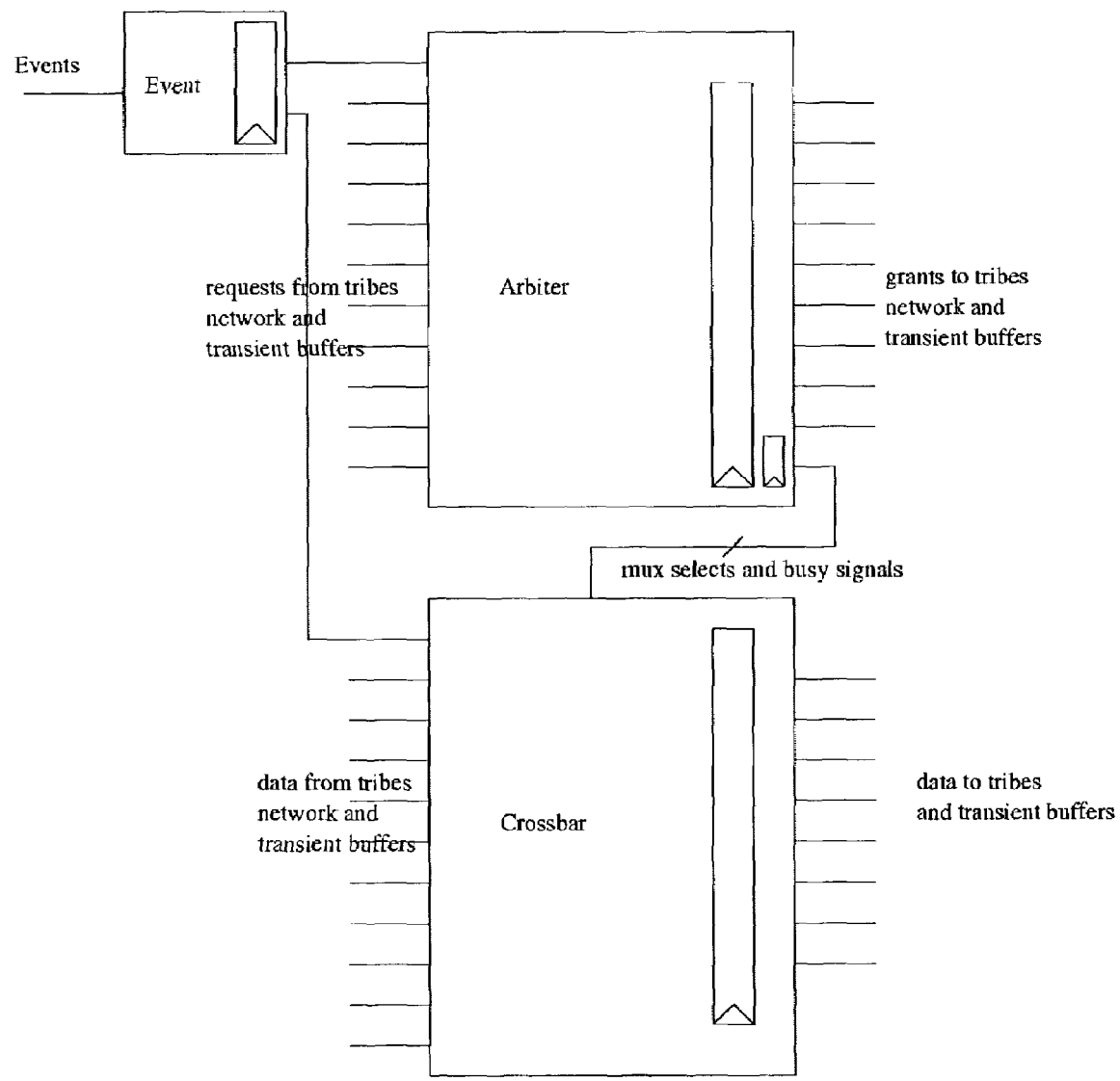

FIG. 40 illustrates interconnect modules.

Figure 41:
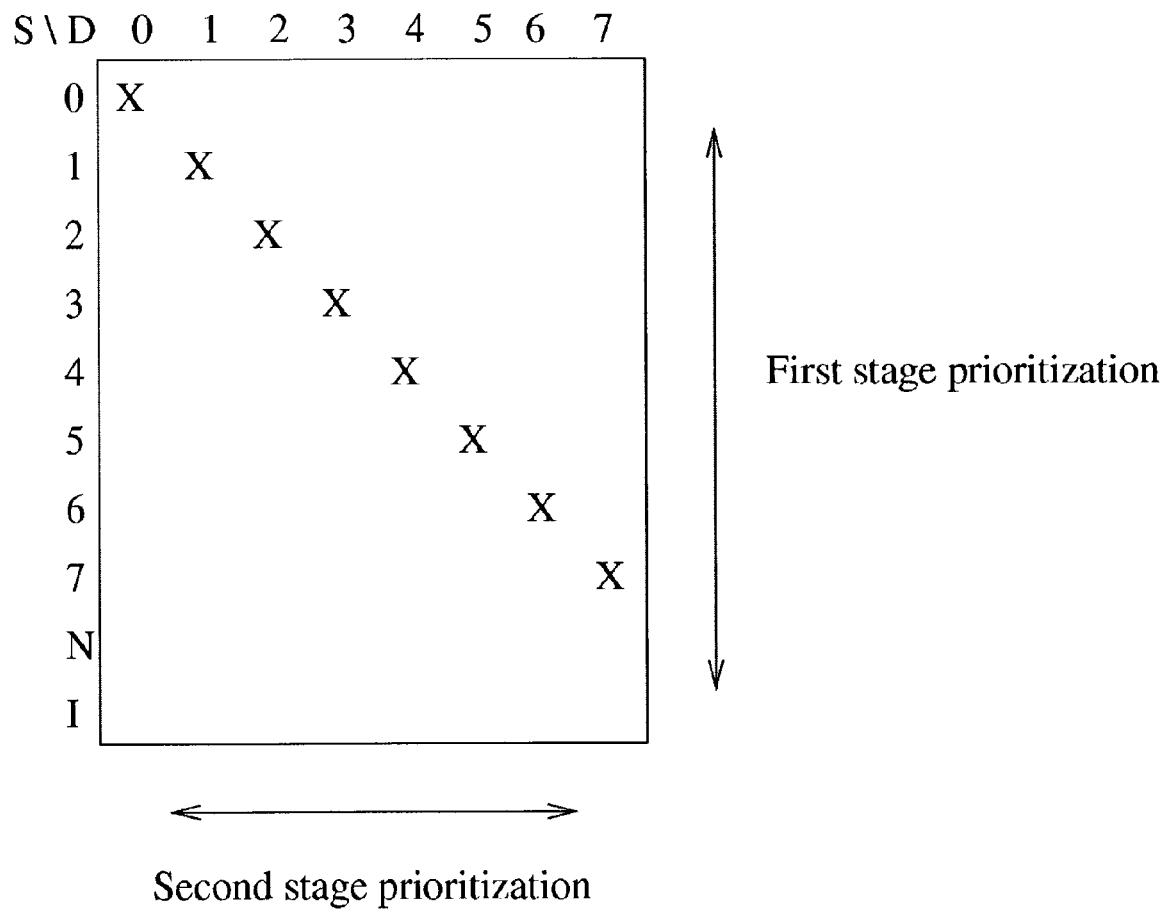

FIG. 41 illustrates a matching matrix for the arbitration problem.

Figure 42:
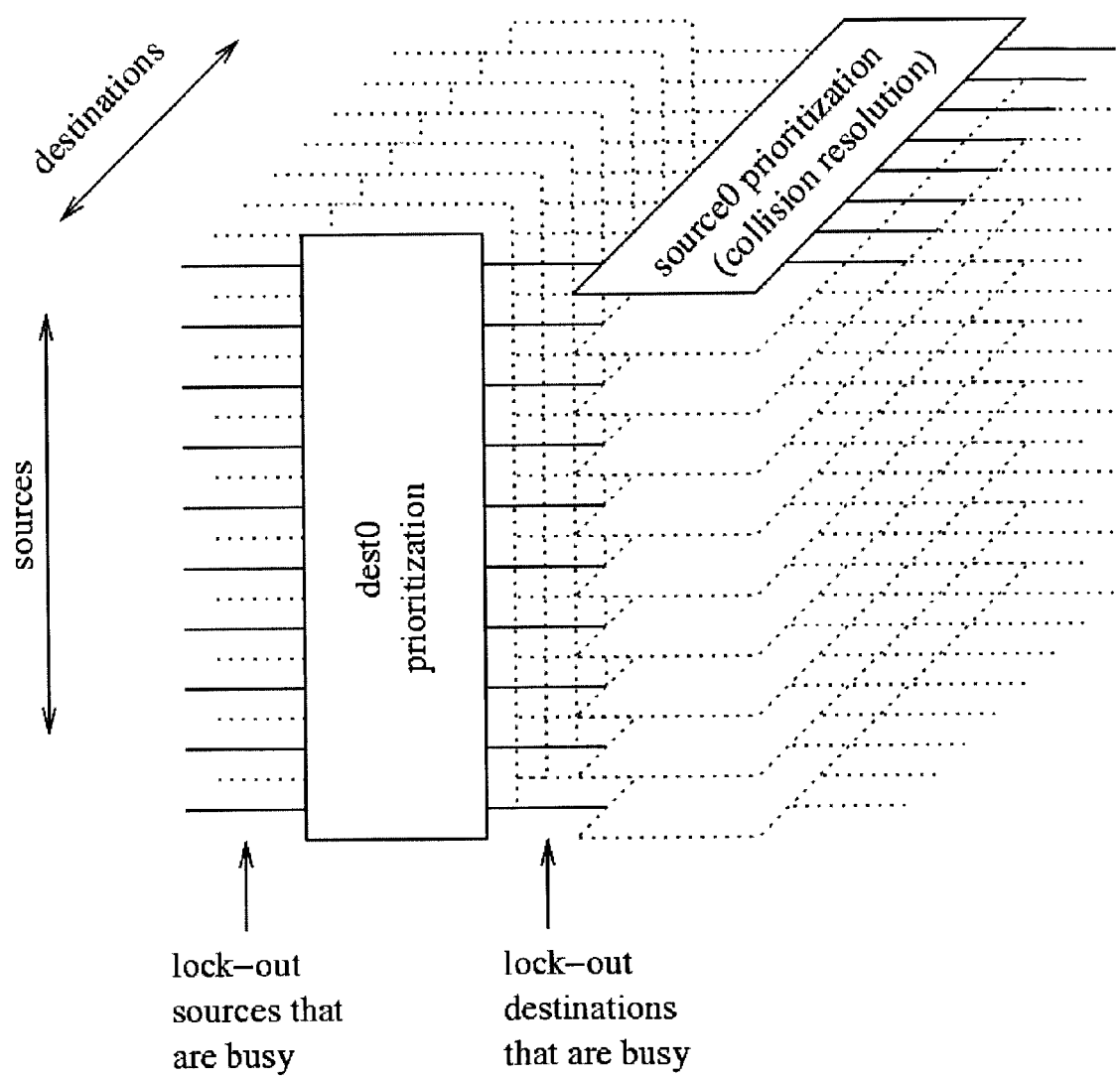

FIG. 42 illustrates arbiter stages.

Figure 43:
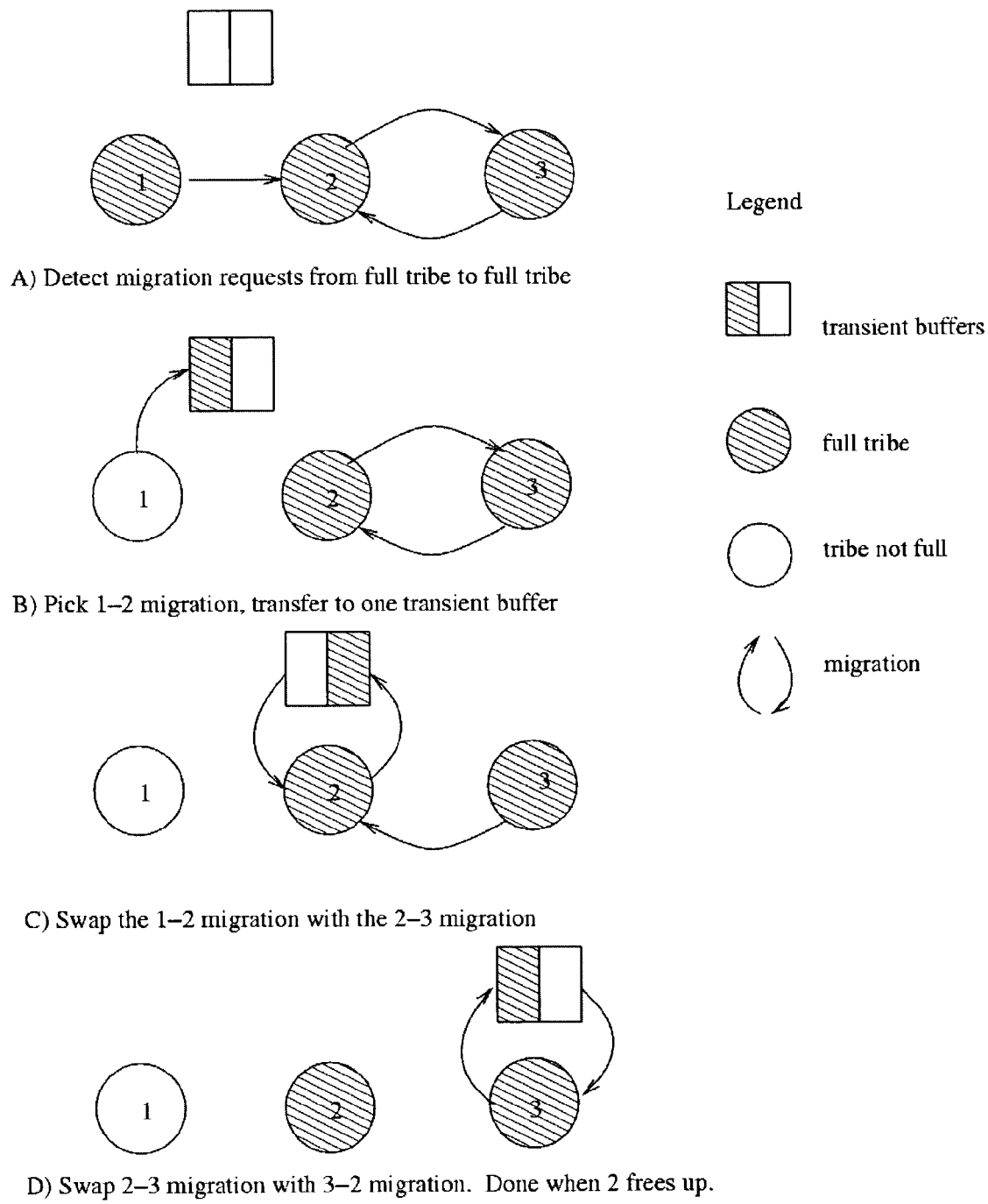

FIG. 43 illustrates deadlock resolution.

Figure 44:
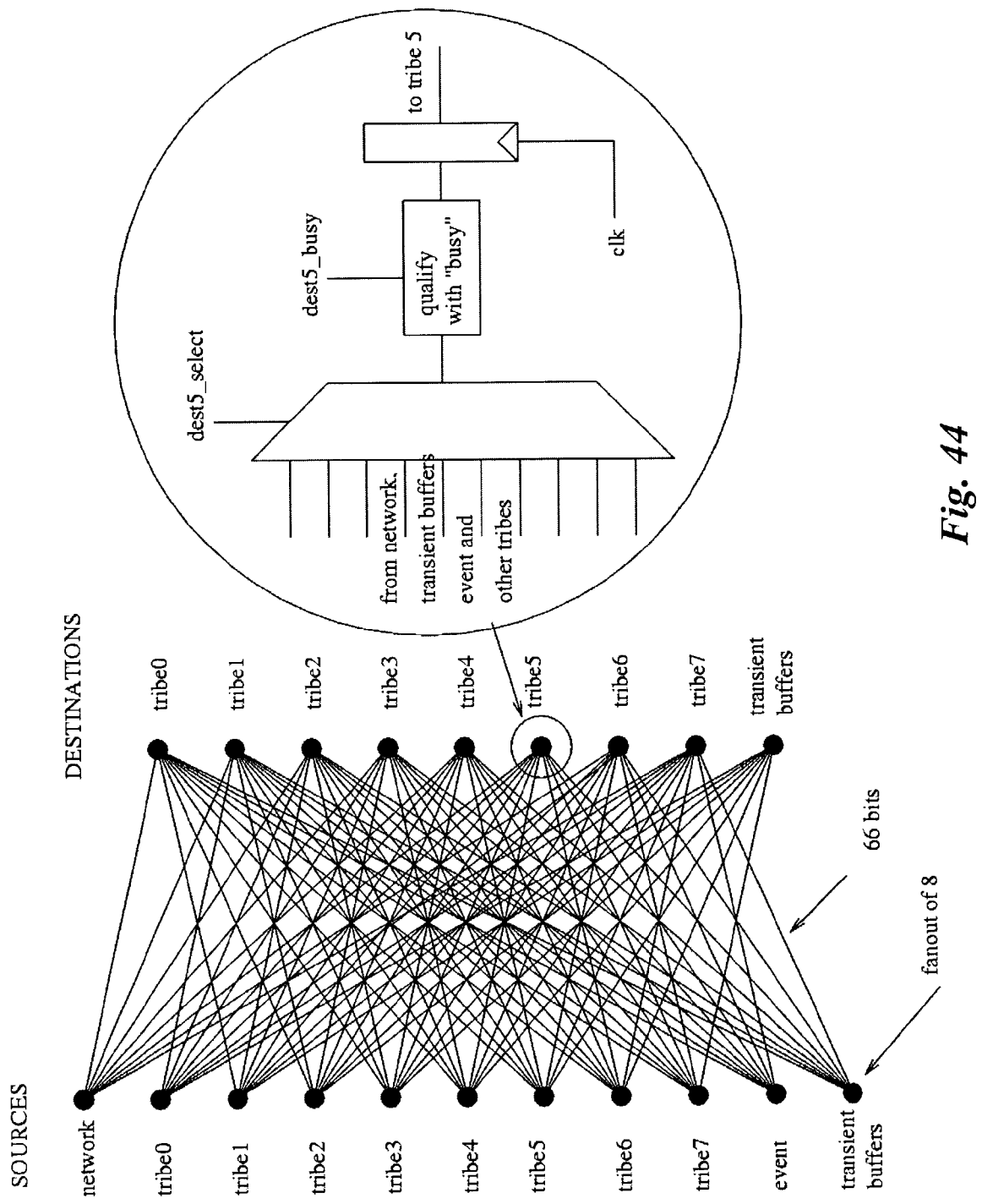

FIG. 44 is an illustration of a crossbar module.

Figure 45:
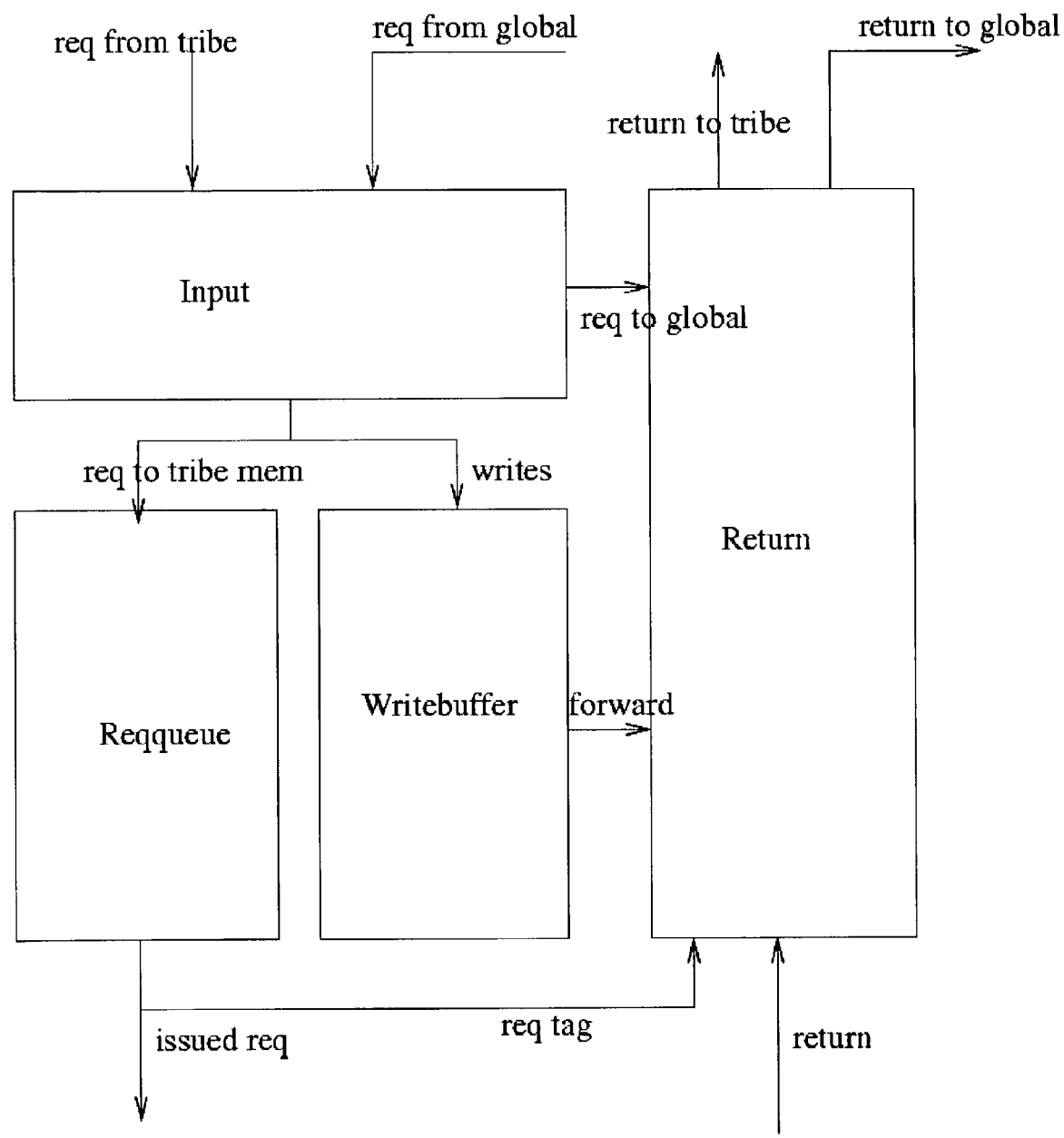

FIG. 45 illustrates the tribe to memory interface modules.

Figure 46:
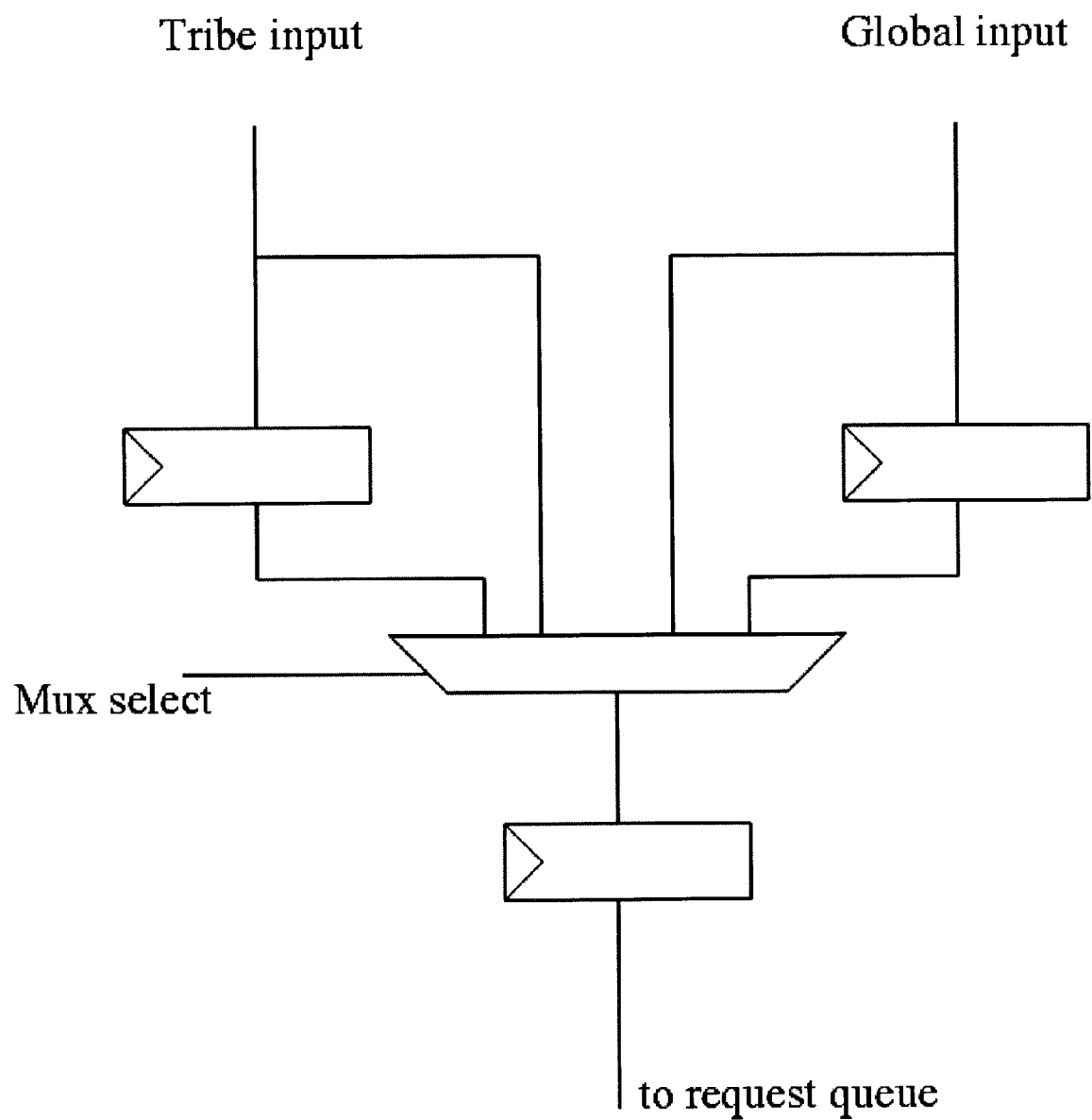

FIG. 46 illustrates the input module data path.

Figure 47:
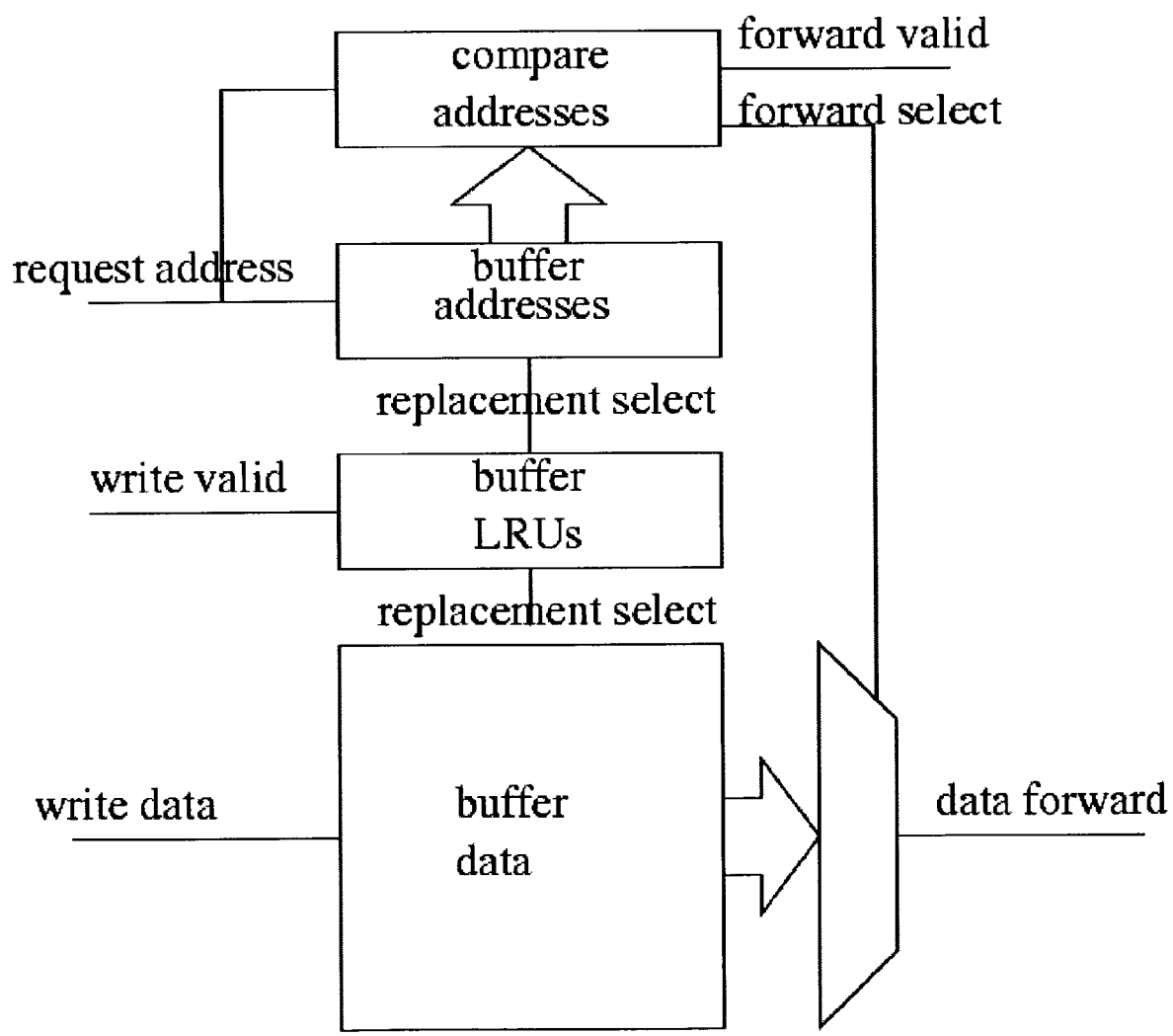

FIG. 47 Illustrates a write buffer module.

Figure 48:
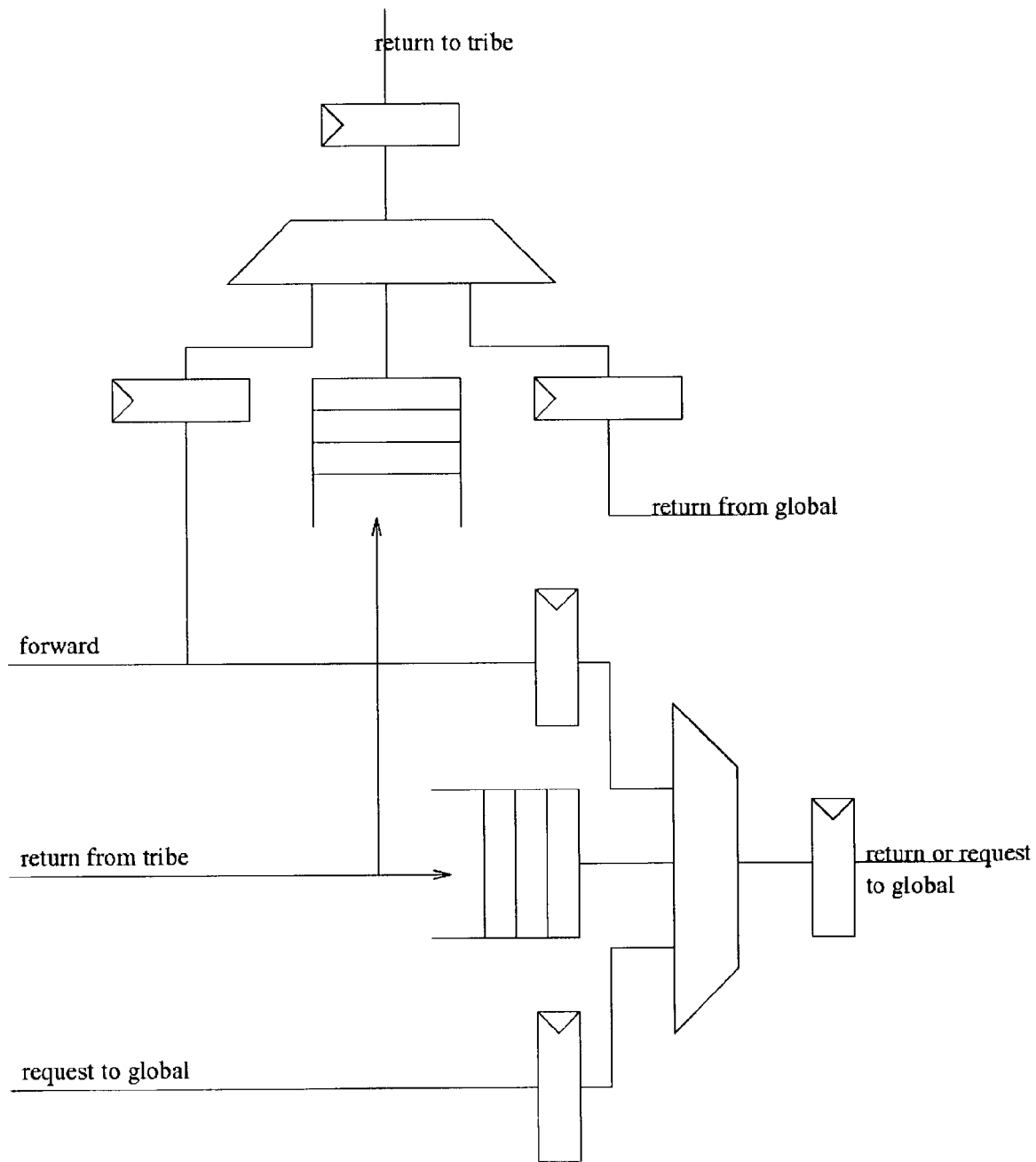

FIG. 48 illustrates the return module data path.

Figure 49:
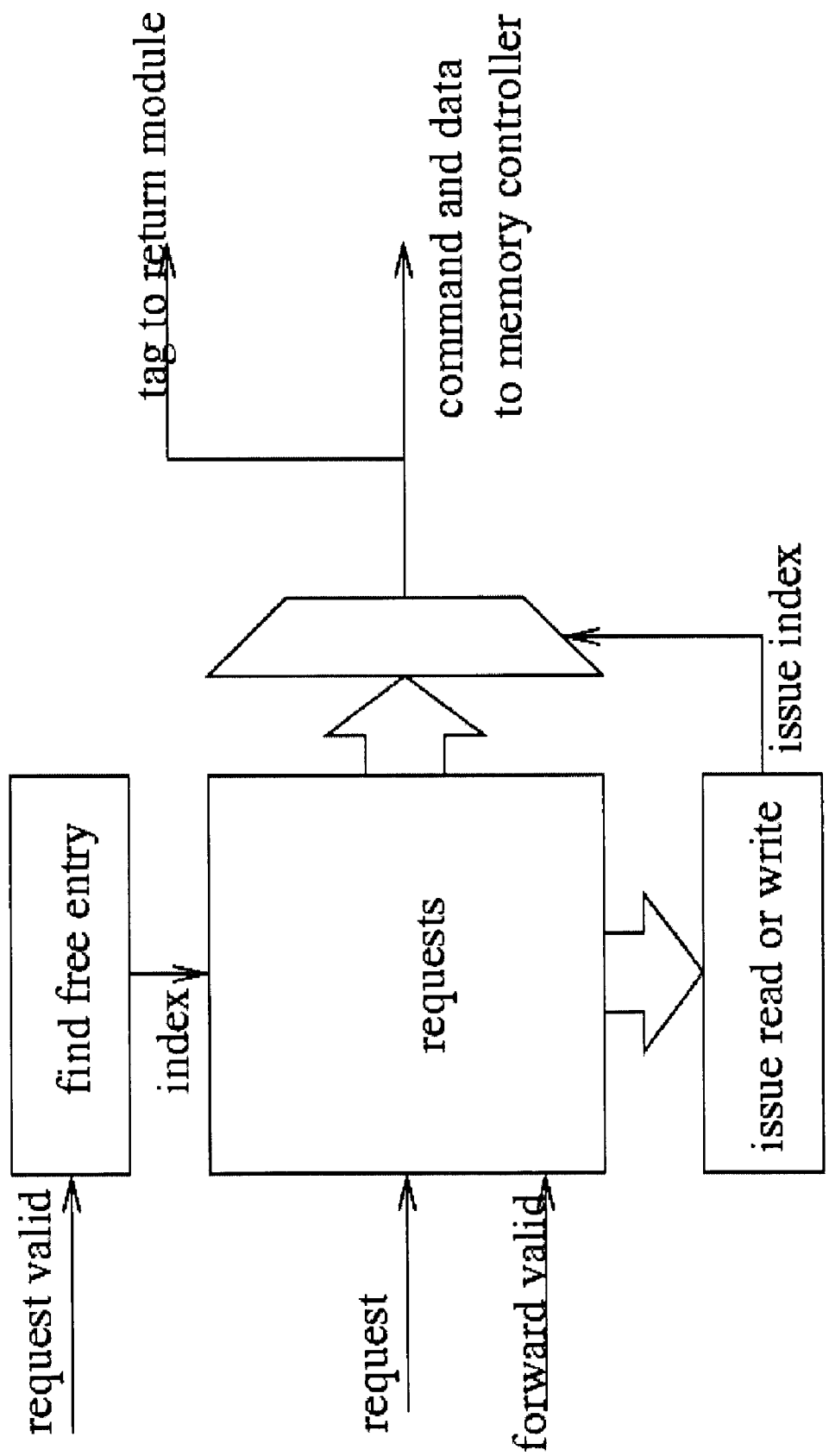

FIG. 49 is an illustration of a request buffer and issue module.

DESCRIPTION OF THE PREFERRED EMBODIMENTS

Overview of Porthos Multi-Threaded Packet Processing Engine

Figure 1:
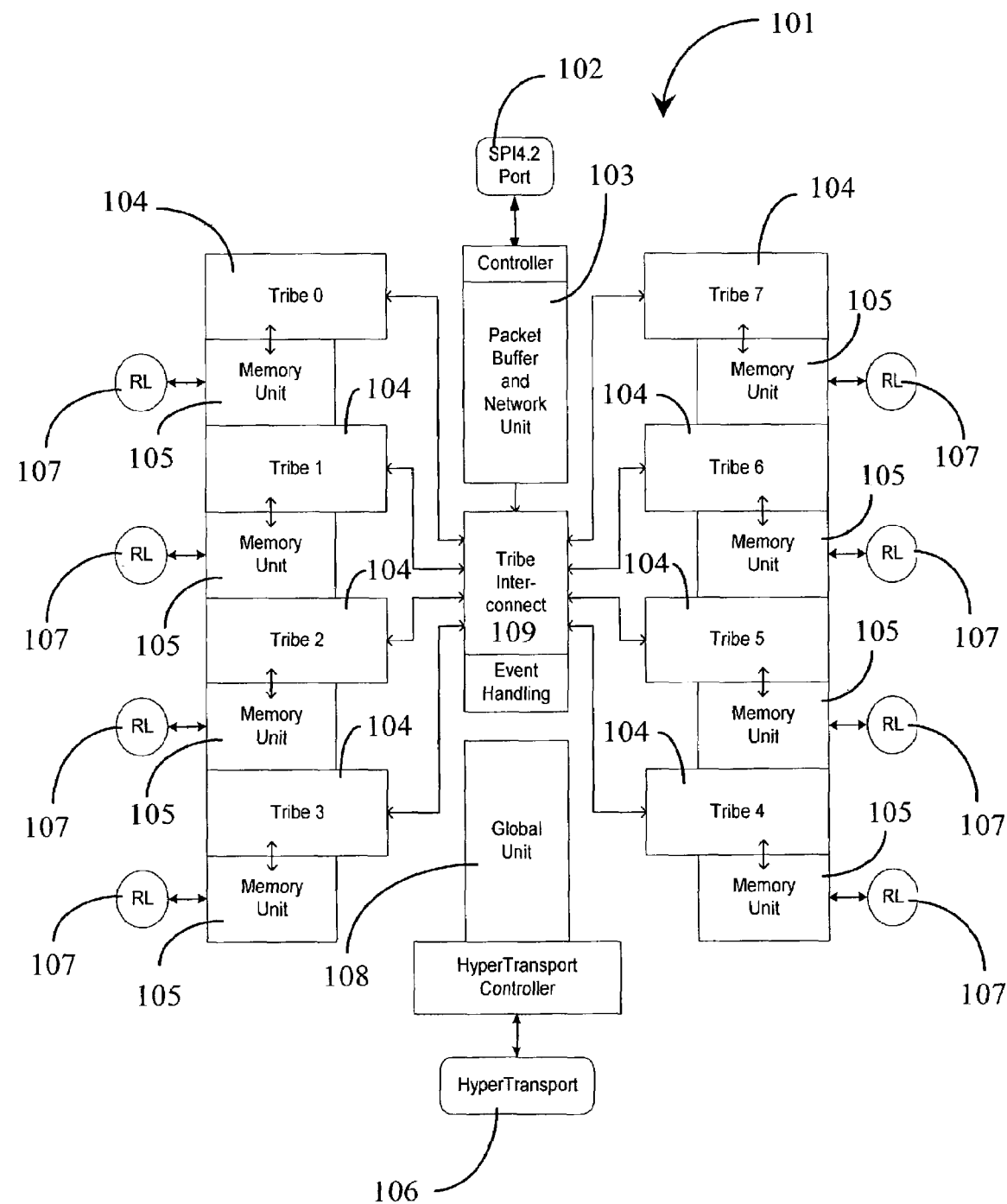
FIG. 1 is an architectural overview for a packet processing engine in an embodiment of the present invention.

In a preferred embodiment of the present invention a multithreaded packet processing engine that the inventors term the Porthos chip is provided for stateful packet processing at bit rates up to 20 Gbps in both directions. FIG. 1 is an architectural overview for a packet processing engine 101 in an embodiment of the present invention.

A two bi-directional network port 102 is provided with maximum input and output rates of 10 Gbps each. Packet Buffer 103 is a first-in-first-out (FIFO) buffer that stores individual packets from data streams until it is determined whether the packets should be dropped, forwarded (with modifications if necessary), or transferred off chip for later processing.

Packets may be transmitted from data stored externally and may also be created by software and transmitted.

In preferred embodiments, processing on packets that are resident in the chip occurs in stages, with each stage associated with an independent block of memory. In the example of FIG. 1 here are eight stages 104, labeled (0-7), each associated with a particular memory block 105, also labeled (0-7).

Each stage 104, called by the inventors a tribe, can execute up to 32 software threads simultaneously. A software thread will typically, in preferred embodiments of the invention, execute on a single packet in one tribe at a time, and may jump from one tribe to another.

A two HyperTransport interface 106 is used to communicate with host processors, co-processors or other Porthos chips.

In preferred embodiments of the invention each tribe executes instructions to accomplish the necessary workload for each packet. The instruction set architecture (ISA) implemented by Porthos is similar to the well-known 64-bit MIPS-IV ISA with a few omissions and a few additions. The main differences between the Porthos ISA and MIPS-IV are summarized as follows:

1. Memory Addressing and Register Size

The Porthos ISA contains 64-bit registers, and utilizes 32-bit addresses with no TLB. There is no 32-bit mode, thus all instructions that operate on registers operate on all 64-bits. The functionality is the same as the well-known MIPS R4000 in 64-bit mode. All memory is treated as big-endian and there is no mode bit that controls endianness. Since there is no TLB, there is no address translation, and there are no protection modes implemented. This means that all code has access to all regions of memory. This would be equivalent to a MIPS processor where all code was running in kernel mode and the TLB mapped the entire physical address space. The physical address space of Porthos is 32-bits, so the upper 32 bits of a generated 64-bit virtual address are ignored and no translation takes place. There are no TLB-related CP0 registers and no TLB instructions.

2. Omitted Instructions

In preferred embodiments there is no floating-point unit in the Porthos chip, and therefore no floating-point instructions. However the floating-point registers are implemented. Four instructions that load, store, and move data between the regular registers and the floating-point registers (CP1 registers) are implemented (LDC1, SDC1, DMFC1, DMTC1). No branches on CP1 conditions are implemented. Coprocessor 2 registers are also implemented along with their associated load, store and move instructions (LDC2, SDC2, DMFC2, DMTC2). The unaligned load and store instructions are not implemented. The CACHE instruction is not implemented.

3. Synchronization Support has been Enhanced

The SC, SCD, LL and LLD instructions are implemented. Additionally, there is an ADDM instruction that atomically adds a value to a memory location and returns the result. In addition there is a GATE instruction that stalls a stream to preserve packet dependencies. This is described in more detail in a following section on flow gating.

4. Timers and Interrupts are Changed

External events and timer interrupts are treated such that new threads are launched. These global events are not thread-specific and are thus not delivered to an active thread. Thus, a thread has no way to enable or disable these events itself, they are configured globally. This is explained in detail in a section below on timers and interrupts.

5. New Set of CP0 Registers

| | |
|---|---|
| CP7 | Sequence Number |
| CP21 | Tribe/Stream Number |
| CP22 | FlowID |
| CP23 | GateVector |

6. Thread Control Instructions

| | |
|---|---|
| DONE | Terminates a thread |
| FORK | Forks a new thread |
| NEXT | Thread migration |

7. Special Purpose ALU Instructions

Support for string search, including multiple parallel byte comparison, has been provided for in new instructions. In addition there are bit field extract and insert instructions. Finally, an optimized ones-complement add is provided for TCP checksum acceleration.

8. Memory Map

Porthos has eight ports 107 (FIG. 1) to external memory devices. Each of these ports represents a distinct region of the physical address space. All tribes can access all memories, although there is a performance penalty for accessing memory that is not local to the tribe in which the instructions are executed. A diagram of the memory map is shown in FIG. 2.

The region of configuration space is used to access internal registers including packet buffer configuration, DMA configuration and HyperTransport port configuration space. More details of the breakdown of this space are provided later in this document.

9. Tribe Migration

A process in embodiments of the present invention by which a thread executing on a stream in one tribe is transferred to a stream in another tribe is called migration. When migration happens, a variable amount of context follows the thread. The CPU registers that are not transferred are lost and initialized to zero in the new tribe. Migration may occur out of order, but it is guaranteed to preserve thread priority as defined by a SeqNum register. Note, however, that a lower priority thread may migrate ahead of a higher priority thread if it has a different destination tribe.

A thread migrating to the tribe that it is currently in is treated as a NOP. A thread may change its priority by writing to the SeqNum register.

The thread migration instruction: NEXT specifies a register that contains the destination address and an immediate that contains the amount of thread context to preserve. All registers that are not preserved are zeroed in the destination context. If a thread migrates to the tribe it is already in, the registers not preserved are cleared.

Flow Gating

Flow gating is a unique mechanism in embodiments of the present invention wherein packet seniority is enforced by hardware through the use of a gate instruction that is inserted into the packet processing workload. When a gate instruction is encountered, the instruction execution for that packet is stalled until all older packets of the same flow have made progress past the same point. Software manually advances a packet through a gate by updating a GateVector register.

Multiple gates may be specified for a given packet workload and serialization occurs for each gate individually.

Packets are given a sequence number by the packet buffer controller when they are received and this sequence number is maintained during the processing of the packet.

A configurable hardware pre-classifier is used to combine specified bytes from the packet and generate a FlowID number from the packet itself. The FlowID is initialized by hardware based on the hardware hash function, but may be modified by software. The configurable hash function is also be used to select which tribe a packet is sent to. Afterward, tribe to tribe migration is under software control.

A new instruction is utilized in a preferred embodiment of the invention that operates in conjunction with three internal registers. In addition to the FlowID register and the PacketSequence register discussed above, each thread contains a GateVector register. Software may set and clear this register arbitrarily, but it is initialized to 0 when a new thread is created for a new packet. A new instruction, named GATE, is implemented. The GATE instruction causes execution to stall until there is no thread with the same FlowID, a PacketSequence number that is lower, and with a GateVector in which any of the same bits are zero. This logic serializes all packets within the same flow at that point such that seniority is enforced.

Software is responsible for setting a bit in the GateVector register when it leaves the critical section. This will allow other packets to enter the critical section. The GateVector register represents progress through the workload of a packet. Software is responsible for setting bits in this register manually if a certain packet skips a certain gate, to prevent younger packets from unnecessarily stalling. If the GateVector is set to all 1s, this will disable flow gating for that packet, since no younger packets will wait for that packet. Note that forward progress is guaranteed since the oldest packet in the processing system will never be stalled and when it completes, another packet will be the oldest packet.

In a preferred embodiment a seniority scheduling policy is implemented such that older packets are always given priority for execution resources within a processing element. One characteristic of this strictly implemented seniority scheduling policy is that if two packets are executing the exact same sequence of instructions, a younger packet will never be able to overtake an older packet. In certain cases, the characteristic of no overtaking may simplify handling of packet dependencies in software. This is because a no-overtaking processing element enforces a pipelined implementation of packet workloads, so the oldest packet is always guaranteed to be ahead of all younger packets. However, a seniority based instruction scheduler and seniority based cache replacement can only behave with no overtaking if packets are executing the exact same sequence of instructions. If conditional branches cause packets to take different paths, a flow gate would be necessary. Flow gating in conjunction with no-overtaking processing elements allow a clean programming model to be presented that is efficient to implement in hardware.

Event Handling

Events can be categorized into three groups: triggers from external events, timer interrupts, and thread-to-thread communication. In the first two groups, the events are not specific to any specific physical thread. In the third group, software can signal between two specific physical threads.

Packet Buffer Overview

In this section the following nomenclature is used:

Port—Physically independent full-duplex interface

Channel—Tag associated to each of the packets that arrive or leave through a port.

Interleaving degree—The maximum number of different packets or frames that are in the process of being received or transmitted out.

The packet buffer (103 FIG. 1) is an on-chip 256K byte memory that holds packets while they are being processed. The packet buffer is a flexible FIFO that keeps all packet data in the order it was received. Thus, unless a packet is discarded, or consumed by the chip (by transfer into a local memory), the packet will be transmitted in the order that it was received. The packet buffer architecture allows for an efficient combination of pass-through and re-assembly scenarios. In a pass-through scenario, packets are not substantially changed; they are only marked, or modified only slightly before being transmitted. The payload of the packets remains substantially the same. Pass-through scenarios occur in TCP-splicing, monitoring and traffic management applications. In a re-assembly scenario, packets must be consumed by the chip and buffered into memory where they are re-assembled. After re-assembly, processing occurs on the reliable data stream and then re-transmission may occur. Re-assembly scenarios occur in firewalls and load balancing. Many applications call for a combination of pass-through and re-assembly scenarios The Packet Buffer module in preferred embodiments interacts with software in the following ways:

Providing the initial values of some GPRs and CP0 registers at the time a thread is scheduled to start executing its workload.

Satisfying the requests to the packet buffer memory and the shared memory

Satisfying the requests to the configuration registers, for instance

Hash function configuration

Packet table read requests

Packet status changes (packet to be dropped, packet to be transmitted out)

Performance counters reads

Allocating space in the packet buffer for software to construct packets.

Frames of packets arrive to the Packet Buffer through a configurable number of ingress ports and leave the Packet Buffer through the same number of egress ports. The maximum ingress/egress interleave degree depends on the number and type of ports, but it does not exceed 4.

The ingress/egress ports can be configured in one of the following six configurations (all of them full duplex):

1 channelized port 2 channelized ports 4 channelized ports 1 non-channelized port 2 non-channelized ports 4 non-channelized ports The channelized port is intended to map into an SPI4.2 interface, and the non-channelized port is intended to map into a GMII interface. Moreover, for the 1-port and 2-port channelized cases, software can configure the egress interleaving degree as follows:

1 channelized port: egress interleave degree of 1, 2, 3 or 4.

2 channelized ports: egress interleave degree of 1 or 2 per port.

Software is responsible to complete the processing of the oldest packets that the Packet Buffer module keeps track of in a timely manner, namely before:

1. The subsequent newest packets fill up the packet buffer so that no more packets can be fit into the buffer. At 300 MHz core frequency, peak rate of ingress data of 10 Gbps and a packet buffer size of 256 KB, this will occur in approximately 200 microseconds; and 2. There are 512 total packets in the system, from the oldest to the newest, no matter whether packets in between the oldest and the newest have been dropped (or DMA out to external memory) by software. Otherwise the Packet Buffer module will drop the incoming frames.

If software does not complete the packets before any of the previous two events occurs, the Packet Buffer module will start dropping the incoming packets until both conditions are no longer met. Note that in this mode of dropping packet data, no flow control will occur on the ingress path, i.e. the packet will be accepted at wire speed but the packets will never be assigned to any tribe, nor its data will be stored in the packet buffer. More details on packet drops is provided below.

Packet Buffer Address Space

Two regions of the Porthos chip 32-bit physical address space are controlled directly by the Packet Buffer module. These are shown in FIG. 3:

the packet buffer memory: 256 KB of memory where the packets are stored as they arrive. Software is responsible to take them out of this memory if needed (for example, in applications that need re-assembly of the frames)

the configuration register space: 16 KB (not all used) that contains the following sections:

the configuration registers themselves: are used to configure some functionality of the Packet Buffer module.

the packet table: contains status information for each of the packets being kept track of.

the get room space: used for software to request consecutive chunks of space within the packet buffer.

Accesses to the Packet Buffer Address Space

Software can perform any byte read/write, half-word (2-byte) read/write, word (4-byte) read/write or double word (8-byte) read/write to the packet buffer. Single quad-word (16-byte) and octo-word (32-byte) read requests are also allowed, but not the single quad-word and octo-word writes. To write 2 or 4 consecutive (in space) double words, software has to perform, respectively, 2 or 4 double-word writes. The Packet Buffer will not guarantee that these consecutive writes will occur back to back; however, no other access from the same tribe will sneak in between the writes (but accesses from other tribes can).

Even though the size of the packet buffer memory is 256 KB, it actually occupies 512 KB in the logical address space of the streams. This has been done in order to help minimizing the memory fragmentation that occurs incoming packets are stored into the packet buffer. This mapping is performed by hardware; packets are always stored consecutively into the 512 KB of space from the point of view of software.

Software should only use the packet buffer to read the packets that have been stored by the Packet Buffer module, and to modify these packets.

The requests from the 8 tribes are treated fairly; all the tribes have the same priority in accessing the packet buffer.

Accesses to the Configuration Register Physical Address Space

The configuration registers are logically organized as double words. Only double word reads and writes are allowed to the configuration register space. Therefore, if software wants to modify a specific byte within a particular configuration register, it needs to read that register first, do the appropriate shifting and masking, and write the whole double word back.

Writes to the reserved portion of the configuration register space will be disregarded. Reads within this portion will return a value of 0.

Some bits of the configuration registers are reserved for future use. Writes to these bits will be disregarded. Reads of these bits will return a value of 0.

Unless otherwise noted, the configuration registers can be both read and written. Writes to the packet table and to the read-only configuration registers will be disregarded.

Software should change the contents of the configuration registers when the Packet Buffer is in quiescent mode, as explained below, and there are no packets in the system, otherwise results will be undefined. Software can monitor the contents of the 'packet_table_packets' configuration register to figure out whether the Packet Buffer is still keeping packets or not.

Configuration Register List

All the configuration registers have an after-reset value of 0x0 unless otherwise specified. FIGS. 4a-4d comprise a table listing all of the configuration registers. The following sections provide more details on some of the configuration registers.

Hashing Function

FIG. 5 illustrates the hash function hardware structured into two levels, each containing one (first level) or four (second level) hashing engines. The result of the hashing engine of the first level is two-fold:

a 16-bit value, named the flow identifier (or flowId for short). This value will be provided to the tribe as part of the initial migration of the packet. Software may use this value, for example, as an initial classification of the packet into a flow.

a 2-bit value, that is used by the hardware to select the result of one of the 4 hashing functions that compose the second level of the hashing hardware.

Each of the four hashing functions in the second level generates a 3-bit value that corresponds to a tribe number. One of these four results is selected by the first level, and becomes the number of the tribe that the packet is going to initially migrate into.

All four hashing engines in the second level are identical, and the single engine in the first level is almost also the same as the ones in the second level. Each hashing engine can be configured independently. The following is the configuration features that are common to all the hashing engines:

select vector [0 . . . i . . . 63] configuration register: each bit of this vector determines whether byte i of the packet will be selected to compute the result of the hashing engine (1) or not (0).

position vector [0 . . . i . . . 63] configuration register: the 16-bit result of the hashing engine is computed using two 8-bit XOR functional units, one for the upper 8-bits and one for the lower 8-bits. In the case that byte i was selected by the select vector, bit i in the position vector determines whether the byte will be used to compute the lower 8 bits of the 16-bit flowId result (0) or the upper 8 bits (1). If the byte was not selected in the select vector, the corresponding bit in the position vector is a don't care.

For the first level hashing engine, there exists a skip configuration register that specifies how many LSB bits of the 16-bit result will be skipped to determine the chosen second level hashing engine. If the skip value is, for instance, two, then the second level hashing engine will be chosen using bits [2 . . . 3] of the 16-bit result. Note that the skip configuration register is only used to select the second level hashing function and it does not modify the 16-bit result that becomes the flowId value.

For each of the second level hashing engines there also exists a skip configuration register performing the same manipulation of the result as in the first level. After this shifting of the result, another manipulation is performed using two other configuration registers; the purpose of this manipulation is to generate a tribe number out of a set of possible tribe numbers. This total number of tribes in this set is a power of 2 (i.e. 1, 2, 4 or 8), and the set can start at any tribe number. Example of sets are [0,1,2,3], [1,2,3,4], [2,3], [7], [0,1,2,3,4,5,6,7], [4,5,6,7], [6,7,0,1], [7,0,1,2], etc. This manipulation is controlled by two additional configuration registers, one per each of the second-level hashing engines:

first: 3-bit value that specifies which is the first tribe of the set (0: tribe 0, . . . 7: tribe 7)

total: 2-bit vector that specifies how many consecutive tribes the set has (0:1 tribe, 1:2 tribes, 2:4 tribes, 3:8 tribes)

The maximum depth that the hashing hardware will look into the packet is 64 bytes from the start of the packet. If the packet is smaller than 64 bytes and more bytes are selected by the select vectors, results will be undefined.

Software should be careful in configuring the hashing function hardware since only non-variant bytes across all the packets of the same flow should be selected to perform the hashing computation; otherwise, different flow identifiers for the packets of the same flow might be generated.

Quiescent Mode

The Packet Buffer module is considered to be in quiescent mode whenever it is not receiving (and accepting) any packet and software has written a 0 in the 'continue' configuration register. Note that the Packet Buffer can be in quiescent mode and still have valid packets in the packet table and packet buffer. Also note that all the transmission-related operations will be performed normally; however any incoming packet will be dropped since the 'continue' configuration register is zero.

When the contents of the 'continue' configuration register toggles from 0 to 1, the Packet Buffer module will perform the following operation:

any new incoming packet that starts arriving after the setting of the 'continue' configuration register takes place physically will be accepted (it may be eventually dropped for other reasons as explaied below).

When the toggling is from 1 to 0, the following operation takes place:

any packet that was currently being received when the clearing of the 'continue' configuration register occurs will be fully received.

any new incoming packet that starts arriving after the setting of the configuration register takes place will be fully dropped.

Software should put the Packet Buffer module in quiescent mode whenever it wants to modify configurable features (note that the Packet Buffer comes out of reset in quiescent mode). The following are the steps software should follow:

1. Write a 0 into the 'continue' configuration register.
2. Monitor the 'status' register until bit 1 is set. When this occurs, the quiescent state has been entered.
3. Configure the desired feature
4. Write a 1 into the 'continue' configuration register to allow new incoming packets to be accepted.

If the above steps are followed, there will be no packets being received when the 0 to 1 transition happens on the 'continue' configuration register. This is not true if software does not wait for quiescent mode before setting the 'continue' configuration register; in this case, the Packet Buffer may keep receiving the packet it was receiving when the 1 to 0 transition took place.

Performance Counters

There are a total of 128 performance events in the Packet Buffer module (63 defined, 65 reserved) that can be monitored by software. Out of these events, a total of 8 can be monitored at the same time. a 48-bit counter is assigned to one particular event and increments the value of the counter by the proper quantity each time the event occurs. Events are tracked by hardware every cycle.

Software can configure which event to monitor in each of the 8 counters. The contents of the counters are made visible to software through a separate set of configuration registers.

FIG. 6 is a table showing the performance events that can be monitored.

Internal State Probes

Software can probe the internal state of the Packet Buffer module using the 'internal_state_number' configuration register. When software reads this configuration register, the contents of some internal state are provided. The internal state that is provided to software is yet TBD. It is organized in 64-bit words, named internal state words. Software writes an internal state word into the 'internal_state_number' configuration register previously to reading the same configuration register to get the contents of the state. This feature is intended only for low level debugging.

Egress Channel Determination

When software writes into the 'done' or 'egress_path_determined' configuration register it provides, among other information, the egress channel associated to the transmission. This channel ranges from 0 to 255, and software actually provides a 9-bit quantity, named the encoded egress channel, that will be used to compute the actual egress channel. FIG. 7 is a table that specifies how the actual egress channel is computed from the encoded egress channel.

The egress channel information is only needed in the case of channelized ports. Otherwise, this field is tretaed as a don't care.

Egress Port Determination

When software writes into the 'done' or 'egress_path_determined', it provides, along with other information, the egress port associated to the transmission. This port number ranges from 0 to 3 (depending on how the Packet Buffer module has been configured), and software actually provides a 5-bit quantity, named the encoded egress port, that will be used to compute the actual egress port. FIG. 8 is a table that shows how the actual egress port is computed from the encoded egress port.

Completing and Dropping Packets

Software eventually has to decide what to do with a packet that sits in the packet buffer, and it has two options:

Complete the packet: the packet will be transmitted out whenever the packet becomes the oldest packet in the packet buffer.

Drop the packet: the packet will be eventually removed from the packet buffer.

In both cases, the memory that the packet occupies in the packet buffer and the entry in the packet table will be made available to other incoming packets as soon as the packet is fully transmitted out or dropped. Also, in both cases, the Packet Buffer module does not guarantee that the packet will be either transmitted or dropped right away. Moreover, there is also no upper limit on the time the packet might sit in the packet buffer before it gets transmitted out or dropped. An example of a large period of time between software requests a packet to be transmitted and the actual start of the transmission occurs in an egress-interleave of 1 case when software completes a packet that is not the oldest one, and the oldest packet is not completed nor dropped for a long time.

Software completes and drops packets by writing into the 'done' and 'drop' configuration registers, respectively. The information provided in both cases is the sequence number of the packet. For the completing of packets, the following information is also provided:

Header growth offset: an 10-bit value that specifies how many bytes the start of the packet has either grown (positive value) or shrunk (negative value) with respect the original packet. The value is encoded in 2's complement. If software does not move the start of the packet, this value should be 0.

Encoded egress channel.

Encoded egress port.

The head of a packet is allowed to grow up to 511 bytes and shrink up to the minimum of the original packet size and 512).

Software should either complete or drop the packet. Results will be undefined if multiple completions/drops occur for the same packet. Moreover, there is no guarantee that the packet data stored in the packet buffer will be coherent after software has completed or drop the packet.

Egress Path Determination

The egress path information (egress port and, in case of channelized port, the egress channel) is mandatory and needs to be provided when software notifies that the processing of a particular packet has been completed. However, software can at any time communicate the egress path information of a packet, even if the processing of the packet still has not been completed. Software does this by writing into the 'egress_path_determination' configuration register the sequence number of the packet, the egress port and, if needed, the egress channel. Of course, the packet will not be transmitted out until software writes into the 'done' command, but the early knowledge of the egress path allows the optimization of the scheduling of packets to be transmitted out in the following cases:

1-port channelized with egress interleave of 2, 3 or 4.

2-port with egress interleave of 1 or 2

4-port with egress interleave of 1

Note that even if software notified the egress path information through the 'eagress_path_determination' configuration register, it needs to provide it again when notifying the completion of the processing through the 'done' configuration register.

GetRoom Command

Software can transmit a packet that it has generated through a GetRoom mechanism. This mechanism works as follows:

Software requests some space to be set aside in the packet buffer. This is done through a regular read to the GetRoom space of the configuration space. The address of the load is computed by adding the requested size in bytes to the base of the GetRoom configuration space.

ThePacket Buffer module will reply to the load:

Unsuccessfully: it will return a '1' in the MSB bit and '0' in the rest of the bits Successfully: it will return in the 32 LSB bits the physical address of the start of the space that has been allocated, and in bits [47 . . . 32] the corresponding sequence number associated to that space.

Software, upon the successful GetRoom command, will construct the packet into the requested space.

When the packet is fully constructed, software will complete it though the packet complete mechanism explained before.

Note that for software-created packets, it is expected the delta to be always 0 when the packet is completed since the header growth offset is not taken into account when the size is allocated.

Configuring the Number and Type of Ports

Software can configure the number of ports, whether they are channelized or not, and the degree of interleaving. All the ports will have the same channelization and interleaving degree properties (ie it can no happen that one port is channelized and another port not).

A port is full duplex, thus there is the same number of ingress and egress ports. FIG. 9 shows six different configurations in terms of number of ports and type of port (channelized/non-channelized). For each configuration, it is shown the interleaving degree allowed per port (which can also be configured if more than an option exists). The channelization and interleaving degree properties applies to both the ingress and egress paths of the port.

Software determines the number of ports by writing into the 'total_ports' configuration register, and the type of ports by writing into the 'port_type' configuration register.

For the 1-port and 2-port channelized cases, software can configure the degree of egress interleaving. The ingress interleaving degree can not be configured since it is determined by the sender of the packets, but in any case it can not exceed 4 in the 1-port channelized case and 2 in the 2-port channelized case; for the other cases, it has to be 1 (the Packet Buffer module will silently drop any packet that violates the maximum ingress interleaving degree restriction).

The egress interleaving degree is configured through the 'islot_enabled' and 'islot_channel_0 . . . 3' configuration registers. An "islot" stands for interleaving slot, and is associated to one packet being transmitted out, across all the ports. Thus, the maximum number of islots at any time is 4 (for the 1-port channelized case, all 4 islots are used when the egress port is configured to support an interleaving degree of 4; for the 1-port case, up to 4 packets can be simultaneously being transmitted out-one per port-). Note that the number of enabled islots should coincide with the number of ports times the egress interleaving degree.

Notification about how many ports there are is made through the 'total_ports' configuration register. It will also be notified about the type of the ports (all have to be of the same type) through the 'port_type' configuration register.

For channelized (ie SPI4.2) ports, software will configure a range of channel numbers that will be transmitted in each of the 4 outbound "interleaving slots" ("islot" for short). This configuration is performed through the 'islot_channels_0', . . . , 'islot_channels_3'. For example, if there is one single SPI4.2 port and islot_channels_0: 0-63 islot_channels_1: 64-127 islot_channels_2: 128-191 islot_channels_3: 192-255 then the output packet data may have, for example, channels 0, 54, 128 and 192 interleaved (or channels 0, 65, 190, 200, etc.) but it will never have channels 0 and 1 interleaved.

For the 2-port SPI4.2 scenario, islot0 and islot1 are assigned to port 0, and islot2 and islot3 are assigned to port 1. Thus, the maximum interleaving degree per port is 2. With the same channel range example above, port 0 will never see channels 128-255, and it will never see channels 70 and 80 interleaved. The following configuration is a valid one that covers all the channels in each egress port:

islot0_channels: 0-127
islot1_channels: 128-255
islot2_channels: 0-127
islot3_channels: 128-255

Note that if software fails to cover a particular channel with an islot assigned to the channel and packets with that particular channel have to be transmitted to that port, results will be undefined.

Software can also disable the islots to force no interleaving on the SPI4.2 ports. This is done through the 'islot_enable' configuration register. For example, in the 1-port SPI4.2 case, if 'islot_enable' is 0x4 (islot2 enabled and the rest disabled), then an interleaving of just 1 will happen on the egress port, and for the range of channels specified in the 'islot2_channels' configuration register.

For the 4-port GMII case, the channel-range associated to each of the islots is meaningless since a GMII port is not channelized. An interleaving degree of 1 will always occur at each egress port.

Software can complete all packets in any order, even those that will change its ingress port or channel. There is no need for software to do anything special when completing a packet with a change of its ingress port or channel, other than notifying the new egress path information through the 'done' configuration register.

Initial Migration

When packets have been fully received by the Packet Buffer module and they have been fully stored into the packet buffer memory, the first migration of those packets into one of the tribes will be initiated. The migration process consists of a request of a migration to a tribe, waiting for the tribe to accept the migration, and providing some control information of the packet to the tribe. This information will be stored by the tribe in some software visible registers of one of the available streams.

The Packet Buffer module assigns to each packet a flow identification number and a tribe number using the configurable hashing hardware, as described above. The packets will be migrated to the corresponding initial tribes in exactly the same order of arrival. This order of arrival is across all ingress ports and, if applicable, all channels. If a packet has to be migrated to a tribe that has all its streams active, the tribe will not accept the migration. The Packet Buffer module will keep requesting the migration until the tribe accepts it.

After the migration has taken place, the following registers are initialized in one of the streams of the tribe:

PC: initialized with the value in the corresponding 32-bit program_counter configuration register. Note that all the streams within a tribe that are activated due to an initial migration will start executing code at the same initial program counter.

CP0.22: the flow identification number, a 16-bit value obtained by the hashing hardware.

CP0.7: the sequence number, a 16-bit value that contains the order of arrival of the packet. If a packet A fully arrived right after a packet B, the sequence number of A will be the sequence number of B plus 1 (assuming no other packet from other port completed nor a GetRoom command successfully happened in between). The sequence number wraps around at 0xFFFF.

GPR.30: the ingress port (bits 9-10) and channel of the packet (bits 0-7).

GPR.31: the 32-bit logical address where the packet resides. This address points to the first byte of the packet. If the NET module left space at the front of the packet (specified by the header_growth_offset configuration register), this address still points to the first byte that arrived of the packet, not to the first byte of the added space.

Hardware-initiated Packet Drops

There are two types of packet drops:

Software-initiated drops: software explicitly requests a particular packet to be dropped.

Hardware-initiated drops: a packet is dropped because there is no space to store the packet or its control information.

Furthermore, the cause of a hardware-initiated drop could be one of the following:

The packet buffer is full. If the occupancy of the packet buffer when a new packet starts arriving is such that it cannot be guaranteed that a maximum-size packet could be fit in, the hardware will drop that incoming packet.

The packet table is full. If the table that is used to store the packet descriptors (control information) of the packets is full when a new packet starts arriving, the hardware will drop that incoming packet. The packet table is considered to be full when there are less than 4 entries available in the packet table upon a packet arrival.

The 'continue' configuration register is 0. The Packet Buffer module comes out of reset with a 0 in the 'continue' configuration register.

Until software writes a 1 in there, any incoming packet will be dropped.

Interleaving degree violation. If an ingress port violates the maximum degree of packet interleaving that the NET supports.

The size of the packet being received exceeds the maximum allowed packet size. The maximum packet size that can be accepted is 65536 bytes. Software can override this maximum size to a lower value, from 1 KB to 64 KB, always in increments of 1K (see configuration register 'max_packet_size')[1]. If an incoming packet is detected that it may be over the maximum packet size allowed when the next valid data of the packet arrives, the packet is forced to finish right away and the rest of the data that eventually will come from that packet will be dropped by the hardware. Therefore, a packet that exceeds the maximum allowed packet size will be seen by software as a valid packet of a size that varies between the maximum allowed size and the maximum allowed size minus 7 (since up to 8 valid bytes of packet data can arrive every cycle).

The ingress port notifies that the packet currently being received has an error. This notification can occur at any time during the reception of the packet.

Note that entire packets are dropped. When a packet is dropped by hardware, there is no interrupt generated. Software can check at any given time the total number of packets that have been dropped due to each of the hardware-initiated causes by monitoring specific performance events.

Porthos Instruction Set

The Porthos instruction set in a preferred embodiment of the present invention is as follows:

---

ALU
    Arithmetic
        ADD, ADDU, SUB, SUBU, ADDI, ADDIU, SLT, SLTU, SLTI, SLTIU
        DADD, DADDU, DSUB, DSUBU, DADDI, DADDIU,
    Logical
        AND, OR, XOR, NOR, ANDI, ORI, XORI, NORI
    Shift
        SLL, SRL, SRA, SLLV, SRLV, SRAV,
        DSLL, DSRL, DSRA, DSLLV, DSRLV, DSRAV, DSLL32, DSRL32
    Multiply/Divide
        MULT, MULTU, DIV, DIVU,
        DMULT, DMULTU, DDIV, DDIVU
Memory
    Load
        LB, LH, LHU, LW, LWU, LD
    Store
        SB, SH, SW, SD
    Synchronization
        LL, LLD, SC, SCD
        SYNC
        ADDM
Control
    Branch
        BEQ, BNE, BLEZ, BGTZ, BLTZ, BGEZ, BLTZAL, BGEZAL
    Jump
        J, JR, JAL, JALR
    Trap
        TGE, TGEU, TLT, TLTU, TEQ, TNE,
        TGEI, TGEIU, TLTI, TLTIU, TEQI, TNEI
    Miscellaneous
        SYSCALL, BREAK, ERET, NEXI, DONE, GATE, FORK
Miscellaneous
    MFHI, MTHI, MFLO, MTLO,
    MTC0, MFC0

---

CP0 Registers

The CP0 registers in a preferred embodiment of the invention are as follows:
    Config
    TribeNum, StreamNum (CP0 Register 21)
    Status
    EPC
    Cause
    FlowID (CP0 Register 22)
    GateVector (CP0 Register 23)
    SeqNum (CP0 Register 7)

Microarchitecture Description of the Global Block of the Porthos Chip

Overview of the Global Block

Referring again the FIG. 1, a Global Unit 108 provides a number of functions, which include hosting functions and global memory functions. Further, interconnections of global unit 108 with other portions of the Porthos chip are not all indicated in FIG. 1, to keep the figure relatively clear and simple. Global block 108, however, is bus-connected to Network Unit and Packet Buffer 103, and also to each one of the memory units 105.

The global (or "GBL") block 106 of the Porthos chip is responsible for the following functions:
    Implements a memory controller for external EPROM
    Interfaces with two HyperTransport IP blocks
    Provides input and output paths for the general purpose I/Os
    Satisfies external JTAG commands
    Generates interrupts as a result of HT, GPIO or JTAG activity
    Interfaces with the network block to satisfy HyperTransport requests to packet buffer memory
    Provides a path for memory interconnection among the different local memories of the tribes Nomenclature for Global Block Processes:
    Request: an access from a source to a destination to obtain a particular address (read request) or to modify a particular address (write request)
    Response: a petition from a source to a destination to provide the requested data (in case of a read request) or to acknowledge that the request has been fulfilled (in case of a write request)
    Transaction: composed of the request initiated by the source A to destination B and the corresponding response initiated by the source B to the destination A. Note that a transaction is always composed of a request and a response; if the request is for a write, the response will provide just an acknowledge that the write has been fulfilled.

FIG. 10 is a top-level module diagram of the GBL block 108.

The GBL is Composed of the Following Modules:
    Local memory queues 1001 (LMQ): there is one LMQ per each local memory block. The LMQ contains the logic to receive transactions from the attached local memory to another local memory, and the logic to send transactions from a local memory to the attached local memory.
    Routing block 1002 (RTN): routes requests from the different sources to the different destinations.
    EPROM controller 1003 (EPC): contains the logic to interface with the external EPROM and the RTN
    HyperTransport controller 1004 (HTC): there is one HTC per HyperTransport IP block.
    General purpose I/O controller 1005 (IOC): contains the logic to receive activity from the GPIO input pins and to drive the GPIO output pins.
    JTAG controller 1006 (JTC): contains the logic to convert JTAG commands to the corresponding requests to the different local memories.
    Interrupt handler 1007 (INT): generates interrupts to the tribes as a result of HT, JTAG or GPIO activity
    Network controller 1008 (NTC): logic that interfaces to the network block to satisfy HT commands that affect the packet buffer memory without software intervention.

Local Memory Queues Block 1001 (LMQ)

Block 1001 contains the logic to receive transactions from the attached local memory to another local memory, and the logic to send transactions from a local memory to the attached local memory. FIG. 11 is an expanded view showing internal components of block 1001.

Description of LMQ 1001:

LMQ block 1001 receives requests and responses from the local memory block. A request/response contains the following fields (the number in parentheses is the width in bits):
    valid (1): asserted when the local memory block sends a request or response. If de-asserted, the rest of the fields are "don't care".

data (64): the data associated to a write request or a read response; otherwise (read request or write response) is "don't care".

stream (5): in case of a request, this field contains the number of the stream within the tribe that performs the request to the local memory. In case of a response, this field contains the same value received on the corresponding request.

regdest (5): in case of a read request, this field contains the register number where the requested data will be stored. In case of a response, this field contains the same value received on the corresponding request.

type (3): specifies the type of the request (signed read, unsigned read, write) or response (signed read, unsigned read, write).

address (32): in case of a request, this field contains the physical address associated to the read or write. In case of a response, contains the same value received on the corresponding request.

LMQ block 1001 looks at the type field to figure out into which of the input queues the access from the local memory will be inserted into.

The LMQ block will independently notify to the local memory when it can not accept more requests or responses. The LMQ block guarantees that it can accept one more request/response when it asserts the request/response full signal.

The LMQ block sends requests and responses to the local memory block. A request/response contains the same fields as the request/response received from the local memory block. However the address bus is shorter (23 bits) since the address space of each of the local memories is 8 MB.

The requests are sent to the local memory in the same order are received from the RTN block. Similarly for the responses. When there is an available request and an available response to be sent to the local memory, the LMQ will give priority to the response. Thus, newer responses can be sent before than older requests.

Routing Block 1002 (RTN)

This block contains the paths and logic to route requests from the different sources to the different destinations. FIG. 12 shows this block (interacting only to the LMQ blocks).

Description The RTN block 1002 contains two independent routing structures, one that takes care of routing requests from a LMQ block to a different one, and another one that routes responses from a LMQ block to a different one. The two routing blocks are independent and do not communicate. The RTN can thus route a request and a response originating from the same LMQ in the same cycle.

The result of routing of a request/response from a LMQ to the same LMQ is undefined.

Microarchitecture Description of the Network Block 103 of the Porthos Chip

Overview

The network (or "NET") block 103 (FIG. 1) of the Porthos chip is responsible for the following functions:

Receiving the packets from 1, 2 or 4 ports and storing them into the packet buffer memory.

Notifying one of the tribes that a new packet has arrived, and providing information about the packet to the tribe.

Satisfying the read and write requests to the packet buffer memory performed by the different tribes and the global block.

Keeping track of the status of a packet.

Monitoring the oldest packet to each of the egress ports and sending it out to the corresponding port if it has already been processed Providing a DMA mechanism to the tribes to transfer data out of the packet buffer memory and into the external global memory.

The NET block will always consume the data that the ingress ports provide at wire speed (up to 10 Gbps of aggregated ingress bandwidth), and will provide the processed packets to the corresponding egress ports at the same wire speed. The NET block will not perform flow control on the ingress path.

The data will be dropped by the NET block if the packet buffer memory can not fit in any more packets, or the total number of packets that the network block keeps track of reaches its maximum of 512, or there is a violation by the SPI4 port on the maximum number of interleaving packets that it sends, or there is a violation on the maximum packet size allowed, or software requests incoming packets to be dropped.

Newly arrived packets will be presented to the tribes at a rate no lower than a packet every 5 clock cycles. This provides the requirement of assigning a 40-byte packet to one of the tribes (assuming that there are available streams in the target tribe) at wire speed. The core clock frequency of the NET block is 300 MHz.

Frames of packets arrive to the NET through a configurable number of ingress ports and leave the NET through the same number of egress ports. The maximum ingress/egress interleave degree depends on the number and type of ports, but it does not exceed 4.

The ingress/egress ports can be configured in one of the following six configurations (all of them full duplex):

1 channelized port
2 channelized ports
4 channelized ports
1 non-channelized port
2 non-channelized ports
4 non-channelized ports The channelized port is intended to map into an SPI4.2 interface, and the non-channelized port is intended to map into a GMII interface. Moreover, for the 1-port and 2-port channelized cases, software can configure the egress interleaving degree as follows:

1 channelized port: egress interleave degree of 1, 2, 3 or 4.

2 channelized ports: egress interleave degree of 1 or 2 per port.

The requirement of the DMA engine is to provide enough bandwidth to DMA the packets out of the packet buffer to the external memory (through the global block) at wire speed.

Block Diagram

FIG. 14 shows the block diagram of the NET block 103. The NET block is divided into 5 sub-blocks, namely:

PortInterface (PIF): responsible for receiving the packets on the different ingress ports (1, 2 or 4) and deciding to which of the 4 ingress interleaving slots the data of the packet belongs to, and responsible for interfacing with the egress ports also on the egress path.

PacketLoader (PLD): responsible for:

Applying a hash function to the packet being received for the purpose of flow identification and for deciding to which tribe the packet will be eventually assigned to Deciding where to store the packet into the packet buffer, and performing all the necessary writes Allocating an entry in the packet table with the control information of the newly arrived packet Providing the information of newly arrived packets, in the order of arrival across all ingress ports, to the different tribes for processing Maintaining the status of each of the packets in the packet table, in particular, whether the packets have been completely processed by the tribes or not yet.

Monitoring the oldest packet in the packet table to decide what to do with it (skip it if the packet is not valid—ie software has explicitly requested to the NET block to drop the packet—; transmit it out to the corresponding egress port if the packet has been completed; or nothing if the packet is still active), and do this for each of the egress interleaving slots.

PacketBufferController (PBC): its function is to provide some buffering for the requests of each of the sources of accesses to the packet buffer memory, and perform the scheduling of these requests to the different banks of the packet buffer memory. The different sources are: the network ingress path, the network egress path, the DMA engine (TBD), the global block and the 8 tribes. The scheduler implements a fixed priority scheme in the order listed before (ingress path having the highest priority). The 8 tribes are treated fairly among them.

PacketBufferMemory (PBM): it contains the packet buffer memory, divided into 8 interleaved banks. Performs the different accesses that the PBC has scheduled to each of the banks, and routes the result to the proper source. This block also performs the configuration register reads and writes, thus interacting with the different sub-blocks to access the corresponding configuration register.

The following sections provide detailed information about each of the blocks in the Network block. The main datapath busses are shown in bold and they are 64-bit wide. Moreover, all busses are unidirectional. Unless otherwise noted, all the signals are point-to-point and asserted high. All outputs of the different sub-blocks (PIF, PLD, PBM and PBC) are registered.

PortInterface Block 1401 (PIF)

Detailed Description

The PIF block has two top-level functions: ingress function and egress function. FIG. 15 shows its block diagram.

Ingress Function

The ingress function interfaces with the SPI4.2/GMII ingress port, with the PacketLoader (PLD) and with the PacketBufferMemory (PBM).

SPI4.2/GMII Port

From a SPI4.2/GMII port, it receives the following information:

Valid (1): if asserted, validates the rest of the inputs. It specifies that SPI4 is sending valid data in the current cycle.

Data (64): contains the 64 bits of packet data provided by the SPI4. This 64-bit vector is logically divided into 8 bytes.

End_of_packet (1): if asserted, it specifies that valid data is the last data of the packet.

Last_byte (3): pointer to the last valid MSB byte in 'data'. If all 8 bytes are valid, 'last_byte' is 7; if only 1 byte is valid, 'last_byte' is 0. If 1 or more bytes are valid, they are right aligned (first valid byte is byte0, then byte1, etc.). It can not occur that, for example, byte 0 and 2 are valid, but not byte 1. In other words, if the data is not the end of the packet, then 'last_byte' should be 3; if the data is the end of the packet, then 'last_byte' can take any value.

Channel (8): the channel associated to the packet data received. The SPI4 protocol allows up to 256 channels. This field is a don't care in case of a GMII port.

Every cycle, a port may send data (of a single packet only). But packets can arrive interleaved (in cycle x, packet data from a packet can arrive, and in cycle x+1 data from a different—or same-packet may arrive). The ingress function will know to which of the packets being received the data belongs to by looking at the channel number. Note that packets can not arrive interleaved in a GMII port.

In a SPI4.2 port, up to 256 packets (matching the number of channels) can be interleaved. However, the Porthos chip will only handle up to 4. Therefore, any packet interleaving violation will be detected and the corresponding packet data will be dropped by the ingress function. The ingress function monitors the packets and the total packet data dropped due to the interleaving violation.

The number of total ports is configurable by software. There can be 1, 2 or 4 ingress ports. In case of a single SPI4.2 port, the maximum interleaving degree is 4. In case of 2 SPI4.2 ports, the maximum interleaving degree is 2 per port. In the case of 4 ports, no interleaving is allowed in each port.

For SPI4.2 ports, when valid data of a packet arrives, the ingress function performs an associative search into a 4-entry table (the channel_slot table). Each entry of these table (called slot), corresponds to one of the packets that is being received. Each entry contains two fields: active (1) and channel (8). If the associative search finds that the channel of the incoming packet matches the channel value stored in one of the active entries of the table, then the packet data corresponds to a packet that is being received. If the associative search does not find the channel in the table, then two situations may occur:

There is at least one non-active entry in the portion of the table associated to the ingress port: in this case, the valid data received is the start of a new packet. The entry is marked as active and the incoming channel is stored into that entry.

All the entries in the portion of the table associated to the ingress port are active. This implies a protocol violation and the packet data will be dropped. The hardware sets a Xth bit in a 256-bit array (where X is the incoming channel number) called violating_channels.

For the 1-SPI4 port, all the 4 entries of the table are available for the port; for the 2-SPI4 port, the first 2 entries are allocated for port 0, and the second two entries for port 1, thus forcing a maximum ingress interleaving degree of 2 per port.

The incoming channel associated to every valid data is looked up in the violating_channels array to figure out whether the packet data needs to be dropped (ie whether the valid data corresponds to a packet that, when it first arrived, violated the interleave restriction). If the corresponding bit in the violating_channels is 0, then the channel is looked up in the channel_slot table, otherwise the packet data is dropped. If the packet data happens to be the last data of the packet, the corresponding bit in the violating_channels array is cleared.

There is no flow control between the SPI4 ingress port and the ingress function.

PLD Interface:

If the packet data is not dropped, it is inserted into a 2-entry FIFO. Each entry of this FIFO contains the information that came from the SPI4 ingress port: data (64), end_of_packet (1), last_byte (3), channel (8), and information generated by the ingress function: slot (2), start_of_packet (1). Only valid packet data of packets that comply with interleave restriction will be stored into the FIFO. If the FIFO is not empty, the contents of the head entry of the FIFO are provided to the PLD and the head entry is removed.

A logic exists that will monitor the head of each of the 4 fifos and will send valid data to the PLD in a round-robin fashion. This logic is capable of sending up to 8 bytes of valid data to the PLD per cycle. At a core frequency of 300 MHz, it implies that the network block can absorb packet data at a peak close to 20 Gbps.

There is no flow control between the ingress function and the PLD block. This implies that the aggregated bandwidth of across all ingress ports should be less than 19.2 Gbps (for 300 MHz core frequency operation).

There are no configuration registers affecting the ingress function.

Performance events 0-11 are monitored by the ingress function.

Egress Function

The egress function interfaces with the egress ports, the PacketLoader (PLD) and the PacketBufferMemory (PBM).

PBM Interface

The egress function receives packet data from the PBM of packets that reside in the packet buffer. There is an independent interface for each of the egress interleaving slots, as follows:

Valid (1): if asserted, validates the rest of the inputs. It specifies that valid data is sent in the current cycle or not.

Data (64): contains the 64 bits of packet data provided. This 64-bit vector is logically divided into 8 bytes.

End_of_packet (1): if asserted, it specifies that valid data is the last data of the packet.

Last_byte (3): pointer to the last valid MSB byte in 'data'. If all 8 bytes are valid, 'last_byte' is 7; if only 1 byte is valid, 'last_byte' is 0. If 1 or more bytes are valid, they are right aligned (first valid byte is byte0, then byte1, etc.). It can not occur that, for example, byte 0 and 2 are valid, but not byte 1. In other words, if the data is not the end of the packet, then 'last_byte' should be 3; if the data is the end of the packet, then 'last_byte' can take any value.

Port (2): the outbound port.

Channel (8): the outbound channel associated to the packet data. Meaningless if the egress port is not channelized.

A total of up 4 FIFOs, one associated to each egress interleaving slots, store the incoming information. Each FIFO has 8 entries. Whenever the number of occupied entries in the PBM FIFO is 5 or more, a signal is provided to the PBC block as a mechanism of flow control. xx There could be at most 5 chunks of packet data already read and in the process of arriving to the egress function.

Egress Port Interface:

A logic exists that will look at the head of each of the 4 FIFOs and, in a round-robin fashion, will send the valid data to the corresponding egress port. Note that if 4 egress ports exist, then there is a 1-to-1 correspondence between a fifo and a port. If 2 channelized ports exist, then the round-robin logic is applied between fifo 0 and fifo 1 for port 0 and fifo2 and fifo3 for port1. In the case of 2 non-channelized ports, either islot 0 or islot 1 is disabled (implying that either fifo 0 or fifo 1 is empty), and similarly for islot2 and islot3 (for fifo 2 and fifo 3). In the case of 1 channelized port, the round robin prioritization is applied among all the fifos; for the 1 non-channelized port case, all except one fifo should be empty.

The round robin logic works in parallel for each of the egress ports.

The valid contents of the head of the FIFO that the prioritization logic chooses are sent to the corresponding egress port. This information is structured in the same fields as in the ingress port interface.

There is an extra 1-bit signal from the egress port to egress function, 'advance' that is used for flow control between the port and the egress function in case the egress port can not accept data. If this is the case, the port de-asserts 'advance'. Whenever 'advance' is asserted, the egress function is allowed to send valid data to the port. If de-asserted, the egress function will not send any valid data, even though there might be valid data ready to be sent. If the egress port de-asserts 'advance' in cycle x, it still may receive valid packet data in cycle x+1 since the 'advance' signal is assumed to be registered at the port side.

The egress function could send valid packet data at a peak rate of 8 bytes per cycle, which translates approximately to 19.2 Gbps (@ 300 MHz core frequency). Thus, a mechanism is needed for a port to provision for flow control.

No configuration registers exist in this subblock.

Performance events 12-23 are monitored by the egress function.

PacketLoader Block 1402 (PIF)

Detailed Description

The PIF block performs four top-level functions: packet insertion, packet migration, packet transmission and packet table access. FIG. 16 shows its block diagram.

Packet Insertion Function

This function interfaces with the PortInterface (PIF) and PacketBufferController (PBC). The function is pipelined (throughput 1) into 3 stages (0, 1 and 2).

Stage 1:

Packet data is received from the PLD along with the slot number that the PLD computed. If the packet data is not the start of a new packet (this information is provided by the PLD), the slot number is used to look up a table (named slot_state) that contains, for each entry or slot, whether the packet being received has to be dropped. There are three reasons why the incoming packet has to be dropped, and all of them happened when the first data of the packet arrived at Stage A of the PLD:

The 'continue' configuration register was 0.

The total number of entries in the packet table (that holds the packet descriptors) was more than 508.

The packet buffer memory (that holds the data of the packets) was not able to guarantee the storage of a packet of the maximum allowed size.

If the packet data is the start of the packet, some logic decides whether to drop the packet or not. If any of the above three conditions holds, the packet data is dropped and the slot entry in the slot_table is marked so that future packet data that arrives for that packet is also dropped.

This guarantees that the whole packet will be dropped, no matter whether the above conditions hold or not when any of the rest of the data of the packet arrives.

For the purpose of determining at stage 1 whether the packet table is full or not, the threshold number of entries is 512 (the maximum number of entries) minus the maximum packets that can be received in an interleaved way, which is 4. Therefore, if the number of entries when the first data of the packet arrives is more than 508, the packet will be dropped.

To determine whether the packet buffer will be able to hold the packet or not, some state is looked up that contains information regarding how full the packet buffer is. Based on this information, the decision to drop the packed due to packet buffer space is performed. To understand how this state is computed, first let us describe how the packet buffer is logically organized by the hardware to store the packets.

The 256 KB of the packet buffer are divided into four chunks (henceforth named sectors) of 64 KB. Sector 0 starts at byte 0 and ends at byte 0xFFFF, and sector 3 starts at byte 0x30000 and ends at byte 0x3FFFF. The number of sectors matches the number of maximum packets that at any given time can be in the process of being received.

As will be seen later on, when the packet first arrives, it is assigned one of the sectors, and the packet will be stored somewhere in that sector. That sector becomes active until the last data of the packet is received. No other packet will be assigned to that sector if it is active.

Thus, when a new packet arrives and all the sectors are active, then the packet will not be able to be stored. Another reason why the packet might not be accepted is if the total available space in each of the non-active sectors is smaller than the maximum allowed packet size. This maximum allowed packet size is determined by the 'max_packet_size' configuration register, and it ranges from 1 KB to 64 KB, in increments of 1 KB. When the start of a new packet is received, no information regarding the size of the packet is provided up front (the NET block is protocol agnostic, and no buffering of the full packet occurs to determine its size). Therefore, it has to be assumed that the size of the packet is the maximum size allowed in order to figure out whether there is enough space in the sector or not to store the packet.

In stage 1, the information of whether each sector is active or not, and whether each sector can accept a maximum size packet or not is available. This information is then used to figure out whether the first data of the packet (and eventually the rest of the data) has to be dropped.

In stage 1, the logic maintains, for all the packets being received, the total number of bytes that have been received so far. This value is compared with the allowed maximum packet size and, if the packet size can exceed the maximum allowed size when the next valid data of the packet arrives, the packet is forced to finish right away (its end_of_packet bit is changed to 1 when sent to stage 2) and the rest of the data that eventually will come from that packet will be dropped. Therefore, a packet that exceeds the maximum allowed packet size will be seen by software as a valid packet of a size that varies between the maximum allowed size and the maximum allowed size minus 7 (since up to 8 valid bytes of packet data can arrive every cycle). No additional information is provided to software (no interrupt or error status).

Some information from PLD is propagated into stage 2: valid, start_of_packet, data, port, channel, slot, error, and the following results from stage 1: revised end_of_packet, current_packet_size. If the packet data is dropped in stage 0, no valid information is propagated into stage 2.

Stage 2:

In this stage, the state information for each of the four sectors is updated, and the hashing function is applied to the packet data.

When the first data of a packet arrives at stage 2, a non-active sector (guaranteed by stage 1 to exist) is assigned to the packet. The sector that is less occupied is chosen. This is done to minimize the memory fragmentation that occurs at the packet buffer. This implies that some logic will maintain, for each of the sectors, the total number of 8-byte chunks that the sector holds of packets that are kept in the network block (ie packets that have been received but not yet migrated, packets that are being processed by the tribes, and packets that have been processed but still not been transmitted or dropped).

Each of the four sectors is managed as a FIFO. Therefore, a tail and head pointer are maintained for each of them. The incoming packet data will be stored at the position within the sector pointed by the tail pointer. The head and tail pointers point to double words (8 bytes) since the incoming data is in chunks of 8 bytes.

The tail pointer for the first data of the packet will become (after converted to byte address and mapped into the global physical space of Porthos) the physical address where the packet starts, and it will be provided to one of the tribes when the packet is first migrated (this will be covered on the migration function).

The tail pointer of each a sector is incremented every time a new valid packet data has arrived (of a packet assigned to that sector). Note that the tail pointer may wrap around and start at the beginning of the sector. This implies that the packet might physically be stored in a non-consecutively manner (but with at most one discontinuity, at the end of the sector). However, as it will be seen as part of the stage 3 logic, a re-mapping of the address is performed before providing the starting address of the packet to software.

Whenever valid data of a packet is received, the occupancy for the corresponding sector is incremented by the number of bytes received. Whenever a packet is removed from the packet buffer (as will be seen when the transmission function is explained) the occupancy is decremented by the amount of bytes that the packet was occupying in the packet buffer.

In stage 2 the hashing function is applied to the incoming packet data. The hashing function and its configuration is explained above. The hashing function applies to the first 64 bytes of the packet. Therefore, when a chunk of data (containing up to 8 valid bytes) arrives at stage 2, the corresponding configuration bits of the hashing function need to be used in order to compute the partial hashing result.

The first-level hashing function and all the second-level hashing functions are applied in parallel on the packet data received. Both partial hashing results and the configuration bits to apply to the next chunk of valid bytes are kept for each of the four ingress interleaving slots.

In this state, if there is a pending GetRoom command, it is served. The GetRoom command is generated by software by writing into the 'get_room' configuration register, with the offset of the address being the amount of space that software requests. The NET will search for a chunk of consecutive space of that size (rounded to the nearest 8-byte boundary) in the packet buffer. The result of the command will be unsuccessful if:

there are no available entries in the packet table there is no space available in the packet buffer to satisfy the request A pending GetRoom command will be served only if there is no valid data in State 2 from ingress and there is no valid data in Stage 1 that corresponds to a start of packet.

The following information is provided to stage 3: valid, data, port, channel, slot, end of packet, start of packet, size of the packet, the dword address, error, get room result, and the current result of the first level of hashing function.

Stage 3:

In stage 3, the valid packet data is sent to the PBC in order to be written into the packet buffer, and, in case the valid data corresponds to the end of a packet, a new entry in the packet table is written with the descriptor of the packet.

If the packet data is valid, the 64-bit data is sent to the PBC using the double word address (that points to a double word within the packet buffer). All the 8 bytes will be written (even if less than 8 bytes are actually valid). The PBC is guaranteed to accept this request for write into the packet buffer. There is no flow control between the PBC and stage 3.

If the valid data happens to be the last data of a packet, a new entry in the packet table is initialized with the packet descriptor. Stage 1 guaranteed that there would be at least one entry in the packet table. The packet table entries are managed like a FIFO, and the entry number corresponds to the 9 LSB bits of the sequence number, a 16-bit value that is assigned by stage 3 to each packet. Thus, it is not possible that two packets exist with a sequence number having the 9 LSB bits the same.

The packet descriptor is composed of the following information:

Dword address (16): the "expanded" dword address within the packet buffer where the first 8 bytes of the packet reside. The expanded dword address consists on performing the following manipulation of the original dword address computed in stage 2:

Bit[15] becomes bit[14]

Bit[14] becomes bit[13]

Bit[13] becomes 0

This expanded dword address is compressed back following the inverse procedure when the packet is transmitted out (as will be explained in the transmission function).

Tribe (3): the tribe number to which the packet will be first migrated into. This value is derived from the second level hashing result generated in stage A and after applying in stage 3 some of the configuration bits of the hashing function.

FlowId (16): the result of the first level of the hashing function, computed in stage 2.

Sequence number (16): the value that is assigned by stage 3 to each packet at the end of the packet, ie when the packet has fully been received. After a sequence number has been provided, the register that contains the current sequence number is incremented. The sequence number wraps around at 0xFFFF.

Inbound port (2): the port number associated to the incoming packet.

Inbound channel (8): the channel number associated to the incoming packet.

Outbound port (5): this field will be eventually written with the software-provided value when the 'done' or 'egress_path_determined' configuration registers are written. At stage 3, this field is initialized to 0.

Outbound channel (9): this field will be eventually written with the software-provided when the 'done' or 'egress_determined' configuration registers are written. At stage 3, this field is initialized to 0.

Status (2): it is initialized with 1 (Active). This status will eventually change to either 0 (Invalid) if software requests the packet to be dropped, or to 2 (Done) if software requests the packet to be transmitted out.

Size (19): the size in bytes of the packet. The maximum allowed size is the size of a sector, ie 65536 bytes (but software can override the maximum allowed size to a lower value with the 'max_packet_size' configuration register).

Header growth delta (8): initialized with 0. Eventually this field will contain the amount of bytes that the head of the packet has grown or shrunk, and it will be provided by software when the packet is requested to be transmitted out.

Scheduled (1): specifies whether the egress path information is known for this packet. At stage 3, this bit is initialized to 0 (ie not scheduled).

Launch (1): bit that indicates whether the packet will be presented to one of the tribes for processing. At stage 3, this bit is initialized to 1 (ie the packet will be provided to one of the tribes for processing).

Error (1); bit that indicates that the packet arrived with an error notification from the ingress port.

The following are the valid combination of the 'launch' and 'error' bits in the packet descriptor:

launch=1, error=0. The normal case in which an error-free packet arrives and the NET block will eventually migrate into a tribe.

launch=0, error=0. A packet descriptor originated through a GetRoom command (explained later on). The packet associated to the descriptor will not be migrated.

launch=0, error=1. A packet arrived with an error notification. The packet is allowed to occupy space in the packet buffer and packet table for simplicity reasons (since the error can come in the middle of the packet, it is easier to let the packet reside in the already allocated packet buffer than recovering that space; besides, errors are rare, so the wasted space should have a minimal impact). The packet descriptor is marked with an Invalid status, and therefore the space that it occupies in the packet buffer will be eventually reclaimed when the packet descriptor becomes the oldest one controlled by one of the egress interleaving slots.

launch=1, error=1. Will never occur.

The descriptor will be read at least twice: once by the migration function to get some of the information and provide it to the initial tribe, and by the transmit logic, to figure out whether the packet needs to be transmitted out or dropped.

And the descriptor will be (partially) written at least once: when software decides what to do with the packet (transmit it out or drop it). The path and channel information (for the egress path) might be written twice if software decides to notify this information to the NET block before it notifies the completion of the packet.

Configuration Register Interface

The following configuration registers are read and/or written by the packet insertion function:

'max_packet_size': to cap the maximum packet size in order to minimize the memory fragmentation in the packet buffer.

'continue': if 0, the new incoming packets will be dropped.

'packet_table_packets': the total number of packets that the packet table keeps track of.

'status': specifies whether the network block is in reset mode and whether it is in quiescent mode.

Hashing engine configuration registers

First level (11_selection, 11_position, 11_skip)

Second level (12_selection[0 . . . 3], 12_position[0 . . . 3], 12_skip[0 . . . 3], 12_first[0 . . . 3], 12_total[0 . . . 3])

Performance events numbers 32-36 are monitored by the packet insertion function.

Packet Migration Function

The purpose of this function is to monitor the oldest packet in the packet table that still has not been migrated into one of the tribes and perform the migration. The migration protocol is illustrated in the table of FIG. 13.

This function keeps a counter with the number of packets that have been inserted into the packet table but still have not been migrated. If this number is greater than 0, the state machine that implements this function will request to read the oldest packet (pointer by the 'oldest to process' pointer). When the requested information is provided by the packet table access function (explained later on) the packet migration function requests the interconnect block to migrate a packet into a particular tribe (the tribe number was stored into the packet table by the packet insert function). When the interconnect accepts the migration, the packet migration function will send, in 3 consecutive cycles, information of the packet that one of the streams of the selected tribe will store in some general purpose and some CP0 registers.

The following information is provided in each of the 3 cycles in which data is transferred from the packet migration function to the interconnect block (all the information is available from the information stored in the packet table by the packet insertion function):

First cycle:
  PC (32): address where the stream of the tribe will start executing instructions
  FlowId (16): the result of the first level of hashing
Second cycle:
  Sequence number (16)
Third cycle:
  Address (32): physical address where the first packet of the packet resides.
  Ingress port (2): the ingress port of the packet.
  Ingress channel (8): the ingress channel of the packet.

Note that the same amount of information could be sent in only two cycles, but the single write port of the register file of the stream along with the mapping of this information into the different GPR and CP0 registers, requires a total of 3 cycles.

The migration interface with the interconnect block is pipelined in such a way that, as long as the interconnect always accepts the migration, every cycle the packet migration function will provide data. This implies that a migration takes a total of 3 cycles.

To maintain the 3-cycle throughput, there is a state machine that always tries to read the oldest packet to be migrated and put it into a 4-entry FIFO. Another state machine will consume the entries in this FIFO and perform the 3-cycle data transfer and complying with the Interconnect protocol. The FIFO is needed to squash the latency in accessing the packet table. As it will be seen later on when describing the packet table access function, requests performed by the packet migration function to the packet table might not be served right away. FIG. 13 shows a timing diagram of the interface between the packet migration function and the Interconnect module. The 'last' signal is asserted by the packet migration function when sending the information in the second data cycle. If the Interconnect does not grant the request, the packet migration function will keep requesting the migration until granted.

The migration protocol suffers from the following performance drawback: if the migration request is to a tribe x that can not accept the migration, the migration function will keep requesting for this migration, even if the following migration is available for request to a different tribe that would accept it. With a different, more complex interface, migrations could occur in a different order other than the order of arrival of packets into the packet table, improving the overall performance of the processor.

The following configuration registers are read and/or written by the packet migration function:
  'program_counter[0 . . . 7]': the initial PC from where the stream that will be associated to the packet will start fetching instructions.

Packet Transmission Function

The purpose of this function is to monitor the oldest packet that the packet table keeps track and decide what to do based on its status (drop it or transmit it). This is performed for each of the four egress interleaving slots.

There is an independent state machine associated to each of the four egress interleaving slots. Each state machine has a pointer to the oldest packet it keeps track of. When appropriate, each state machine requests to a logic to read the entry pointed by its pointer. The logic will schedule the different requests in a round-robin fashion and whenever the packet table access function allows it.

Whenever software requests to transmit or drop the oldest packet in the packet table a bit (name oldest_touched) is set. Whenever the state machine reads the entry pointed by its pointer, it resets the bit (logic exists to prevent both the set and reset at the same time).

The state machine will read the entry pointed by its pointer whenever the total number of packet in the table is greater than 1 and
1. 'oldest_touched' is 1, or
2. the previous packet read was dropped or transmitted out ('oldest_processed'=1).

This algorithm prevents the state machine to continuously reading the entry of the packet table with the information of the oldest packet, thus saving power.

The result of the reading of the packet table is presented to all of the state machines, so each state machine needs to figure out whether the provided result is the requested one (by comparing the entry number of the request and result). Moreover, in the case that the entry was indeed requested by the state machine, it might occur that the packet descriptor is not controlled by it since each state machine controls a specific egress port, and for channelized ports, a specific range of channels. In the case that the requested entry is not controlled by the state machine, it is skipped and the next entry is requested (the pointer is incremented and wrapped around at 512 if needed).

The port that each state machine controls is fixed given the contents of the 'total_ports' configuration register, as follows:
  total_ports=1. All state machines control port 0
  total_ports=2. State machine 0 and 1 control port 0, and state machines 2 and 3 control port 1.
  total_ports=4. There is a 1-to-1 correspondence between state machine and port.

Any other value of 'total_ports' will render undefined results.

The range of channels that each state machine controls is provided by the 'islot0_channels', , , , . 'islot3_channels' configuration registers.

The status field of the packet descriptor indicates what to do with the packet: drop (status is invalid), transmit (status is done), scheduled (the egress path information is known) or nothing (status is active).

If the packet descriptor is controlled by the state machine, then:
- if the status field is invalid, the state machine will update the pointer (it will be incremented by 1), and it will decrement the occupancy figure of the sector in which the packet resides by the size of the packet, including the offset for header growth, if any. It will also set the 'oldest_processed' bit and decrement the total number of packets.
- if the status field is completed, the state machine will start requesting the PBC to read the packet memory, and it will perform as many reads as necessary to completely read out the packet. These requests are requested to a logic that receives these requests from all the state machines, and will schedule them to the PBC in a round robin fashion. If this logic can not schedule the request of a particular state machine or if the PBC can not accept the requests, it will let the state machine know, and the state machine will need to hold the generation of the requests until the logic can schedule the requests. The request to the PBC includes the following information:
  - the address of the double word to be read out from the packet buffer
  - the channel number and port number
  - whether the request is for the last data of the packet or not
  - which bytes are valid
- if the packet is not completed, the state machine will take no action and will wait until software resolves the corresponding packet by either writing into the 'done' or 'drop' configuration register.

If the packet descriptor is not controlled by the state machine, then
- if the status field is invalid or completed, the state machine skips the packet, and the next entry is requested.
- if the status field not completed and the 'scheduled' bit is 1, the state machine also skips the packet and reads the next entry.
- if the status field not completed and the 'scheduled' bit is 0, the state machine will take no action and will wait until software resolves the corresponding packet by either writing into the 'done' or 'drop' configuration register, or until software notifies the egress path information by writing into the 'egress_path_determination' configuration register.

Any request to the packet buffer will go to the PBC sub-block, and eventually the requested data will arrive to the PIF sub-block. Part of the request to the PBC contains the state machine number, or egress interleaving slot number, so that the PIF sub-block can enqueue the data into the proper FIFO.

When a read request is performed (up to 8 bytes worth of valid data), the occupancy of the corresponding sector is decremented by the number of valid bytes. When all the necessary read requests have been done, the 'oldest_processed' bit is set and the total number of packets is decremented.

The 'oldest_processed' bit is reset when a new packet table entry is read.

The following configuration registers are read and/or written by the packet migration function:
- 'default_egress_channel': this is the egress channel in case the encoded egress channel in the packet descriptor is 0x1.
- 'to_transmit_ptr': the pointer to the oldest packet descriptor in the packet table
- 'head_growth_space': the amount of space reserved for each packet so that its head can grow. This information is needed by the packet lo transmission function to correctly update the occupancy figure when a packet is dropped or transmitted out.

There are no performance events associated to packet transmission function.

Packet Table Access Function

The purpose of this function is to schedule the different accesses to the packet table. The access can come from the packet insertion function, the packet migration function, the packet transmission function, and from software (through the PBM interface).

This function owns the packet table itself. It has 512 entries; therefore, the maximum number of packets that can be kept in the network block is 512. See the packet insertion function for the fields in each of the entries. The table is single ported (every cycle only a read or a write can occur). Since there are several sources that can request accesses simultaneously, a scheduler will arbitrate and select one request at a time.

The scheduler has a fixed-priority scheme implemented, providing the highest priority to the packet insertions from the packet insertion tribe. Second highest priority are the requests from software through the PBM interface, followed by the requests from the packet migration function and finally the requests from the packet transmit function. The access to the packet table takes one cycle, and the result is routed back to the source of the request.

The requests from software to the packet table can be divided into two types:
- Direct accesses. The packet table is part of the address space; software can perform reads and writes to it.
- Indirect accesses. Whenever software writes into the 'drop' or 'done' configuration registers, the hardware generates a write access to appropriate packet table entry with the necessary information to update the status of the packet.

All the reads/writes performed by software to the configuration registers of the PLD block are handled by the packet table access function. The only configuration registers not listed above are:
- 'done': software writes in this register to notify that the processing of the packet is completed. The sequence number, egress channel and head growth delta are provided.
- 'drop': software writes in this register to notify that a packet has to be dropped. The sequence number is provided.

Performance events numbers 37-43 are monitored by the packet table access function.

PacketBufferController Block 1403 (PBC)

The PBC block performs two top-level functions: requests enqueuing and requests scheduling. The requests enqueuing function buffers the requests to the packet buffer, and the requests scheduling performs the scheduling of the oldest request of each source into the 8 banks of the packet memory. FIG. 17 shows its block diagram.

Requests Enqueuing Function

The purpose of this function is to receive the requests from all the different sources and put them in the respective FIFOs. There are a total of 10 sources (8 tribes, packet stores from the ingress path, packet reads from the egress path)

[and DMA and tribe-like requests from the GLB block—TBD]. Only one request per cycle is allowed from each of the sources.

With the exception of the requests from the ingress path (named 'network in') all the requests from the other sources are enqueued into corresponding FIFOs. The request from the ingress path is stored in a register because the scheduling function (described later) will always provide priority to these requests and, therefore, they are guaranteed to be served right away.

All the FIFO's have 2 entries each, and whenever they get 1 or 2 entries with valid requests, a signal is sent to the corresponding source for flow control purposes.

For the requests coming from the tribes [and the GLB DMA and tribe-like requests—TBD] block, the requests enqueuing function performs a transformation of the address as follows:

If the address falls into the configuration register space containing the configuration registers and the packet table), the upper 18 bits of the address are zero'ed out (only the 14 LSB bits are kept, which correspond the configuration register number). The upper 1024 configuration registers correspond to the 512 entries in the packet table (2 consecutive configuration registers compose one entry).

If the address falls into the packet buffer space, the address is modified as follows:
Bit 16 becomes Bit 17
Bit 17 becomes Bit 18
Bit 19 is reset.

This is done to convert the 512 KB logical space of the packet buffer that software sees to the physical 256 KB space. Also, a bit is generated into the FIFO that specifies whether the access is to the packet buffer or the configuration register space.

This function does not affect or is affected by any configuration register.

Performance events numbers 64-86 and 58 are monitored by the packet insertion function.

Requests Scheduling Function

This function looks at the oldest request in the FIFOs and schedules them into the 8 banks of the packet memory. The goal is to schedule as many requests (up to 8, one per bank). It will also schedule up to one request per cycle that access the configuration register space.

The packet buffer memory is organized in 8 interleaved banks. Each bank is then 64 KB in size and its width is 64 bits. The scheduler will compute into which bank the different candidate requests (the oldest requests in each of the FIFOs and the network in register) will access. Then, it will schedule one request to each bank, if possible.

The scheduler has a fixed-priority scheme implemented as follows (in order of priority):
Ingress requests
Egress requests
Global requests—TBD
Tribe requests. The tribe requests are treated fairly among themselves. Even banks will pick the access of the tribe with the lowest index, whereas odd banks will pick the access of the tribe with the highest index. Since the accesses of a tribe are expected to be usually sequential, consecutive accesses will visit consecutive banks, thus providing a balanced priority to each tribe.

Whenever a tribe or GBL request accesses the configuration register space, no other configuration space access will be scheduled from any of the tribes of GBL until the previous access has been performed.

This function does not get affected nor affects any configuration register.

Performance events numbers 32-39, 48-55, 57 and 59 are monitored by the packet insertion function PacketBufferMemory Block 1404 (PBM)

The purpose of this block is to perform the request to the packet buffer memory or the configuration register space. When the result of the access is ready, it will route the result (if needed) to the corresponding source of the request. The different functions in this block are the configuration register function and the result routing function. FIG. 18 shows its block diagram.

The packet buffer is part of this block. The packet buffer is 256 KB in size and it is physically organized in 8 interleaved banks, each bank having one 64-bit port. Therefore, the peak bandwidth of the memory is 64 bytes per cycle, or 2.4 G bytes/sec.

Configuration Register Function

The PBC scheduled up to 1 request to the configuration register space. This function serves this request. If the configuration register number falls into the configuration registers that this function controls ('perf_counter_event [0 . . . 7]' and 'perf_counter_value[0 . . . 7]'), this function executes the request; otherwise, the request is broadcast to both the PIF and PLD blocks. One of them will execute the request, whoever controls the corresponding configuration register.

This function keeps track of the events that the PIF, PLD and PBC blocks report, and keeps a counter for up to 8 of those events (software can configure which ones to keep track).

Result Routing Function

The result routing function has the goal of receiving the result of both the packet memory access and the configuration register space access and rout it to the source of the request.

To do that, this function stored some control information of the request, which is later on used to decide where the result should go. The possible destinations of the result of the request are the same sources of requests to the PBC with the exception of the egress path (network out requests) that do not need confirmation of the writes.

The results come from the packet buffer memory and the configuration register function.

No performance events nor configuration registers are associated to this function.

Interconnect Block of the Porthos Chip

Overview

The migration interconnect block of the Porthos chip (see FIG. 1, element 109) arbitrates stream migration requests and directs migration traffic between the network block and the 8 tribes. It also resolves deadlocks and handles events such as interrupts and reset.

Interfaces

Interface names follow the convention SD_name, where S is source block code and D is destination block code. The block codes are:
T: Tribe
I: Migration interconnect
G: Controller FIG. 19 is a table providing Interface to tribe # (ranging from 0 to 7), giving name and description.

FIG. 20 is a table providing Interface to Network block, with name and description.

FIG. 21 is a table providing interface to global block, with name and description.

Tribe full codes are:
TRIBE_FULL 3
TRIBE_NEARLY_FULL 2
TRIBE_HALF_FULL 1
TRIBE_EMPTY 0

Migration Protocol Timing

A requester sends out requests to the interconnect, which replies with grant signals. If a request is granted, the requester sends 64-bit chunks of data, and finalizes the transaction with a finish signal. The first set of data must be sent one cycle after "grant." The signal "last" is sent one cycle before the last chunk of data, and a new request can be made in the same cycle. This allows the new data transfer to happen right after the last data has been transferred.

Arbitration is ongoing whenever the destination tribe is free. Arbitration for a destination tribe is halted when "grant" is asserted and can restart one cycle after "last" is asserted for network-tribe/interrupt-tribe migration, or the same cycle as "last" for tribe-tribe migration.

There is a race condition between the "last" signal and the "full" signal. The "last" signal can be sent as soon as one cycle after "grant" while the earliest "full" arrives 4 cycles after "grant" from tribe. To avoid this race condition and prevent overflow, the "almost full to full" is used for 3 cycles after a grant for a destination tribe.

The Network-Tribe/Tribe-tribe migration protocol timing is shown in FIG. 22.

Interconnect Modules

FIG. 40 illustrates interconnect modules. The interconnect block consists of 3 modules. An Event module collects event information and activate a new stream to process the event. An Arbiter module performs arbitration between sources and destinations. A Crossbar module directs data from sources to destinations.

Arbiter

Arbitration Problem

There are 11 sources of requests, the 8 tribes, the network block, the event handling module and transient buffers. Each source tribe can make up to 7 requests, one for each destination tribe. The network block, event handling module, and transient buffers each can make one request to one of the 8 tribes.

If there's a request from transient buffers to a tribe, that request has the highest priority and no arbitration is necessary for that tribe. If transient buffers are not making request, then arbitration is necessary.

FIG. 41 illustrates a matching matrix for the arbitration problem. Each point is a possible match, with 1 representing a request, and X meaning illegal match (a tribe talking to itself). If a source is busy, the entire row is unavailable for consideration in prioritization and appear as zeroes in the matching matrix. Likewise, an entire column is zeroed out if the corresponding destination is busy.

The arbiter needs to match the requester to the destination in such a way as to maximize utilization of the interconnect, while also preventing starvation.

A round-robin prioritizing scheme is used in an embodiment. There are two stages. The first stage selects one non-busy source for a given non-busy destination. The second stage resolves cases where the same source was selected for multiple destinations.

At the end of the first stage, a crossbar mux selects can be calculated by encoding the destination columns. At the end of the second stage, the "grant" signals can be calculated by OR-ing the entire destination column.

Each source and each destination has a round-robin pointer. This points to the source or destination with the highest priority. The round-robin prioritization logic begin searching for the first available source or destination beginning at the pointer and moving in one direction.

FIG. 42 illustrates arbiter stages. The arbitration scheme described above is "greedy," meaning it attempts to pick the requests that can proceed, skipping over sources and destinations that are busy. In other words, when a connection is set up between a source and a destination, the source and destination are locked out from later arbitration. With this scheme, there are cases when the arbiter starves certain context. It could happen that two repeated requests, with overlapping transaction times, can prevent other requests from being processed. To prevent this, the arbitration operates in two modes. The first mode is "greedy" mode as described above. For each request that cannot proceed, there is a counter that keeps track of the number of times that request has been skipped. When the counter reaches a threshold, the arbitration will not skip over this request, but rather wait at the request until the source and destination become available. If multiple requests reach this priority for the same source or destination, then one-by-one will be allowed to proceed in a strict round-robin fashion. The threshold can be set via the Greedy Threshold configuration register.

Utilization

Utilization of the interconnect depends on the nature of migration. If only one source is requesting all destinations (say tribe0 wants tribe 1-7) or if all sources are requesting one destination, then the maximum utilization is 12.5% (1 out of 8 possible simultaneous connections). If the flow of migration is unidirectional, (say network to tribe0, tribe0 to tribe1, etc.), then the maximum utilization is 100%.

Deadlock Resolution

FIG. 43 illustrates deadlock resolution. Deadlock occurs when the tribes in migration loops are all full, i.e. tribe 1 requests migration to tribe 2 and vice versa and both tribes are full. The loops can have up to 8 tribes.

To break a deadlock, Porthos uses two transient buffers in the interconnect, with each buffer capable of storing an entire migration (66 bits times maximum migration cycles). The migration request with both source and destination full (with destination wanting to migrate out) can be sent to a transient buffer. The transient stream becomes highest priority and initiate a migration to the destination, while at the same time the destination redirect a migration to the second transient buffer. Both of these transfers need to be atomic, meaning no other transfer is allowed to the destination tribe and the tribe is not allowed to spawn new stream within itself. This process is indicated to the target tribe by the signal IT_transient_swap_valid_#. The migrations into and out of a transient buffers use the same protocol as tribe-tribe migrations.

This method begins by detecting only possibility of deadlock and not the actual deadlock condition. It allows forward progress while looking for the actual deadlock, although there maybe cases where no deadlock is found. It also substantially reduces the hardware complexity with minimal impact on performance.

A migration that uses the transient buffers will incur an average of 2 migration delays (a migration delay is the number of cycles needed to complete a migrate). The delays don't impact performance significantly since the migration is already waiting for the destination to free up.

Using transient buffers will suffice in all deadlock situations involving migration:
- Simple deadlock loops involving 2 to 8 tribes
- Multiple deadlock loops with 1 or more shared tribes
- Multiple deadlock loops with no shared tribe
- Multiple deadlock loops that are connected In the case of multiple loops, the transient buffers will break one loop at a time. The loop is broken when the transient buffers are emptied.

Hardware deadlock resolution cannot solve the deadlock situation that involve software dependency. For example, a tribe in one deadlock loop waits for some result from a tribe in the another deadlock loop that has no tribe in common with the first loop. Transient buffers will service the first deadlock loop and can never break that loop.

Event Module

Upon hardware reset, an event module spawns a new stream in tribe 0 to process reset event. This reset event comes from global block. The reset vector is PC=0xBFC00000.

Event module spawns a new stream via the interconnect logic based on external and timer interrupts. The default interrupt vector is 0x80000180.

Each interrupt is maskable by writing to Interrupt Mask configuration registers in configuration space. There are two methods an interrupt can be directed. In the first method, the interrupt is directed to any tribe that is not empty. This is accomplished by the event module making requests to all 8 destination tribes. When there is a grant to one tribe, the event module stops making requests to the other tribes and start a migration for the interrupt handling stream. In the second method, the interrupt is being directed to a particular tribe. The tribe number for the second method as well as which method are specified using Interrupt Method configuration registers for each interrupt.

The event module has a 32-bit timer which increments every cycle. When this timer matches the Count configuration register, it activates a new stream via the migration interconnect.

The interrupt vectors default to 0x80000180 and are changeable via Interrupt Vector configuration registers.

External interrupt occurs when the external interrupt pin is asserted. If no thread is available to accept the interrupt, the interrupt is pending until a thread becomes available.

In order to reserve some threads for event-based activations, migrations from network to a tribe can be limited. These limits are set via Network Migration Limit configuration registers (there is one per tribe). When the number of threads in a tribe reaches it's corresponding limit, new migrations from network to that tribe are halted until the number of threads drops below the limit.

Crossbar module

FIG. 44 is an illustration of the crossbar module. This is a 10 inputs, 8 outputs crossbar. Each input is comprised of a "valid" bit, 64-bit data, and a "last" bit. Each output is comprised of the same. For each output, there's a corresponding 4-bit select input which selects one of 10 inputs for that particular output. Also, for each output, there's a 1-bit input which indicates whether the output port is being selected or busy. This "busy" bit is ANDed with the selected "valid" and "last" so that those signals are valid only when the port is busy. The output is registered before being sent to the destination tribe.

Performance Counters

With performance counters the performance of the interconnect can be determined. An event is selected by writing to the Interconnect Event configuration registers (one per tribe) in configuration space. Global holds the selection via the selection bus, and the tribe memory interface returns to global the selected event count every cycle via the event bus. The events are:
- Total number of requests and total number of grants in a period of time
- Number of requests and number of grants for each destination in a period of time
- Average time from request to grant overall
- Average time from request to grant for each destination
- Average time from request to grant for each source
- Average migration time overall
- Average migration time per destination
- Average migration time per source Configuration Registers The configuration registers for interconnect and their memory locations are:

| | |
|---|---|
| Interrupt Masks | 0x70000800 |
| Interrupt Pending | 0x70000804 |
| Timer | 0x70000808 |
| Count | 0x70000810 |
| Timer Interrupt Vector | 0x70000818 |
| External Interrupt Vector | 0x70000820 |
| Greedy Threshold | 0x70000828 |
| Network Migration Limit | 0x70000830 |

Memory Interface Block Porthos Chip

Overview

This section describes the microarchitecture of the memory interface block, which connects the memory controller to the tribe and the global block. FIG. 45 illustrates the tribe to memory interface modules.

Interfaces

Interface names follow the convention SD_signal_name, where S is source block code and D is destination block code. The block codes are:

T: Tribe
M: Tribe memory interface
L: Tribe memory controller
G: Controller

FIG. 23 is a table illustrating Interface to Tribe.
FIG. 24 is a table illustrating interface to Global.
FIG. 25 is a table illustrating interface to Tribe Memory Controller.

Request types (not command type) are:
MEM_UREAD 0
MEM_SREAD 1
MEM_WRITE 2
MEM_UREAD_RET 4
MEM_SREAD_RET 5
MEM_WRITE_RET 6
MEM_ERROR_RET 7

Memory size codes are:
MEM_SIZE_8 0
MEM_SIZE_16 1
MEM_SIZE_32 2
MEM_SIZE_64 3
MEM_SIZE_128 4
MEM_SIZE_256 5

Interface Timings

Tribe to tribe memory interface timing:

Tribe sends all memory requests to tribe memory interface. The request can be either access to tribe's own memory or to other memory space. If a request accesses tribe's own memory, the request is saved in the tribe memory interface's request queue. Else, it is sent to global block's request queue. Each of these queues have a corresponding full signal, which tells tribe block to stop sending request to the corresponding memory space.

A request is valid if the valid bit is set and must be accepted by the tribe memory interface block. Due to the one cycle delay of the full signal, the full signal must be asserted when there's one entry left in the queue.

FIG. 26 illustrates tribe to tribe memory interface timing.

Tribe memory interface to controller timing:

This interface is different from other interfaces in that if memory controller queue full is asserted, the memory request is held until the full signal is de-asserted.

FIG. 27 illustrates tribe memory interface to controller timing

Tribe memory interface to global timing:

Tribe memory interface can send request or return over the transaction bus (MG_transaction*). Global can send request or return over the GM_transaction set of signals.

FIG. 28 illustrates tribe memory interface to global timing

Tribe Memory Interface Block Modules

Input module:

This module accepts requests from tribe and global. If the request from tribe has address that falls within the range of tribe memory space, the request is valid and can be sent to request queue module. If the request has address that falls outside that range, the request is directed to the global block. The tribe number is tagged to the request that goes to global block.

Global block only send valid request to a tribe if the request address falls within the range of that tribe's memory space.

The input module selects one valid request to send to request buffer, which has only one input port. The selection is as follows:

Pick saved tribe request if there are 2 saved requests and an incoming tribe request, or if there's only saved tribe request Else pick saved global request if there's only saved global request Else pick incoming tribe request if it exists Else pick incoming global request if it exists The module sends flow control signals to tribe and global:

Stall tribe requests if there's incoming global request

Stall global requests if there's incoming tribe request

Save global input if input is not selected during mux selection and saved input slot is free. Else keep old saved input. Similarly for tribe input.

FIG. 29 illustrates input module stall signals

FIG. 46 illustrates the input module data path.

Request buffer and issue module:

FIG. 49 is an illustration of a request Buffer and Issue Module. There are 16 entries in the queue. When there is a new request, the address and size of the request is compared to all the addresses and sizes in the request buffer. Any dependency is saved in the dependency matrix, with each bit representing a dependency between two entries. When an entry is issued to memory controller, the corresponding dependency bits are cleared in the other entries.

The different dependencies are:

Write-after-write: the second write overwrites data written by the first write, so the second write is not allowed to be processed before the first write.

Write-after-read: The read should not be affected by the write. Thus, the write is not be allowed to be processed before the read.

Read-after-write: If there are not enough bytes in the writebuffer to forward to the read, then there's no forwarding and the read is not allowed to be processed before the write.

For read-after-read, if there's no write to the same address between the reads, the reads can be reordered.

Each entry has:
1-bit valid
27-bit byte address
3-bit size code of read data requested
5-bit stream number
3-bit tribe number
5-bit register destination (read)
64-bit data (write)
16-bit dependency vector This module also reorders and issues the requests to the memory controller. The reordering is necessary so that the memory bus is better utilized. The reordering algorithm is as follows:

If an entry is dependent on another entry, it is not considered for issue until the dependency is cleared.

Find all entries with address in a bank different from any issued request in the previous n cycles, where n is the striping distance (i.e. 8 for RLDRAM at 300 MHz).

Separate the eligible entries into reads and writes

Try to issue up to x number of the same type (read or write) before switching to another type. If the other type is not available, continue issuing the same type.

Save the bank number of the issued request in history table.

A count register keeps track of the number of valid entries. If the number reaches a watermark level, both the MT_int_request_queue_full and MG_req_transaction_full signals are asserted.

Write buffer:

FIG. 47 Illustrates a write buffer module.

The write buffer stores 16 latest writes. If subsequent read is to one of these addresses, then the data stored in the write buffer can be forwarded to the read.

Each entry has:
8-bit valid bits (one for each byte of data)
32-bit address
64-bit data
4-bit LRU When there is a new read, the address of the read is compared to all the addresses in the write buffer. If there is a match, the data from the buffer can be forwarded.

When there is a new write, the address of the write is compared to all the addresses in the write buffer. If there is a match, the write data replaces the write buffer data. If there's no match, the write data replaces one of the write-buffer entry. The replacement entry is picked based on LRU bits, described below.

To prevent frequent turning over of writebuffer entries, only writes from local tribe are allowed to replace an entry. Writes from other tribes are only used to overwrite an entry with the same address.

LRU field indicates how recent the entry has been accessed. The higher the number, the less recently used. A new entry has LRU value of zero. Everytime there is an access to the same entry (forward from the entry or overwrite of entry), the value is reset to zero while the other entries' LRU are increased by one. When a LRU value reaches maximum, it is unchanged until the entry is itself being accessed.

The replacement entry is picked from the entries with the higher LRUs before being picked from entries with lower LRUs.

Return module:

There are 3 possible sources for returns to tribe: tribe memory, global, and forwarding. Returns from tribe memory bound for tribe are put into an 8 entry queue. Memory tag information arrives first from the request queue. If it's a write return, it can be returned to tribe immediately. If it's a read, it must wait for the read data returning from the tribe memory.

f global is contending for the return to tribe bus, memory block asserts MG_rsp_transaction_full signal to temporarily stop the response from global so tribe memory returns and/or forwarded returns bound for tribe can proceed.

There are 2 possible sources for returns to global: tribe memory and forwarding. These must contend with tribe requests for the transaction bus. Returns from tribe memory bound for global are put into another set of 8 entry queue. This queue is the similar to the queue designated for returns to tribe.

If tribe is contending for the return to global bus, memory block asserts MT_ext_request_queue_full signal to stop the external requests from tribe so tribe memory returns and/or forwarded returns bound for global block can proceed.

All memory accesses are returned to the original tribe that made the requests. Writes are returned to acknowledge completion of writes. Reads are returned with the read data. Returned information include the information send with the request originally. These are stream, regdest, type, size, offset, and data. Offset is lower 3 bits of the original address. Regdest, offset, size and data are relevant only for reads.

Stream, regdeset, size and offset are unchanged in all returns. Type is changed to the corresponding return type. If there is ECC uncorrectable error or non-existing memory error, the type MEM_ERROR_RET is returned with read return.

Read data results are 64-bit aligned, so the tribe needs to perform shifting and sign-extension if needed to get the final results.

FIG. 48 illustrates the return module data path.

Tribe Memory Configuration Registers

The memory controllers are configured by writing to configuration registers during initialization. These registers are mapped to configuration space beginning at address 0x70000000. Global must detect the write condition and broadcast to all the tribe memory blocks. It needs to assert the GM_initialize_controller while placing the register address and data to be written on the memory transaction bus. Please see Denali specification for descriptions of controller registers.

Assumptions about Memory Controller

Memory controller IP is expected to have the following functionalities:

ECC is enabled, so read-modify-write is included for unaligned accesses 8-entry ingress queue (data and command)

1-entry egress queue

Can process up to 256-bit memory requests.

Doesn't include reordering or forwarding features.

Performance Counters

This block generates event counts for performance counters. The event is selected by writing to Tribe MI Event configuration registers (one per tribe) in configuration space. Global holds the selection via the selection bus, and the tribe memory interface returns to global the selected event count every cycle via the event bus. The events counted are:

length of request queue
length of return queue
write/read issued
forwarded from write buffer
global request stall
global response stall
tribe request stall Tribe Block Microarchitecture Porthos Chip Overview A Tribe block 104 (See FIG. 1) contains a multithreaded pipeline that implements the processing of instructions. It fits into the overall Porthos chip microarchitecture as shown in FIG. 33. The Tribe microarchitecture is shown in FIG. 34, which illustrates the modules that implement the Tribe and the major data path connections between those modules.

A Tribe contains an instruction cache and register files for 32 threads. The tribe block interfaces with the Network block (for handing packet buffer reads and writes), the Interconnect block (for handling thread migration) and the Memory block (for handling local memory reads and writes).

Interfaces

FIG. 30 shows interface to the Memory block.
FIG. 31 shows interface to the Network block.
FIG. 32 shows interface to the Interconnect block.

Tribe Detailed Description

The Tribe block consists of three decoupled pipelines. The fetch logic and instruction cache form a fetch unit that will fetch from two threads per cycle according to thread priority among the threads that have a fetch available to be performed. The Stream block within the Tribe contains its own state machine that sequences reads and writes to the register file and executes certain instructions. Finally the scheduler, global ALU and memory modules form an execute unit that schedules operations based on global priority among the set of threads that have an instruction available for scheduling. At most one instruction per cycle is scheduled from any given thread. Globally, up to three instructions can be scheduled in a single cycle, but some instructions can be fully executed within the Stream block, not requiring global scheduling. Thus, the maximum rate of instruction execution is actually determined by the fetch unit, which can fetch up to eight instructions each cycle. A sustained execution rate of five to six instructions per cycle is expected.

Instruction Fetch

The instruction fetch mechanism fetches four instructions from two threads for a total fetch bandwidth of eight instructions. The fetch unit includes decoders so that four decoded instructions are delivered to two different stream modules in each cycle. There is a 16K byte instruction cache shared by all threads that is organized as 1024 lines of 16 bytes each, separated into four ways of 256 lines. The fetch mechanism is pipelined, with the tags accessed in the same cycle as the data. The fetch pipeline is illustrated in FIG. 35. In an alternative embodiment, the tag read for all ways is pipelined with the data read for only the way that that contains valid data. This increases the overall fetch pipeline by one cycle, but it would significantly reduce the amount of power and the wiring required to support the instruction cache.

Stream Modules

The Stream modules (one per stream for a total of 32 within the Tribe block) are responsible for sequencing reads and writes to the register files, executing branch instructions, and handling certain other arithmetic and logic operations. A Stream module receives two decoded instructions at a time from the Fetch mechanism and saves them for later processing. One instruction is processed at a time, with some instructions taking multiple cycles to process. Since there is only a single port to the register file, all reads and writes must be sequenced by the Stream block. The basic pipeline of the Stream module is shown in FIG. 36. Note that in cases where only a single operand needs to be read from the register file, the instruction would be available for global scheduling with only a single RF read stage. Each register contains a ready bit that is used to determine if the most recent version of a register is in the register file, or it will be written by an outstanding memory load or ALU instruction.

Writes returning from the Network block and the Memory block must also be sequenced to the register file. The register write sequencing pipeline of the Stream block is shown in FIG. 37. When a memory instruction, or an instruction for the global ALU is encountered, the operation matrix, or OM, register is updated to reflect a request to the global scheduling and execute mechanism.

Branch instructions are executed within the Stream module as illustrated in FIG. 38. Branch operands can come from the register file, or can come from outstanding memory or ALU instructions. The branch operand registers are updated in the same cycle in which the write to the register file is scheduled. This allows the execution of the branch to take place in the following cycle. Since branches are delayed, the instruction after the branch instruction must be processed before the target of the branch can be fetched. The earliest that a branch delay slot instruction can be processed is the same cycle that a branch is executed. Thus, a fetch request can be made at the end of this cycle at the earliest. The processing of the delay slot instruction would occur later than this if it was not yet available from the Fetch pipeline.

Scheduling and Execute

The scheduling and execute modules schedule up to three instructions per cycle from three separate streams and handle register writes back to the stream modules. The execute pipeline is shown in FIG. 39. Streams are selected based on what instruction is available for execution (only one instruction per stream is considered a candidate), and on the overall stream priority. Once selected, a stream will not be able to selected in the following cycle since there is a minimum two cycle feedback to the Stream block for preparing another instruction for execution.

Thread Migration

The thread migration module is responsible for migrating threads into the Tribe block and out of the Tribe block. A thread can only be participating in migration if it is not actively executing instructions. During miration, a single register read or write per cycle is processed by the Stream module and sent to the Interconnect block. A migration may contain any number of registers. When an inactive stream is migrated in, all registers that are not explicitly initialized are set invalid. An invalid register will always return 0 if read. A single valid bit per register allows the register file to behave as if all registers are initialized to zero when a thread is initialized.

In an alternative embodiment, thread migration is automatic and under hardware control. Hardware in each of the tribes monitors the frequency of accesses to a remote local memory vs. accesses to its own local memory. If a certain threshold is reached, or based on a predictive algorithm, the thread is automatically migrated by the hardware to another tribe for which a higher percentage of local accesses will occur. In this case migration is transparent to software.

Thread Priority and Flow Gating

Thread priority (used for fetch scheduling and execute scheduling) are maintained by the "LStream" module. This module also maintains a gateability vector used to implement FlowGating. The LStream module is responsible for determining for each thread whether or not it should stall upon the execution of a "GATE" instruction, or should stall. This single bit per thread is exported to each Stream block. Any time a change is made to any CP0 register that can potentially affect gateability, the LStream module will export all 0's on its gateability vector (indicating no thread can proceed past a GATE), until a new gateability vector is computed.

Changes that affect gateability are rare. They are as follows:

1. A new thread is created, it will be migrated in with its own sequence number, gate vector and flow ID register;
2. An existing thread is deactivated, either due to a DONE instruction or a NEXT instruction (migration out to another tribe);
3. A thread explicitly updates one of its gateability CP0 registers (sequence number, gate vector, flow ID)using the MTC0 instruction.

Debugging and Performance Monitoring

The Tribe block contains debugging hardware to assist software debugging and performance counters to assist in architecture modeling.

All of the above description and teaching is specific to a single implementation of the present invention, and it should be clear to the skilled artisan that there are many alterations and amendments that might be made to the example provided, without departing from the spirit and scope of the invention. For example, the aggressively multi-threaded architecture may be accomplished with more or fewer tribes. Many unique and novel features stand alone without the limitation of a tribe architecture at all. Interconnection and communication among the many parts of the Porthos chip may be accomplished in a variety of ways within the spirit and scope of the invention.

In addition to the above, in some embodiments of the Porthos chip a portion of the packet buffer memory can be configured as "shared" memory for all the tribes. This portion will not be used by the logic that decides where the incoming packet will be stored into. Therefore, this portion of shared memory is available for the tribes for any storage purpose. In addition the ports to the packet buffer can be used for both types of accesses (to packet data and to the shared portion).

In some embodiments software can configure the size of the shared portion of the packet buffer. One implementation of this configuration mechanism allows software to set aside either half, one fourth or none of the packet buffer as shared memory. The shared memory can be used to store data that is global to all the processing cores, but it can also be divided into the different cores so that each core has its own space, thus no mutually exclusive operation is needed to allocate memory space.

In some embodiments the division of the shared space into the different processing cores and/or threads may provide storage for the stack of each thread. For those threads in which life corresponds to the life of the packet, the header growth offset mechanism may be used to provide storage space for the stack. For those threads that operate on more than a packet, or that need the stack after completing and sending out the processed packet, a persistent space is needed for the stack; for these threads, space in the external memory (long latency) or in the shared portion of the packet buffer (short latency) is required.

Further to the above, in some embodiments the header growth offset mechanism is intended for software to have some empty space at the beginning of the packet in case the header of the packet has to grow in a few bytes. Note that software may also use this mechanism to guarantee that there is space at the end of a packet A by using the header growth offset space that will be set aside for a future incoming packet B that will be stored after packet A. Even if packet B has still not arrived, software can use the space at the end of packet A since it is guaranteed that either that space has still not been assigned to any packet, or will be assigned to packet B without modifying its content when this occurs. The header growth offset can also be shared among the incoming packet B and the packet stored right above A, as long as the upper space of the growth offset used as tail growth offset of packet A does not overlap with the lower space of the growth offset used as head growth offset of packet B.

There are similarly many other alterations that may be made within the spirit and scope of the invention.

What is claimed is:

1. In a processing engine comprising a plurality of tribes, each tribe comprising a plurality of streams and context registers, each stream capable of executing a thread of execution, a method implemented by the processing engine, comprising:
  detecting that a first destination tribe is full;
  in response to detecting that the first destination tribe is full, migrating a first thread of execution from a first tribe into a first transient buffer, the first thread of execution destined to be migrated into the first destination tribe;
  migrating a second thread of execution from the first destination tribe into a second transient buffer, thereby causing the first destination tribe to no longer be full, wherein the second thread of execution is destined to be migrated to a second destination tribe;
  migrating the first thread of execution from the first transient buffer into the first destination tribe;
  migrating a third thread of execution from the second destination tribe into the first transient buffer; and
  migrating the second thread of execution from the second transient buffer into the second destination tribe.

2. The method of claim 1, wherein it is guaranteed that, after the second thread of execution is migrated from the first destination tribe, the first thread of execution will be able to migrate into the first destination tribe.

3. A processing engine, comprising:
  a first memory portion and a second memory portion;
  a first tribe comprising a plurality of streams and context registers, wherein each stream is capable of executing a thread of execution, wherein multiple streams in the first tribe may be concurrently active such that multiple threads of execution may be concurrently executing within the first tribe, and wherein all of the threads of execution executing within the first tribe can access the first memory portion;
  a second tribe comprising a plurality of streams and context registers, wherein each stream is capable of executing a thread of execution, wherein multiple streams in the second tribe may be concurrently active such that multiple threads of execution may be concurrently executing within the second tribe, and wherein all of the threads of execution executing within the second tribe can access the second memory portion; and
  a migration mechanism coupled to the first and second tribes for enabling a thread of execution currently executing in one tribe to be migrated to another tribe to be executed therein;
  wherein the migration mechanism migrates a migrating thread of execution from a requesting tribe to a destination tribe (where the requesting tribe may be either the first or the second tribe, and the destination tribe may be either the first or the second tribe) by:
    obtaining execution context information pertaining to the migrating thread of execution from the requesting tribe; and
    providing the execution context information pertaining to the migrating thread of execution to the destination tribe.

4. The processing engine of claim 3,
  wherein each thread of execution in the first tribe can access both the first and second memory portions but can access the first memory portion with less overhead than the second memory portion;
  wherein each thread of execution in the second tribe can access both the first and second memory portions but can access the second memory portion with less overhead than the first memory portion;
  wherein the first tribe further comprises a monitoring mechanism for monitoring memory accesses to determine whether any thread of execution in the first tribe is accessing the second memory portion to a sufficient degree to warrant migrating that thread to the second tribe; and
  wherein, in response to a determination by the monitoring mechanism that a particular thread of execution in the first tribe is accessing the second memory portion to a sufficient degree to warrant migrating that thread of execution to the second tribe, the migration mechanism may be invoked by the first tribe to migrate the particular thread of execution from the first tribe to the second tribe to be executed therein.

5. The processing engine of claim 3, wherein the migration mechanism comprises a deadlock resolution mechanism, which detects possible deadlock caused by desired migration of a thread of execution to a full tribe, and breaks the deadlock to enable a thread of execution to be migrated to the full tribe.

6. A processing engine, comprising:
  a first memory portion and a second memory portion;
  a first tribe comprising a plurality of streams and context registers, wherein each stream is capable of executing a thread of execution, wherein multiple streams in the first tribe may be concurrently active such that multiple threads of execution may be concurrently executing within the first tribe, and wherein each of the threads of execution executing within the first tribe can access both the first and second memory portions but can access the first memory portion with less overhead than the second memory portion;

a second tribe comprising a plurality of streams and context registers, wherein each stream is capable of executing a thread of execution, wherein multiple streams in the second tribe may be concurrently active such that multiple threads of execution may be concurrently executing within the second tribe, and wherein each of the threads of execution executing within the second tribe can access both the first and second memory portions but can access the second memory portion with less overhead than the first memory portion; and a migration mechanism coupled to the first and second tribes for enabling a thread of execution currently executing in one tribe to be migrated to another tribe to be executed therein;

wherein the first tribe further comprises a monitoring mechanism for monitoring memory accesses to determine whether any thread of execution in the first tribe is accessing the second memory portion to a sufficient degree to warrant migrating that thread to the second tribe;

wherein, in response to a determination by the monitoring mechanism that a particular thread of execution in the first tribe is accessing the second memory portion to a sufficient degree to warrant migrating that thread of execution to the second tribe, the migration mechanism may be invoked by the first tribe to migrate the particular thread of execution from the first tribe to the second tribe to be executed therein;

wherein the second tribe further comprises a second monitoring mechanism for monitoring memory accesses to determine whether any thread of execution in the second tribe is accessing the first memory portion to a sufficient degree to warrant migrating that thread to the first tribe; and wherein, in response to a determination by the second monitoring mechanism that a certain thread of execution in the second tribe is accessing the first memory portion to a sufficient degree to warrant migrating that thread of execution to the first tribe, the migration mechanism may be invoked by the second tribe to migrate the certain thread of execution from the second tribe to the first tribe to be executed therein.

7. A processing engine, comprising:

a first memory portion and a second memory portion;

a first tribe comprising a plurality of streams and context registers, wherein each stream is capable of executing a thread of execution, wherein multiple streams in the first tribe may be concurrently active such that multiple threads of execution may be concurrently executing within the first tribe, and wherein all of the threads of execution executing within the first tribe can access the first memory portion;

a second tribe comprising a plurality of streams and context registers, wherein each stream is capable of executing a thread of execution, wherein multiple streams in the second tribe may be concurrently active such that multiple threads of execution may be concurrently executing within the second tribe, and wherein all of the threads of execution executing within the second tribe can access the second memory portion; and a migration mechanism coupled to the first and second tribes for enabling a thread of execution currently executing in one tribe to be migrated to another tribe to be executed therein;

wherein the migration mechanism comprises:

an arbiter, the arbiter capable of interacting with a requesting tribe and a destination tribe to coordinate migration of a migrating thread of execution from the requesting tribe to the destination tribe, wherein the requesting tribe may be either the first or the second tribe, and the destination tribe may be either the first or the second tribe; and an interconnect, the interconnect enabling execution context information pertaining to the migrating thread of execution to be transported from the requesting tribe to the destination tribe.

8. The processing engine of claim 7, wherein the requesting tribe comprises a migration interface, the migration interface capable of interacting with the arbiter to coordinate sending of the execution context information pertaining to the migrating thread of execution from the requesting tribe to the destination tribe via the interconnect.

9. The processing engine of claim 8, wherein the migration interface is capable of submitting a migration request to the arbiter, waiting for a grant from the arbiter, and sending the execution context information pertaining to the migrating thread of execution to the destination tribe via the interconnect.

10. The processing engine of claim 8, wherein the destination tribe comprises a second migration interface, the second migration interface capable of providing an indication to the arbiter that the destination tribe is not currently full, receiving the execution context information pertaining to the migrating thread of execution, and causing the migrating thread of execution to be executed within the destination tribe in accordance with the execution context information.

11. A processing engine, comprising:

a first memory portion and a second memory portion;

a first tribe comprising a plurality of streams and context registers, wherein each stream is capable of executing a thread of execution, wherein multiple streams in the first tribe may be concurrently active such that multiple threads of execution may be concurrently executing within the first tribe, and wherein all of the threads of execution executing within the first tribe can access the first memory portion;

a second tribe comprising a plurality of streams and context registers, wherein each stream is capable of executing a thread of execution, wherein multiple streams in the second tribe may be concurrently active such that multiple threads of execution may be concurrently executing within the second tribe, and wherein all of the threads of execution executing within the second tribe can access the second memory portion; and a migration mechanism coupled to the first and second tribes for enabling a thread of execution currently executing in one tribe to be migrated to another tribe to be executed therein;

wherein the migration mechanism comprises a deadlock resolution mechanism, which detects possible deadlock caused by desired migration of a thread of execution to a full tribe, and breaks the deadlock to enable a thread of execution to be migrated to the full tribe; and wherein the deadlock resolution mechanism comprises a first transient buffer and a second transient buffer, and wherein the deadlock resolution mechanism breaks a deadlock involving a requesting tribe and a destination tribe (where the requesting tribe may be either the first or the second tribe, the destination tribe may be either the first or the second tribe, and where the destination tribe is full) by:

migrating a first thread of execution from the requesting tribe into the first transient buffer;

migrating a second thread of execution from the destination tribe into the second transient buffer; and migrating the first thread of execution from the first transient buffer into the destination tribe.

12. The processing engine of claim 11, wherein the deadlock resolution mechanism guarantees that, after the second thread of execution is migrated from the destination tribe, the first thread of execution will be able to migrate into the destination tribe.

13. The processing engine of claim 11, wherein the deadlock resolution mechanism further proceeds by:

migrating the second thread of execution from the second transient buffer into the requesting tribe.

14. The processing engine of claim 11, wherein the processing engine further comprises a third tribe, and wherein the deadlock resolution mechanism further proceeds by:

migrating the second thread of execution from the second transient buffer into the third tribe.

15. The processing engine of claim 11, wherein the processing engine further comprises a third tribe, and wherein the deadlock resolution mechanism further proceeds by:

migrating a third thread of execution from the third tribe into the first transient buffer; and migrating the second thread of execution from the second transient buffer into the third tribe.

16. A processing engine, comprising:

a first memory portion and a second memory portion;

a first tribe comprising a plurality of streams and context registers, wherein each stream is capable of executing a thread of execution, wherein multiple streams in the first tribe may be concurrently active such that multiple threads of execution may be concurrently executing within the first tribe, and wherein all of the threads of execution executing within the first tribe can access the first memory portion;

a second tribe comprising a plurality of streams and context registers, wherein each stream is capable of executing a thread of execution, wherein multiple streams in the second tribe may be concurrently active such that multiple threads of execution may be concurrently executing within the second tribe, and wherein all of the threads of execution executing within the second tribe can access the second memory portion; and a migration mechanism coupled to the first and second tribes for enabling a thread of execution currently executing in one tribe to be migrated to another tribe to be executed therein;

wherein the migration mechanism comprises a deadlock resolution mechanism, which detects possible deadlock caused by desired migration of a thread of execution to a full tribe, and breaks the deadlock to enable a thread of execution to be migrated to the full tribe; and wherein the deadlock resolution mechanism comprises a first transient buffer and a second transient buffer, wherein the second transient buffer contains an existing thread of execution which is to be migrated to a destination tribe (where the destination tribe may be either the first tribe or the second tribe) that is full, and wherein the deadlock resolution mechanism enables the existing thread of execution to be migrated into the destination tribe by:

migrating a first thread of execution from the destination tribe into the first transient buffer; and migrating the existing thread of execution from the second transient buffer into the destination tribe.

17. The processing engine of claim 16, wherein the deadlock resolution mechanism guarantees that, after the first thread of execution is migrated from the destination tribe, the existing thread of execution will be able to migrate into the destination tribe.

18. The processing engine of claim 16, wherein the first thread of execution is to be migrated to another destination tribe that is full, and wherein the deadlock resolution mechanism further proceeds by:

migrating a second thread of execution from the other destination tribe into the second transient buffer; and migrating the first thread of execution from the first transient buffer into the other destination tribe.

19. In a processing engine comprising a first memory portion, a second memory portion, a first tribe, and a second tribe, wherein the first tribe comprises a plurality of streams and context registers, each stream capable of executing a thread of execution, and wherein the second tribe comprises a plurality of streams and context registers, each stream capable of executing a thread of execution, a method implemented by the processing engine, comprising:

concurrently executing a first plurality of threads of execution in the first tribe, thereby causing multiple streams in the first tribe to be concurrently active, wherein all of the threads of execution in the first tribe can access the first memory portion;

concurrently executing a second plurality of threads of execution in the second tribe, thereby causing multiple streams in the second tribe to be concurrently active, wherein all of the threads of execution in the second tribe can access the second memory portion;

migrating a first thread of execution in the first plurality of threads of execution currently executing in the first tribe from the first tribe to the second tribe, wherein migrating comprises:

receiving an indication from the second tribe that the second tribe is not currently full;

receiving, from the first tribe, execution context information pertaining to the first thread of execution; and providing the execution context information pertaining to the first thread of execution to the second tribe; and executing the first thread of execution in the second tribe.

20. The method of claim 19, wherein each thread of execution in the first tribe is capable of accessing both the first and second memory portions but can access the first memory portion with less overhead than the second memory portion, wherein each thread of execution in the second tribe is capable of accessing both the first and second memory portions but can access the second memory portion with less overhead than the first memory portion, and wherein migrating further comprises:

determining whether the first thread of execution is accessing the second memory portion to a sufficient degree to warrant migrating the first thread of execution to the second tribe; and in response to a determination that the first thread of execution is accessing the second memory portion to a sufficient degree to warrant migrating the first thread of execution to the second tribe, concluding that the first thread of execution should be migrated from the first tribe to the second tribe.

21. The method of claim 19, further comprising:
terminating execution of the first thread of execution in the first tribe.

22. In a processing engine comprising a first memory portion, a second memory portion, a first tribe, and a second tribe, wherein the first tribe comprises a plurality of streams and context registers, each stream capable of executing a thread of execution, and wherein the second tribe comprises a plurality of streams and context registers, each stream capable of executing a thread of execution, a method implemented by the processing engine, comprising:
concurrently executing a first plurality of threads of execution in the first tribe, thereby causing multiple streams in the first tribe to be concurrently active, wherein all of the threads of execution in the first tribe can access the first memory portion;
concurrently executing a second plurality of threads of execution in the second tribe, thereby causing multiple streams in the second tribe to be concurrently active, wherein all of the threads of execution in the second tribe can access the second memory portion;
migrating a first thread of execution in the first plurality of threads of execution currently executing in the first tribe from the first tribe to the second tribe; and
executing the first thread of execution in the second tribe;
wherein migrating comprises:
receiving a request from the first tribe to migrate a thread of execution to the second tribe;
receiving an indication from the second tribe that the second tribe is not currently full;
sending a grant to the first tribe;
receiving, from the first tribe, execution context information pertaining to the first thread of execution; and
providing the execution context information pertaining to the first thread of execution to the second tribe.

23. In a processing engine comprising a first memory portion, a second memory portion, a first tribe, and a second tribe, wherein the first tribe comprises a plurality of streams and context registers, each stream capable of executing a thread of execution, and wherein the second tribe comprises a plurality of streams and context registers, each stream capable of executing a thread of execution, a method implemented by the processing engine, comprising:
concurrently executing a first plurality of threads of execution in the first tribe, thereby causing multiple streams in the first tribe to be concurrently active, wherein all of the threads of execution in the first tribe can access the first memory portion;
concurrently executing a second plurality of threads of execution in the second tribe, thereby causing multiple streams in the second tribe to be concurrently active, wherein all of the threads of execution in the second tribe can access the second memory portion;
migrating a first thread of execution in the first plurality of threads of execution currently executing in the first tribe from the first tribe to the second tribe; and
executing the first thread of execution in the second tribe;
wherein migrating the first thread of execution from the first tribe to the second tribe comprises:
detecting that the second tribe is full;
migrating the first thread of execution into a first transient buffer;
migrating a second thread of execution in the second plurality of threads of execution from the second tribe into a second transient buffer, thereby causing the second tribe to no longer be full;
migrating the first thread of execution from the first transient buffer into the second tribe; and
migrating the second thread of execution from the second transient buffer into the first tribe.

24. In a processing engine comprising a first memory portion, a second memory portion, a first tribe, a second tribe, and a third tribe, wherein the first tribe comprises a plurality of streams and context registers, each stream capable of executing a thread of execution, wherein the second tribe comprises a plurality of streams and context registers, each stream capable of executing a thread of execution, and wherein the third tribe comprises a plurality of streams and context registers, each stream capable of executing a thread of execution, a method implemented by the processing engine, comprising:
concurrently executing a first plurality of threads of execution in the first tribe, thereby causing multiple streams in the first tribe to be concurrently active, wherein all of the threads of execution in the first tribe can access the first memory portion;
concurrently executing a second plurality of threads of execution in the second tribe, thereby causing multiple streams in the second tribe to be concurrently active, wherein all of the threads of execution in the second tribe can access the second memory portion;
migrating a first thread of execution in the first plurality of threads of execution currently executing in the first tribe from the first tribe to the second tribe; and
executing the first thread of execution in the second tribe;
wherein migrating the first thread of execution from the first tribe to the second tribe comprises:
detecting that the second tribe is full;
migrating the first thread of execution into a first transient buffer;
migrating a second thread of execution in the second plurality of threads of execution from the second tribe into a second transient buffer, thereby causing the second tribe to no longer be full;
migrating the first thread of execution from the first transient buffer into the second tribe; and
migrating the second thread from the second transient buffer into the third tribe.

25. In a processing engine comprising a first memory portion, a second memory portion, a first tribe, a second tribe, and a third tribe, wherein the first tribe comprises a plurality of streams and context registers, each stream capable of executing a thread of execution, wherein the second tribe comprises a plurality of streams and context registers, each stream capable of executing a thread of execution, and wherein the third tribe comprises a plurality of streams and context registers, each stream capable of executing a thread of execution, a method implemented by the processing engine, comprising:
concurrently executing a first plurality of threads of execution in the first tribe, thereby causing multiple streams in the first tribe to be concurrently active, wherein all of the threads of execution in the first tribe can access the first memory portion;
concurrently executing a second plurality of threads of execution in the second tribe, thereby causing multiple streams in the second tribe to be concurrently active, wherein all of the threads of execution in the second tribe can access the second memory portion;

concurrently executing a third plurality of threads of execution in the third tribe, thereby causing multiple streams in the third tribe to be concurrently active;

migrating a first thread of execution in the first plurality of threads of execution currently executing in the first tribe from the first tribe to the second tribe; and executing the first thread of execution in the second tribe;

wherein migrating the first thread of execution from the first tribe to the second tribe comprises:
  detecting that the second tribe is full;
  migrating the first thread of execution into a first transient buffer;
  migrating a second thread of execution in the second plurality of threads of execution from the second tribe into a second transient buffer, thereby causing the second tribe to no longer be full;
  migrating the first thread of execution from the first transient buffer into the second tribe;
  migrating a third thread of execution in the third plurality of threads of execution from the third tribe into the first transient buffer; and
  migrating the second thread of execution from the second transient buffer into the third tribe.

* * * * *